(12) United States Patent
Huang et al.

(10) Patent No.: US 12,287,458 B2
(45) Date of Patent: Apr. 29, 2025

(54) ELECTRONIC DEVICE

(71) Applicant: LARGAN PRECISION CO., LTD., Taichung (TW)

(72) Inventors: Hsin-Hsuan Huang, Taichung (TW); Kuan-Ting Yeh, Taichung (TW); Kuo-Jui Wang, Taichung (TW); Yu-Tai Tseng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 811 days.

(21) Appl. No.: 17/383,184

(22) Filed: Jul. 22, 2021

(65) Prior Publication Data
US 2022/0091395 A1 Mar. 24, 2022

Related U.S. Application Data

(60) Provisional application No. 63/080,346, filed on Sep. 18, 2020.

(51) Int. Cl.
*G02B 13/00* (2006.01)
*G02B 9/60* (2006.01)
(Continued)

(52) U.S. Cl.
CPC ............ *G02B 13/0045* (2013.01); *G02B 9/60* (2013.01); *G02B 9/62* (2013.01); *G02B 9/64* (2013.01);
(Continued)

(58) Field of Classification Search
CPC .... G02B 13/0045; G02B 13/06; G02B 13/18; G02B 9/60; G02B 27/646; G03B 5/00; G03B 30/00; G03B 2205/0007; G03B 17/12; H04N 23/45; H04N 23/57; H04M 1/0264
See application file for complete search history.

(56) References Cited

U.S. PATENT DOCUMENTS

| 2,319,171 A | 5/1943 | Warmisham et al. |
| 2,413,476 A | 12/1946 | Warmisham et al. |

(Continued)

FOREIGN PATENT DOCUMENTS

| CN | 204215093 U | 3/2015 |
| CN | 106405818 A | 2/2017 |

(Continued)

*Primary Examiner* — George G. King
*Assistant Examiner* — Anna Smith
(74) *Attorney, Agent, or Firm* — Maschoff Brennan

(57) ABSTRACT

An electronic device includes at least two image capturing units which face the same side. The at least two image capturing units include a first image capturing unit and a second image capturing unit. The first image capturing unit includes an optical image system and a first image sensor. The optical image system includes a first lens element and an image surface. The first image sensor is disposed on the image surface of the optical image system thereof and has a first resolution of at least 60 megapixels. The second image capturing unit includes an optical image system and a second image sensor. The optical image system includes a first lens element and an image surface. The second image sensor is disposed on the image surface of the optical image system thereof and has a second resolution of at least 40 megapixels.

15 Claims, 43 Drawing Sheets

(51) Int. Cl.
  *G02B 9/62* (2006.01)
  *G02B 9/64* (2006.01)
  *G02B 27/64* (2006.01)
  *G03B 5/00* (2021.01)
  *G03B 30/00* (2021.01)
  *H04N 23/45* (2023.01)
  *H04N 23/55* (2023.01)

(52) U.S. Cl.
  CPC ....... *G02B 13/0065* (2013.01); *G02B 27/646* (2013.01); *G03B 5/00* (2013.01); *G03B 30/00* (2021.01); *H04N 23/45* (2023.01); *H04N 23/55* (2023.01); *G03B 2205/0007* (2013.01)

(56) References Cited

U.S. PATENT DOCUMENTS

| | | | |
|---|---|---|---|
| 3,272,072 A | 9/1966 | Ziegler | |
| 4,057,330 A | 11/1977 | Matui | |
| 4,383,739 A | 5/1983 | Bogath | |
| RE32,923 E * | 5/1989 | Kreitzer | G02B 15/144113 359/740 |
| 6,239,921 B1 | 5/2001 | Isono | |
| 6,512,633 B2 | 1/2003 | Konno et al. | |
| 9,392,188 B2 | 7/2016 | Shabtay et al. | |
| 9,402,032 B2 | 7/2016 | Dror et al. | |
| 9,413,972 B2 | 8/2016 | Shabtay et al. | |
| 9,568,712 B2 | 2/2017 | Dror et al. | |
| 9,857,568 B2 | 1/2018 | Pror et al. | |
| 10,015,408 B2 | 7/2018 | Shabtay et al. | |
| 10,156,706 B2 | 12/2018 | Shabtay et al. | |
| 10,288,840 B2 | 5/2019 | Shabtay et al. | |
| 10,288,896 B2 | 5/2019 | Shabtay et al. | |
| 10,317,647 B2 | 6/2019 | Dror et al. | |
| 10,324,277 B2 | 6/2019 | Dror et al. | |
| 10,330,897 B2 | 6/2019 | Dror et al. | |
| 12,085,698 B2 * | 9/2024 | Lee | G02B 13/0045 |
| 2010/0097444 A1 * | 4/2010 | Lablans | G03B 35/00 348/46 |
| 2012/0287315 A1 * | 11/2012 | Huang | H04N 23/57 348/262 |
| 2012/0321293 A1 | 12/2012 | Schauss et al. | |
| 2015/0185442 A1 | 7/2015 | Katsuragi et al. | |
| 2016/0033741 A1 | 2/2016 | Hsu | |
| 2016/0124182 A1 | 5/2016 | Hsu | |
| 2016/0161718 A1 | 6/2016 | Koreeda | |
| 2016/0178870 A1 | 6/2016 | Baik | |
| 2016/0252709 A1 * | 9/2016 | Lin | G02B 9/62 348/335 |
| 2017/0235104 A1 | 8/2017 | Lai et al. | |
| 2017/0235105 A1 | 8/2017 | Lai et al. | |
| 2018/0188491 A1 | 7/2018 | Chang et al. | |
| 2018/0188492 A1 | 7/2018 | Chang et al. | |
| 2018/0275371 A1 | 9/2018 | Jhang et al. | |
| 2019/0317299 A1 | 10/2019 | Kim | |
| 2019/0377160 A1 | 12/2019 | Sekine et al. | |
| 2019/0384042 A1 | 12/2019 | Lin et al. | |
| 2020/0096745 A1 | 3/2020 | Chang et al. | |
| 2020/0241247 A1 | 7/2020 | Zhang et al. | |
| 2020/0241250 A1 * | 7/2020 | Kim | G02B 13/24 |
| 2020/0358954 A1 * | 11/2020 | Wang | H04N 23/90 |
| 2021/0063687 A1 * | 3/2021 | Huh | G02B 9/60 |
| 2021/0157095 A1 * | 5/2021 | Chen | G02B 13/20 |
| 2021/0396973 A1 * | 12/2021 | Liu | G02B 13/0045 |
| 2024/0302629 A1 * | 9/2024 | Seo | G02B 13/00 |

FOREIGN PATENT DOCUMENTS

| | | |
|---|---|---|
| CN | 106680974 A | 5/2017 |
| CN | 107024766 A | 8/2017 |
| CN | 206563841 U | 10/2017 |
| CN | 110174752 A | 8/2019 |
| CN | 110262014 A | 9/2019 |
| CN | 110275278 A | 9/2019 |
| CN | 110716281 A | 1/2020 |
| CN | 110764231 A | 2/2020 |
| CN | 110989139 A | 4/2020 |
| CN | 111142239 A | 5/2020 |
| CN | 210514766 U | 5/2020 |
| CN | 111615822 A | 9/2020 |
| JP | 1975-062630 | 5/1975 |
| JP | 1981-102819 A | 8/1981 |
| JP | 1997-068651 A | 3/1997 |
| JP | 1997-127414 A | 5/1997 |
| JP | 1997-218348 A | 8/1997 |
| JP | 2000-180719 A | 6/2000 |
| JP | 2013-025202 A | 2/2013 |
| JP | 2015-125212 A | 7/2015 |
| TW | M498887 U | 4/2015 |
| WO | 2018-010245 A1 | 1/2018 |
| WO | 2018-090609 A1 | 5/2018 |
| WO | 2020-036032 A1 | 2/2020 |

\* cited by examiner

ELECTRONIC DEVICE

RELATED APPLICATIONS

This application claims priority to U.S. Provisional Application 63/080,346, filed on Sep. 18, 2020, which is incorporated by reference herein in its entirety.

BACKGROUND

Technical Field

The present disclosure relates to an electronic device, more particularly to an electronic device including an image capturing unit and an optical image system.

Description of Related Art

With the development of semiconductor manufacturing technology, the performance of image sensors has improved, and the pixel size thereof has been scaled down. Therefore, featuring high image quality becomes one of the indispensable features of an optical system of an electronic device nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system of an electronic device to obtain a balance among the requirements such as high image quality, low sensitivity, a proper aperture size, compactness and a desirable field of view.

SUMMARY

According to one aspect of the present disclosure, an electronic device includes at least two image capturing units. The at least two image capturing units face the same side, and the at least two image capturing units include a first image capturing unit and a second image capturing unit. The first image capturing unit includes an optical image system and a first image sensor. The optical image system of the first image capturing unit includes, in order from an object side to an image side along an optical path, a first lens element and an image surface. The first image sensor is disposed on the image surface of the optical image system of the first image capturing unit, and the first image sensor has a first resolution of at least 60 megapixels. The second image capturing unit includes an optical image system and a second image sensor. The optical image system of the second image capturing unit includes, in order from an object side to an image side along an optical path, a first lens element and an image surface. The second image sensor is disposed on the image surface of the optical image system of the second image capturing unit, and the second image sensor has a second resolution of at least 40 megapixels.

When an equivalent focal length of the optical image system of the first image capturing unit is $fs\_1$, an equivalent focal length of the optical image system of the second image capturing unit is $fs\_2$, a focal length of the optical image system of the first image capturing unit is $f\_1$, a focal length of the optical image system of the second image capturing unit is $f\_2$, a maximum field of view of the optical image system of the first image capturing unit is $FOV\_1$, and a maximum field of view of the optical image system of the second image capturing unit is $FOV\_2$, the electronic device satisfies the following conditions:

$30.0 \text{ [mm]} \leq fs\_1 \leq 150.0 \text{ [mm]}$;

$10.0 \text{ [mm]} \leq fs\_2 \leq 30.0 \text{ [mm]}$;

$15.0 \text{ [mm]} < f\_1 + f\_2 < 45.0 \text{ [mm]}$; and $20.0 \text{ [deg.]} < FOV\_2 - FOV\_1 < 80.0 \text{ [deg.]}$.

According to another aspect of the present disclosure, an electronic device includes at least three image capturing units. The at least three image capturing units face the same side, and the at least three image capturing units include a first image capturing unit, a second image capturing unit and a third image capturing unit. The first image capturing unit includes an optical image system and a first image sensor. The optical image system of the first image capturing unit includes, in order from an object side to an image side along an optical path, a first lens element and an image surface. The first image sensor is disposed on the image surface of the optical image system of the first image capturing unit, and the first image sensor has a first resolution of at least 40 megapixels. The second image capturing unit includes an optical image system and a second image sensor. The optical image system of the second image capturing unit includes, in order from an object side to an image side along an optical path, a first lens element and an image surface. The second image sensor is disposed on the image surface of the optical image system of the second image capturing unit, and the second image sensor has a second resolution of at least 20 megapixels. The third image capturing unit includes an optical image system and a third image sensor. The optical image system of the third image capturing unit includes, in order from an object side to an image side along an optical path, a first lens element and an image surface. The third image sensor is disposed on the image surface of the optical image system of the third image capturing unit, and the third image sensor has a third resolution of at least 40 megapixels.

When an equivalent focal length of the optical image system of the first image capturing unit is $fs\_1$, an equivalent focal length of the optical image system of the second image capturing unit is $fs\_2$, an equivalent focal length of the optical image system of the third image capturing unit is $fs\_3$, a maximum field of view of the optical image system of the first image capturing unit is $FOV\_1$, and a maximum field of view of the optical image system of the third image capturing unit is $FOV\_3$, the electronic device satisfies the following conditions:

$70.0 \text{ [mm]} \leq fs\_1 \leq 150.0 \text{ [mm]}$;

$30.0 \text{ [mm]} \leq fs\_2 \leq 70.0 \text{ [mm]}$;

$10.0 \text{ [mm]} \leq fs\_3 \leq 30.0 \text{ [mm]}$; and $30.0 \text{ [deg.]} < FOV\_3 - FOV\_1 < 80.0 \text{ [deg.]}$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
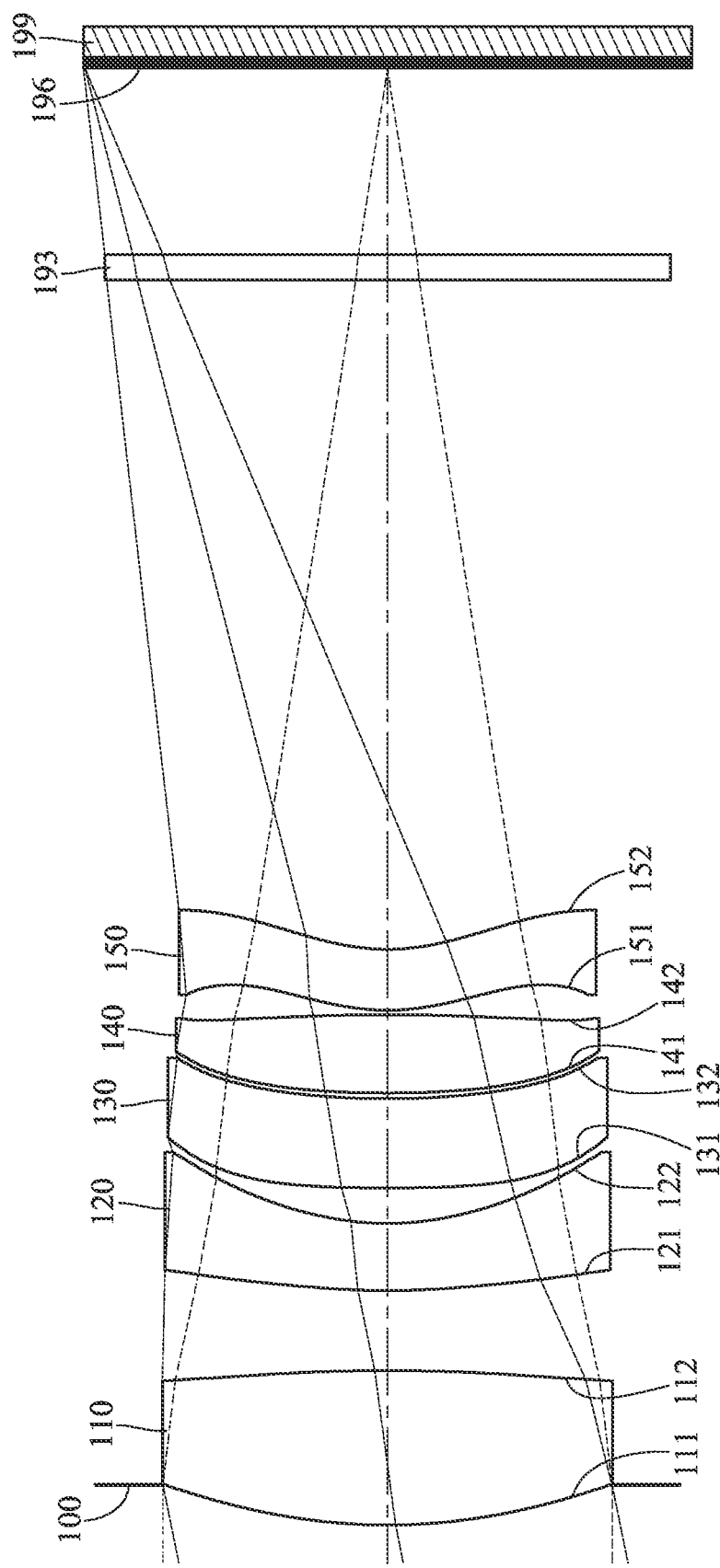
FIG. 1 is a schematic view of an image capturing unit according to the 1st embodiment of the present disclosure.

An electronic device includes at least two image capturing units. The at least two image capturing units face the same side, and the at least two image capturing units include a first image capturing unit and a second image capturing unit. Moreover, the electronic device can also include at least three image capturing units. The at least three image capturing units face the same side, and the at least three image capturing units include a first image capturing unit, a second image capturing unit and a third image capturing unit. Moreover, the electronic device can also include at least four image capturing units. Moreover, the electronic device can also include at least five image capturing units.

The first image capturing unit includes an optical image system and a first image sensor. The optical image system includes, in order from an object side to an image side along an optical path, a first lens element and an image surface. The first image sensor is disposed on the image surface of the optical image system of the first image capturing unit, and the first image sensor has a first resolution of at least 40 megapixels. Therefore, it is favorable for providing ultra-high image resolution so as to achieve high magnification and become applicable in a wide range of applications by utilizing image processing of partially captured image information. Moreover, the first image sensor can also have the first resolution of at least 60 megapixels. Moreover, the optical image system of the first image capturing unit can further comprise a last lens element disposed between the first lens element and the image surface along the optical path. It is noted that "the last lens element" described in this specification refers to the lens element closest to the image surface in the optical image system.

The second image capturing unit includes an optical image system and a second image sensor. The optical image system includes, in order from an object side to an image side along an optical path, a first lens element and an image surface. The second image sensor is disposed on the image surface of the optical image system of the second image capturing unit, and the second image sensor has a second resolution of at least 20 megapixels. Therefore, it is favorable for providing proper resolution so as to effectively control manufacturing costs and providing image processing with relatively lower magnification so as to provide users with image resolution with sufficient details. Moreover, the second image sensor can also have the second resolution of at least 30 megapixels. Moreover, the second image sensor can also have the second resolution of at least 40 megapixels. Therefore, it is favorable for obtaining more image information so as to increase the restoration of image details, and it is also favorable for providing image processing with medium magnification so as to increase utilization flexibility in various applications for the electronic device. Moreover, the second image sensor can also have the second resolution of at least 50 megapixels. Moreover, the second image sensor can also have the second resolution of at least 60 megapixels. Moreover, the optical image system of the second image capturing unit can further comprise a last lens element disposed between the first lens element and the image surface along the optical path.

The third image capturing unit includes an optical image system and a third image sensor. The optical image system includes, in order from an object side to an image side along an optical path, a first lens element and an image surface. The third image sensor is disposed on the image surface of the optical image system of the third image capturing unit, and the third image sensor can have a third resolution of at least 20 megapixels. Therefore, it is favorable for providing proper resolution so as to further manage manufacturing costs effectively and providing image processing with relatively lower magnification so as to provide users with sufficient image clarity. Moreover, the third image sensor can have a third resolution of at least 30 megapixels. Moreover, the third image sensor can have a third resolution of at least 40 megapixels. Therefore, it is favorable for obtaining more image information so as to increase the restoration of image details, and it is also favorable for achieving image processes of medium magnification so as to increase application flexibility of the electronic device. Moreover, the third image sensor can have a third resolution of at least 50 megapixels. Moreover, one of the first image sensor, the second image sensor and the third image sensor can have a third resolution of at least 60 megapixels. Moreover, the optical image system of the third image capturing unit can further comprise a last lens element disposed between the first lens element and the image surface along the optical path.

A diagonal length of the second image sensor can be larger than 9.0 millimeters. Therefore, it is favorable for ensuring a proper imaging height of the optical image system so as to provide a sufficiently large area of light and enable high resolution imaging. Moreover, a diagonal length of at least one of the first image sensor and the second image sensor can also be larger than 12.0 millimeters. Moreover, a diagonal length of at least one of the first image sensor, the second image sensor and the third image sensor can also be larger than 12.0 millimeters. Moreover, the diagonal length of at least one of the first image sensor and the second image sensor can also be larger than 13.5 millimeters.

Figure 41:
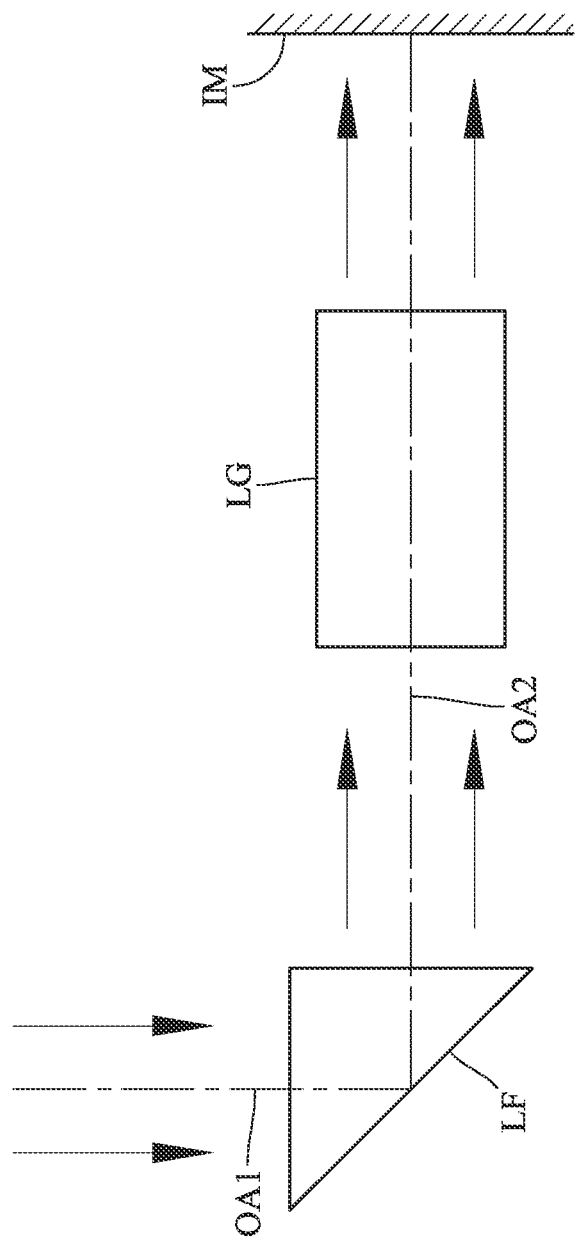
FIG. 41 shows a schematic view of a configuration of a reflective element and an optical image system according to one embodiment of the present disclosure.
Figure 42:
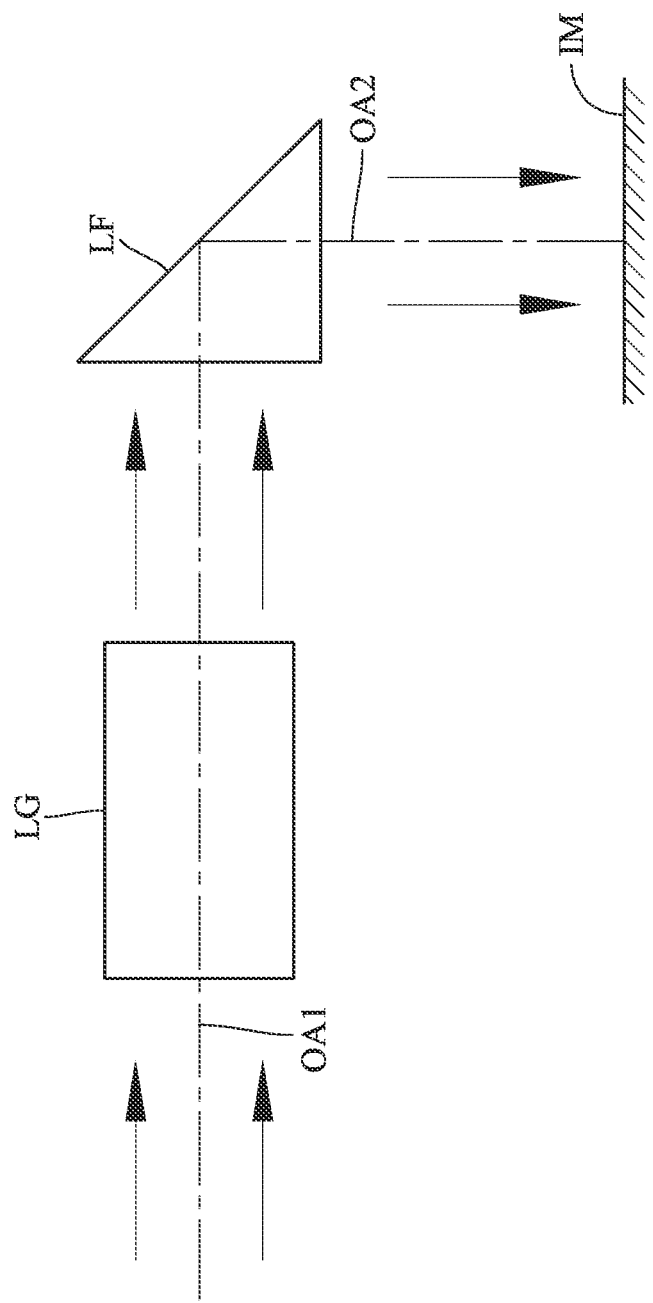
FIG. 42 shows a schematic view of another configuration of a reflective element and an optical image system according to one embodiment of the present disclosure.
Figure 43:
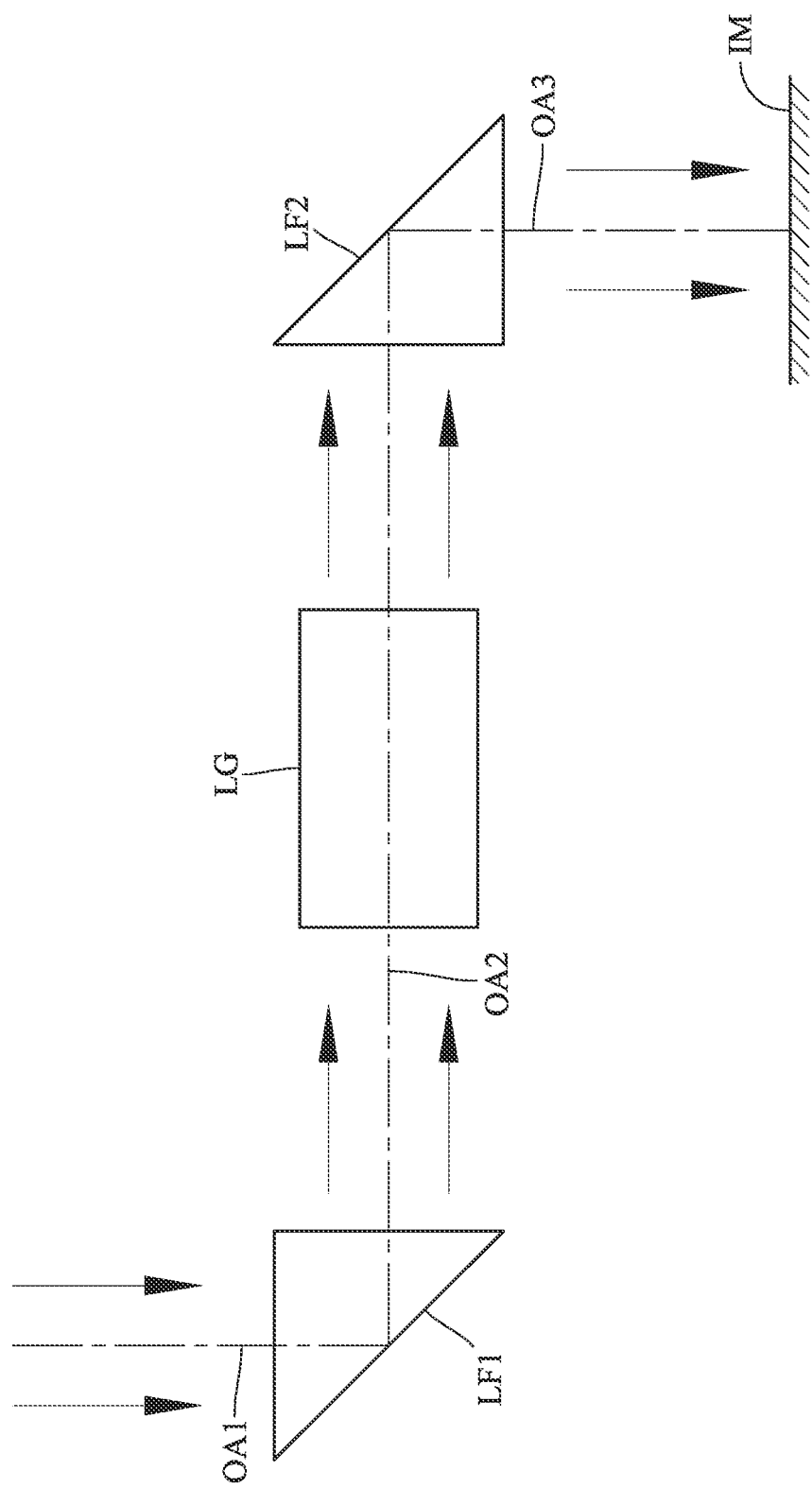
FIG. 43 shows a schematic view of a configuration of two reflective elements and an optical image system according to one embodiment of the present disclosure.

According to the electronic device disclosed in the present disclosure, the first image capturing unit can further include a reflective element. Therefore, it is favorable for providing a folded light path for the optical image system within limited space by utilizing the reflective element to achieve more flexible space arrangement and satisfy high-end specification requirements. Specifically, according to the first image capturing unit disclosed in the present disclosure, at least one reflective element with functionality of folding the light path, such as a prism or a mirror, can be optionally disposed between an imaged object and the image surface on the imaging optical path, such that the optical image system of the first image capturing unit can have a folded light path and can be more flexible in space arrangement, and therefore the dimensions of the electronic device is not restricted by the total track length of the optical image system of the first image capturing unit, thereby satisfying various specification requirements. Specifically, please refer to FIG. 41 and FIG. 42. FIG. 41 shows a schematic view of a configuration of a reflective element in an optical image system according to one embodiment of the present disclosure, and FIG. 42 shows a schematic view of another configuration of a reflective element in an optical image system according to one embodiment of the present disclosure. In FIG. 41 and FIG. 42, the optical image system can have, in order from an imaged object (not shown in the figures) to an image surface IM along an optical path, a first optical axis OA1, a reflective element LF and a second optical axis OA2. The reflective element LF can be disposed between the imaged object and a lens group LG of the optical image system as shown in FIG. 41 or disposed between a lens group LG of the optical image system and the image surface IM as shown in FIG. 42. Furthermore, please refer to FIG. 43, which shows a schematic view of a configuration of two reflective elements in an optical image system according to one embodiment of the present disclosure. In FIG. 43, the optical image system can have, in order from an imaged object (not shown in the figure) to an image surface IM along an optical path, a first optical axis OA1, a first reflective element LF1, a second optical axis OA2, a second reflective element LF2 and a third optical axis OA3. The first reflective element LF1 is disposed between the imaged object and a lens group LG of the optical image system, the second reflective element LF2 is disposed between the lens group LG of the optical image system and the image surface IM, and the traveling direction of light on the first optical axis OA1 can be the same direction as the traveling direction of light on the third optical axis OA3 as shown in FIG. 43. The optical image system can be optionally provided with three or more reflective elements, and the present disclosure is not limited to the type, quantity and position of the reflective elements of the embodiments disclosed in the aforementioned figures. In addition, the present disclosure is not limited to the disposing location of the reflective element abovementioned. For example, the second image capturing unit or the third image capturing unit can also include a reflective element, the disposing manner is similar to that in the first image capturing unit, and a description in this regard will not be provided again.

An optical axis of the optical image system of the first image capturing unit can be perpendicular to an optical axis of the optical image system of the third image capturing unit.

Therefore, it is favorable for effectively utilizing the space of the electronic device so as to overcome physical restrictions in the optical image system.

According to the electronic device disclosed in the present disclosure, the first image capturing unit can further include an optical image stabilizer. Therefore, it is favorable for effectively correcting blurred images due to camera shake.

When an equivalent focal length of the optical image system of the first image capturing unit is fs_1, the electronic device satisfies the following condition: 30.0 [mm] ≤fs_1≤150.0 [mm]. Therefore, it is favorable for shooting portraits, long shots or telephoto images, which allows users to explore hard to reach scenery from afar. Moreover, the electronic device can also satisfy the following condition: 40.0 [mm]≤fs_1≤150.0 [mm]. Moreover, the electronic device can also satisfy the following condition: 70.0 [mm] ≤fs_1≤150.0 [mm]. Moreover, the electronic device can also satisfy the following condition: 90.0 [mm]≤fs_1≤150.0 [mm]. The abovementioned equivalent focal length refers to the focal length which an image capturing unit with a determined angle of view would need for a 35 mm film camera to obtain the same angle of view. The 35 mm film usually refers to a 36×24 mm film format which has a diagonal length of 43.2 mm and approximately 2 times of the image height (43.2 mm=2×21.6 mm). It can be calculated by the following formula: an equivalent focal length=21.6 mm/tan(HFOV) [mm].

When an equivalent focal length of the optical image system of the second image capturing unit is fs_2, the electronic device can satisfy the following condition: 10.0 [mm]≤fs_2≤30.0 [mm]. Therefore, it is favorable for shooting images of standard, large or wide field of view so as to capture more information in a frame. Moreover, the electronic device can also satisfy the following condition: 18.0 [mm]≤fs_2≤30.0 [mm]. In some other cases, the electronic device can also satisfy the following condition: 30.0 [mm] ≤fs_2≤70.0 [mm]. Therefore, it is favorable for achieving a field of view which is suitable for shooting images with emphasis such as portraits or feature highlights. Moreover, the electronic device can also satisfy the following condition: 40.0 [mm]≤fs_2≤65.0 [mm].

When an equivalent focal length of the optical image system of the third image capturing unit is fs_3, the electronic device can satisfy the following condition: 10.0 [mm]≤fs_3≤30.0 [mm]. Therefore, it is favorable for shooting images of standard, large or wide field of view so as to have more information in a frame. Moreover, the electronic device can also satisfy the following condition: 17.0 [mm] ≤fs_3≤30.0 [mm].

When a focal length of the optical image system of the first image capturing unit is f_1, and a focal length of the optical image system of the second image capturing unit is f_2, the electronic device can satisfy the following condition: 15.0 [mm]<f_1+f_2<45.0 [mm]. Therefore, it is favorable for shooting images from afar via the electronic device while ensuring that the first or the second image sensor has a proper area to receive a sufficient amount of light. Moreover, the electronic device can also satisfy the following condition: 25.0 [mm]<f_1+f_2<45.0 [mm]. Moreover, the electronic device can also satisfy the following condition: 32.0 [mm]<f_1+f_2<45.0 [mm].

When a maximum field of view of the optical image system of the first image capturing unit is FOV_1, and a maximum field of view of the optical image system of the second image capturing unit is FOV_2, the electronic device can satisfy the following condition: 20.0 [deg.]<FOV_2−FOV_1<80.0 [deg.]. Therefore, it is favorable for providing different imaging ranges of the electronic device, such that the electronic device can zoom in so as to obtain images of different magnifications, thereby increasing the application range. In addition, when the maximum field of view of the optical image system of the first image capturing unit is FOV_1, and a maximum field of view of the optical image system of the third image capturing unit is FOV_3, the electronic device can satisfy the following condition: 30.0 [deg.]<FOV_3−FOV_1<80.0 [deg.]. Moreover, the electronic device can also satisfy the following condition: 45.0 [deg.]<FOV_3−FOV_1<80.0 [deg.].

When the equivalent focal length of the optical image system of the first image capturing unit is fs_1, and the equivalent focal length of the optical image system of the second image capturing unit is fs_2, the electronic device can satisfy the following condition: 2<fs_1/fs_2<10. Therefore, it is favorable for combining different image capturing units so as to achieve imaging functions at different focal lengths of the electronic device. Moreover, the electronic device can also satisfy the following condition: 3<fs_1/fs_2<9. In addition, when the equivalent focal length of the optical image system of the first image capturing unit is fs_1, and the equivalent focal length of the optical image system of the third image capturing unit is fs_3, the electronic device can satisfy the following condition: 3.5<fs_1/fs_3<10. Moreover, the electronic device can also satisfy the following condition: 4.0<fs_1/fs_3<8.0.

When the focal length of the optical image system of the first image capturing unit is f_1, the focal length of the optical image system of the second image capturing unit is f_2, and a focal length of the optical image system of the third image capturing unit is f_3, the electronic device can satisfy the following condition: 28.0 [mm]<f_1+f_2+f_3<70.0 [mm]. Therefore, it is favorable for providing numerous variations of magnification for the electronic device so as to provide the same or even wider application range than the conventional high-end zoom lenses. Moreover, the electronic device can also satisfy the following condition: 35.0 [mm]<f_1+f_2+f_3<65.0 [mm].

When a distance along the optical axis between an image-side surface of the last lens element and the image surface of the optical image system of the first image capturing unit is BL_1, a distance along an optical axis between an image-side surface of the last lens element and the image surface of the optical image system of the second image capturing unit is BL_2, a distance along the optical axis between an image-side surface of the last lens element and the image surface of the optical image system of the third image capturing unit is BL_3, the electronic device can satisfy the following condition: 1.0<BL_1/(BL_2+BL_3). Therefore, it is favorable for obtaining a balanced arrangement among the first, second, and third image capturing units in the electronic device, such that an image capturing unit with a folded optical path can have a proper back focal length for configuring additional optical elements, and the length of the image capturing unit can be effectively controlled; and it is also favorable for reducing the back focal length of an image capturing unit without a folded optical path so as to control the thickness of the electronic device. Moreover, the electronic device can also satisfy the following condition: 2.0<BL_1/(BL_2+BL_3). Moreover, the electronic device can also satisfy the following condition: 3.0<BL_1/(BL_2+BL_3)<10.0. Moreover, the electronic device can also satisfy the following condition: 4.0<BL_1/(BL_2+BL_3)<8.0.

Hereinafter, the optical image system and the image surface in each of the first image capturing unit, the second image capturing unit and the third image capturing unit would be described in detail. It is noted that an optical image system described here in the specification can refer to any of the optical image system in the first image capturing unit, the optical image system in the second image capturing unit or the optical image system in the third image capturing unit as a generic term thereof when not specified. Similarly, an image surface described here in the specification can refer to any of the image surface in the first image capturing unit, the image surface in the second image capturing unit or the image surface in the third image capturing unit as a generic term thereof when not specified. Further, under this premise, a parameter described here in the specification can be associated to any of the first image capturing unit, the second image capturing unit or the third image capturing unit if the written symbol of the parameter has no underline with a numeric value. For example, parameter "fs" can refer to $fs\_1$, $fs\_2$ or $fs\_3$; parameter "f" can refer to $f\_1$, $f\_2$ or $f\_3$; parameter "FOV" can refer to $FOV\_1$, $FOV\_2$ or $FOV\_3$; and parameter "BL" can refer to $BL\_1$, $BL\_2$ or $BL\_3$.

The total number of lens elements of the optical image system can be at least five. Moreover, the total number of lens elements of the optical image system of the first image capturing unit can also be five, and the five lens elements are, in order from the object side to the image side along the optical path, the first lens element, a second lens element, a third lens element, a fourth lens element and the last lens element; in this case, the last lens element can also be considered as a fifth lens element. Moreover, the total number of lens elements of the optical image system of the first image capturing unit can also be six, and the six lens elements are, in order from the object side to the image side along the optical path, the first lens element, a second lens element, a third lens element, a fourth lens element, a fifth lens element and the last lens element; in this case, the last lens element can also be considered as a sixth lens element. Moreover, the total number of lens elements of the optical image system of the second image capturing unit can also be at least eight. The present disclosure is not limited to the number of the lens elements of the optical image system. For example, the total number of lens elements of the optical image system of the first image capturing unit or the third image capturing unit can also be at least eight.

There can be an air gap along the optical axis between each of all adjacent lens elements of the optical image system. Therefore, it is favorable for reducing the assembling difficulty of the optical image system so as to increase the assembly yield rate. In detail, each of the first through last lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment, which is not favorable for the image quality. Therefore, having an air gap in a paraxial region between each of all adjacent lens elements of the optical image system in the present disclosure is favorable for avoiding the problems of the cemented lens elements so as to improve the yield rate and to increase flexibility in designing the surface shapes of lens elements, thereby reducing the size of the optical image system and correcting aberrations.

The first lens element of the optical image system can have positive refractive power. Therefore, it is favorable for providing significant light convergence so as to effectively reduce the size of the optical image system for the requirement of compactness.

The second lens element of the optical image system can have negative refractive power. Therefore, it is favorable for correcting aberrations generated by the first lens element so as to correct spherical aberration and chromatic aberration. The second lens element of the optical image system can have an image-side surface being concave in a paraxial region thereof. Therefore, it is favorable for effectively correcting aberrations generated by the first lens element so as to increase image quality.

The fourth lens element of the optical image system can have an image-side surface being concave in a paraxial region thereof. Therefore, it is favorable for correcting aberrations of the optical image system.

The fifth lens element of the optical image system can have an object-side surface being concave in a paraxial region thereof. The fifth lens element can be referred as the last lens element if the total number of the lens elements of the optical image system is five. Therefore, it is favorable for controlling the incident angle of light at the lens surface so as to prevent a total reflection. The fifth lens element of the optical image system can have an image-side surface being concave in a paraxial region thereof. Therefore, it is favorable for effectively balancing the space arrangement of the optical image system so as to meet the specification requirement of the electronic device.

Figure 39:
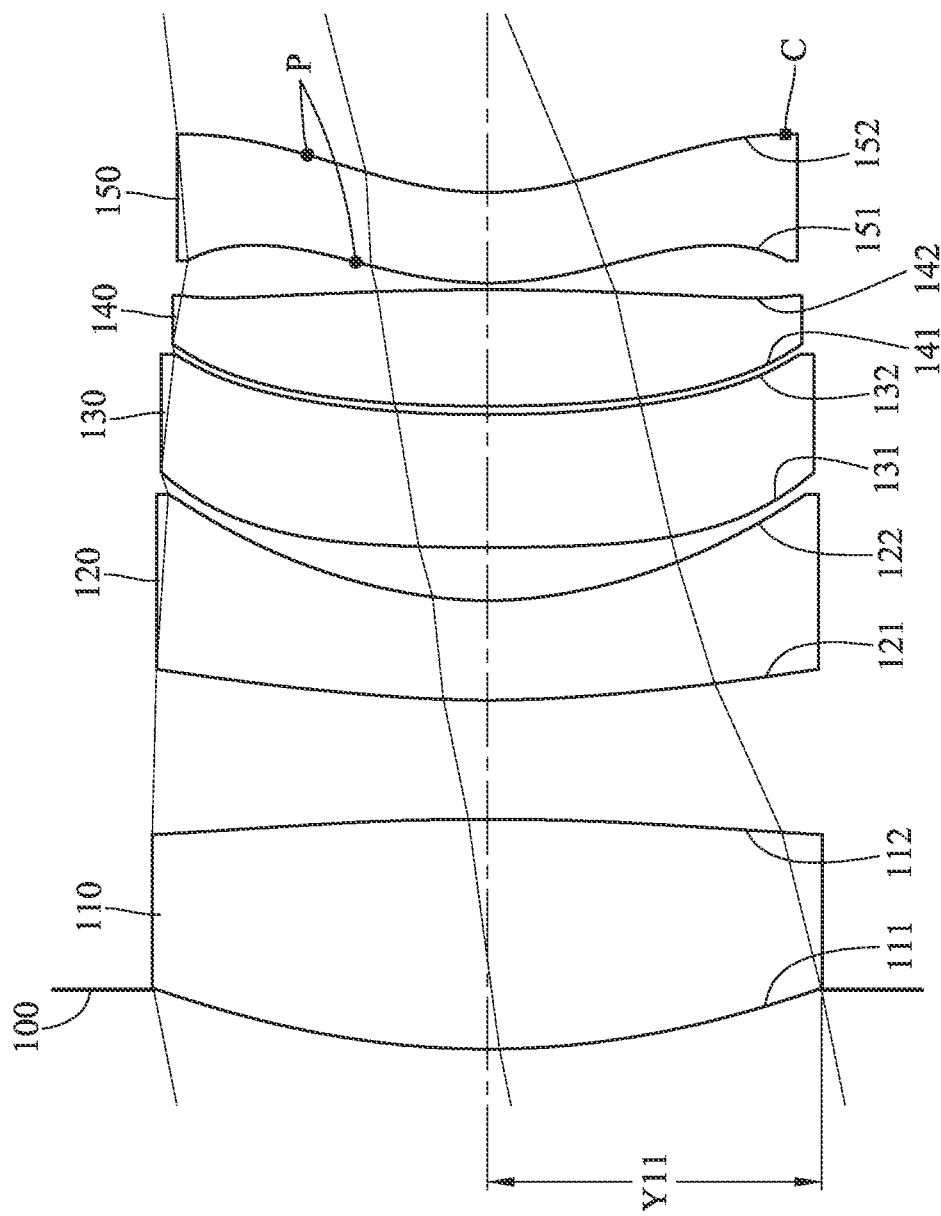
FIG. 39 shows a schematic view of Y11, several inflection points and a critical point of the lens elements according to the 1st embodiment of the present disclosure.

The last lens element of the optical image system can have an image-side surface being concave in a paraxial region thereof and having at least one convex critical point in an off-axis region thereof. Therefore, it is favorable for correcting field curvature so as to feature compactness and flatten the Petzval surface of the optical image system. Please refer to FIG. 39, which shows a schematic view of a convex critical point C on the image-side surface 152 of the fifth lens element 150 (the last lens element) according to the 1st embodiment of the present disclosure. The critical point of the fifth lens element in FIG. 39 is only exemplary. The other lens elements may also have one or more critical points.

At least one of the object-side surface and the image-side surface of the fifth lens element of the optical image system can have at least one inflection point. Therefore, it is favorable for correcting off-axis aberrations and field curvature and reducing the size of the optical image system. Please refer to FIG. 39, which shows a schematic view of several inflection points P on the object-side surface 151 of the fifth lens element 150, which is the last lens element, and the image-side surface 152 of the fifth lens element 150 according to the 1st embodiment of the present disclosure. The inflection points of the fifth lens element in FIG. 39 are only exemplary. The other lens elements may also have one or more inflection points.

According to the present disclosure, at least two lens elements of the optical image system can be made of plastic material. Therefore, it is favorable for effectively control manufacturing costs and increasing flexibility of designing lens surfaces so as to achieve good image quality.

According to the present disclosure, at least one lens surface of all lens elements of the optical image system can be aspheric. Therefore, it is favorable for correct off-axis aberrations such as coma and astigmatism.

According to the present disclosure, a thickness along the optical axis of the first lens element can be a maximum value among thicknesses along the optical axis of all lens elements of the optical image system. Therefore, it is favorable for enhancing the control of light rays and resistance against environmental factors at the object side of the optical image system, thereby stabilizing the overall lens structure and image quality.

According to the present disclosure, one of a maximum effective radius of an object-side surface of the first lens element and a maximum effective radius of an image-side surface thereof can be a maximum value among maximum effective radii among object-side surfaces and image-side surfaces of all lens elements of the optical image system. Therefore, it is favorable for ensuring a proper aperture size of the optical image system so as to receive enough light and control the field of view, thereby achieving a telephoto configuration.

When a distance along the optical axis between the object-side surface of the first lens element and the image surface is TL, and the focal length of the optical image system is f, the optical image system of the first image capturing unit can satisfy the following condition: 0.20<TL/f<1.05. Therefore, it is favorable for controlling the total track length and the field of view of the optical image system so as to meet various product specifications. Moreover, the optical image system of the first image capturing unit can also satisfy the following condition: 0.20<TL/f<0.95. Moreover, the optical image system of the first image capturing unit can also satisfy the following condition: 0.30<TL/f<0.85.

When the focal length of the optical image system is f, and half of the maximum field of view of the optical image system is HFOV, the optical image system of the first image capturing unit can satisfy the following condition: 3.2 [mm]<f×tan(HFOV)<8.0 [mm]. Therefore, it is favorable for ensuring a sufficient range of incoming light in the optical image system so as to increase image brightness and quality while increasing flexibility of image processing in applications of the electronic device. Moreover, the optical image system of the first image capturing unit can also satisfy the following condition: 3.8 [mm]<f×tan(HFOV)<8.0 [mm]. Moreover, the optical image system of the first image capturing unit can also satisfy the following condition: 4.20 [mm]<f×tan(HFOV)<8.0 [mm]. Moreover, the optical image system of the second image capturing unit can also satisfy the following condition: 3.80 [mm]<f×tan(HFOV)<8.0 [mm]. Moreover, the optical image system of the second image capturing unit can also satisfy the following condition: 5.0 [mm]<f×tan(HFOV)<9.0 [mm]. Moreover, the optical image system of the third image capturing unit can also satisfy the following condition: 4.50 [mm]<f×tan(HFOV)<9.0 [mm].

When a minimum value among Abbe numbers of all lens elements of the optical image system is Vdmin, the optical image system of the first image capturing unit can satisfy the following condition: 9.0<Vdmin<23.0. Therefore, it is favorable for controlling the light path of the optical image system and balancing light refraction among different wavelengths so as to correct aberrations. Moreover, the optical image system of the first image capturing unit can also satisfy the following condition: 9.0<Vdmin<20.0. Moreover, the optical image system of the first image capturing unit can also satisfy the following condition: 9.0<Vdmin<19.0. Moreover, the optical image system of the second image capturing unit can also satisfy the following condition: 9.0<Vdmin<20.0. Moreover, the optical image system of the third image capturing unit can also satisfy the following condition: 9.0<Vdmin<20.0.

According to the present disclosure, the optical image system can further include an aperture stop. When a distance along the optical axis between the aperture stop and the image-side surface of the last lens element of the optical image system is SD, and the distance along the optical axis between the image-side surface of the last lens element and the image surface of the optical image system is BL, the optical image system of the first image capturing unit can satisfy the following condition: SD/BL<1.80. Therefore, it is favorable for ensuring a proper back focal length of the optical image system so as to configure additional optical elements and effectively control the length of a corresponding lens barrel. Moreover, the optical image system of the first image capturing unit can also satisfy the following condition: 0.20<SD/BL<1.40. Therefore, it is favorable for ensuring a proper back focal length of the optical image system so as to reduce a light incident angle on the image surface, thereby preventing vignetting.

When an Abbe number of a lens element of the optical image system is Vi, at least two lens elements of the optical image system of the first image capturing unit can satisfy the following condition: Vi<23.0. Therefore, it is favorable for effectively correcting aberrations of the optical image system so as to properly arrange among lens elements, thereby increasing design flexibility. Moreover, at least two lens elements of the optical image system of the first image capturing unit can also satisfy the following condition: Vi<21.0.

When the focal length of the optical image system is f, and a focal length of the first lens element of the optical image system is f1, the optical image system of the first image capturing unit can satisfy the following condition: 0.20<f/f1<1.80. Therefore, it is favorable for providing proper light convergence so as to control the size of the optical image system. Moreover, the optical image system of the first image capturing unit can also satisfy the following condition: 0.50<f/f1<4.0.

When the focal length of the optical image system is f, and a focal length of the third lens element of the optical image system is f3, the optical image system of the first image capturing unit can satisfy the following condition: 1.50<f/f3<4.0. Therefore, it is favorable for ensuring sufficient refractive power of the third lens element so as to correct aberrations and control the total track length. Moreover, the optical image system of the first image capturing unit can also satisfy the following condition: 1.90<f/f3<3.0.

When a sum of distances along the optical axis between each of all adjacent lens elements of the optical image system is ΣAT, and the distance along the optical axis between the image-side surface of the last lens element and the image surface is BL, the optical image system of the first image capturing unit can satisfy the following condition: ΣAT/BL<0.30. Therefore, it is favorable for effectively reducing the height of the lens barrel of the optical image system so as to enhance lens assembling and its yield rate. Moreover, the optical image system of the first image capturing unit can also satisfy the following condition: 0.03<ΣAT/BL<0.18.

When the focal length of the optical image system is f, and an entrance pupil diameter of the optical image system is EPD, the optical image system of the first image capturing unit can satisfy the following condition: 3.0≤f/EPD<4.5. Therefore, it is favorable for effectively controlling the entrance pupil diameter and preventing the electronic device being overly large due to the small field of view of the folded optical path from the optical image system therein. Moreover, the optical image system of the first image capturing unit can also satisfy the following condition: 3.0≤f/

EPD<4.0. Moreover, the optical image system of the first image capturing unit can also satisfy the following condition: 3.0≤f/EPD≤3.35.

When an f-number of the optical image system is Fno, and the entrance pupil diameter of the optical image system is EPD, the optical image system of the first image capturing unit can satisfy the following condition: 18.0 [mm]<Fno×EPD<40.0 [mm]. Therefore, it is favorable for maintaining the aperture of the optical image system at a proper ratio so as to provide good image quality. Moreover, the optical image system of the first image capturing unit can also satisfy the following condition: 25.0 [mm]<Fno×EPD<35.0 [mm].

When the entrance pupil diameter of the optical image system is EPD, and a maximum image height of the optical image system (half of a diagonal length of an effective photosensitive area of an image sensor) is ImgH, the optical image system of the first image capturing unit can satisfy the following condition: 0.75<EPD/ImgH<2.20. Therefore, it is favorable for controlling the entrance pupil diameter and the image height so as to ensure sufficient incoming light while achieving telephoto functionality. Moreover, the optical image system of the first image capturing unit can also satisfy the following condition: 0.95<EPD/ImgH<2.00.

When an Abbe number of a lens element having positive refractive power of the optical image system is Vp, at least one lens element with positive refractive power of the optical image system of the first image capturing unit can satisfy the following condition: Vp<30.0. Therefore, it is favorable for providing a telephoto configuration so as to capture detailed images from afar. Moreover, at least one lens element with positive refractive power of the optical image system of the first image capturing unit can also satisfy the following condition: Vp<25.0. Moreover, at least one lens element with positive refractive power of the optical image system of the first image capturing unit can also satisfy the following condition: Vp<23.0. Moreover, at least one lens element with positive refractive power of the optical image system of the first image capturing unit can also satisfy the following condition: Vp<21.0. Moreover, at least one lens element with positive refractive power of the optical image system of the first image capturing unit can also satisfy the following condition: Vp<20.0.

When the maximum field of view of the optical image system is FOV, the optical image system of the first image capturing unit can satisfy the following condition: 15 [deg.]<FOV<50 [deg.]. Therefore, it is favorable for shooting images within a proper range so as to obtain image information beyond those viewable by the naked eye. Moreover, the optical image system of the second image capturing unit can satisfy the following condition: 70 [deg.]<FOV<130 [deg.]. Therefore, it is favorable for providing a standard field of view so as to capture images with a large amount of contents.

When the focal length of the optical image system is f, and the maximum image height of the optical image system is ImgH, the optical image system of the first image capturing unit can satisfy the following condition: 2.6<f/ImgH<15.0. Therefore, it is favorable for providing a proper field of view of the optical image system so as to enable telephoto photography with image capturing from afar. Moreover, the optical image system of the first image capturing unit can satisfy the following condition: 3.5<f/ImgH<9.0.

When an Abbe number of the fourth lens element of the optical image system is V4, and an Abbe number of the fifth lens element, which can be the last lens element, of the optical image system is V5, the optical image system of the first image capturing unit can satisfy the following condition: 0.10<V4/V5<0.95. Therefore, it is favorable for arranging lens materials at the image side of the optical image system so as to optimize image quality. Moreover, the optical image system of the first image capturing unit can satisfy the following condition: 0.10<V4/V5<0.70. Moreover, the optical image system of the first image capturing unit can satisfy the following condition: 0.20<V4/V5<0.45.

According to the present disclosure, at least one lens element of the optical image system can have a maximum effective radius range being non-circular. Alternatively, according to the present disclosure, at least one lens element of the optical image system can be a non-circular lens element. Moreover, at least two lens elements of the optical image system can also be non-circular lens elements. Moreover, at least three lens elements of the optical image system can also be non-circular lens elements. When a minimum distance from a center to an outer edge of the non-circular lens element is Dmin, and a maximum distance from the center to the outer edge of the non-circular lens element is Dmax, the optical image system of the first image capturing unit can satisfy the following condition: Dmin/Dmax<0.80. Therefore, it is favorable for effectively reducing the size of a corresponding image capturing unit so as to provide a smaller and easy-to-carry electronic device, thereby meeting the market requirement of compactness. Please refer to FIG. 40, which shows a schematic view of Dmin and Dmax according to the 1st embodiment of the present disclosure.

When a distance along the optical axis between the second lens element and the third lens element of the optical image system is T23, and the sum of distances along the optical axis between each of all adjacent lens elements of the optical image system is ΣAT, the optical image system of the third image capturing unit can satisfy the following condition: 0.30<T23/ΣAT<0.90. Therefore, it is favorable for reducing the refraction angles between the second lens element and the third lens element with respect to the lens surfaces so as to properly facilitate long distance shots. Moreover, the optical image system of the third image capturing unit can satisfy the following condition: 0.40<T23/ΣAT<0.90. Moreover, the optical image system of the third image capturing unit can satisfy the following condition: 0.50<T23/ΣAT<0.90.

When an Abbe number of the third lens element of the optical image system is V3, the optical image system of the third image capturing unit can satisfy the following condition: 10.0<V3<40.0. Therefore, it is favorable for correcting chromatic aberration and controlling the light path. Moreover, the optical image system of the third image capturing unit can satisfy the following condition: 25.0<V3<38.0.

When the Abbe number of a lens element of the optical image system is Vi, a refractive index of the lens element is Ni, and a minimum value of Vi/Ni is (Vi/Ni)min, the optical image system of the first image capturing unit can satisfy the following condition: 3.0<(Vi/Ni)min<12.0. Therefore, it is favorable for effectively adjusting focus positions among different wavelengths so as to prevent image overlaps. Moreover, the optical image system of the first image capturing unit can satisfy the following condition: 4.0<(Vi/Ni)min<11.0.

When a maximum value among maximum effective radii of all lens surfaces of the optical image system is Ymax, and a minimum value among maximum effective radii of all lens surfaces of the optical image system is Ymin, the optical image system of the first image capturing unit can satisfy the following condition: 1.0<Ymax/Ymin<1.60. Therefore, it is favorable for balancing the size of lens elements and reducing the manufacture sensitivity of the optical image system so as to properly control the dimensional tolerance in molding the lens elements.

When the entrance pupil diameter of the optical image system is EPD, and the sum of distances along the optical axis between each of all adjacent lens elements of the optical image system is ΣAT, the optical image system of the first image capturing unit can satisfy the following condition: 2.20<EPD/ΣAT. Therefore, it is favorable for increasing the incoming light range and space utilization of the optical image system so as to prevent higher assembling difficulty due to the corresponding lens barrel being overly long. Moreover, the optical image system of the first image capturing unit can satisfy the following condition: 2.50<EPD/ΣAT<9.0.

When the distance along the optical axis between the image-side surface of the last lens element and the image surface is BL, and the maximum image height of the optical image system is ImgH, the optical image system of the first image capturing unit can satisfy the following condition: 1.60<BL/ImgH<5.5. Therefore, it is favorable for providing a proper back focal length of the optical image system so as to configure additional optical elements; and it is also favorable for controlling the incident angle and height on the image surface so as to ensure sufficient overall and peripheral image brightness. Moreover, the optical image system of the first image capturing unit can satisfy the following condition: 2.20<BL/ImgH<5.0.

When a maximum effective radius of the object-side surface of the first lens element is Y11, and the maximum image height of the optical image system is ImgH, the optical image system of the first image capturing unit can satisfy the following condition: 0.70<Y11/ImgH<1.20. Therefore, it is favorable for ensuring similar light ranges at the light incident position and the image surface of the optical image system so as to have sufficient image brightness; and it is also favorable for enhancing the symmetry of the optical image system so as to increase image quality. Moreover, the optical image system of the first image capturing unit can satisfy the following condition: 0.80<Y11/ImgH<1.10. Please refer to FIG. 39, which shows a schematic view of Y11 according to the 1st embodiment of the present disclosure.

According to the present disclosure, the aforementioned features and conditions can be utilized in numerous combinations so as to achieve corresponding effects.

According to the present disclosure, the lens elements of the optical image system can be made of either glass or plastic material. When the lens elements are made of glass material, the refractive power distribution of the optical image system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the optical image system can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. In addition, the additive may also be coated on the lens surfaces so as to provide abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical image system, based on the corresponding image sensor, can be flat or curved, especially a curved surface being concave facing towards the object side of the optical image system.

According to the present disclosure, an image correction unit, such as a field flattener, can be optionally disposed between the lens element closest to the image side of the optical image system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical image system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical image system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical image system and thereby provides a wider field of view for the same.

According to the present disclosure, the optical image system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation. It is noted that the optical image system of the following embodiments is not limited to be applied to specific image capturing units; that is, the optical image system of the first image capturing unit, the second image capturing unit or the third image capturing unit can be selected from the following embodiments.

1st Embodiment

Figure 2:
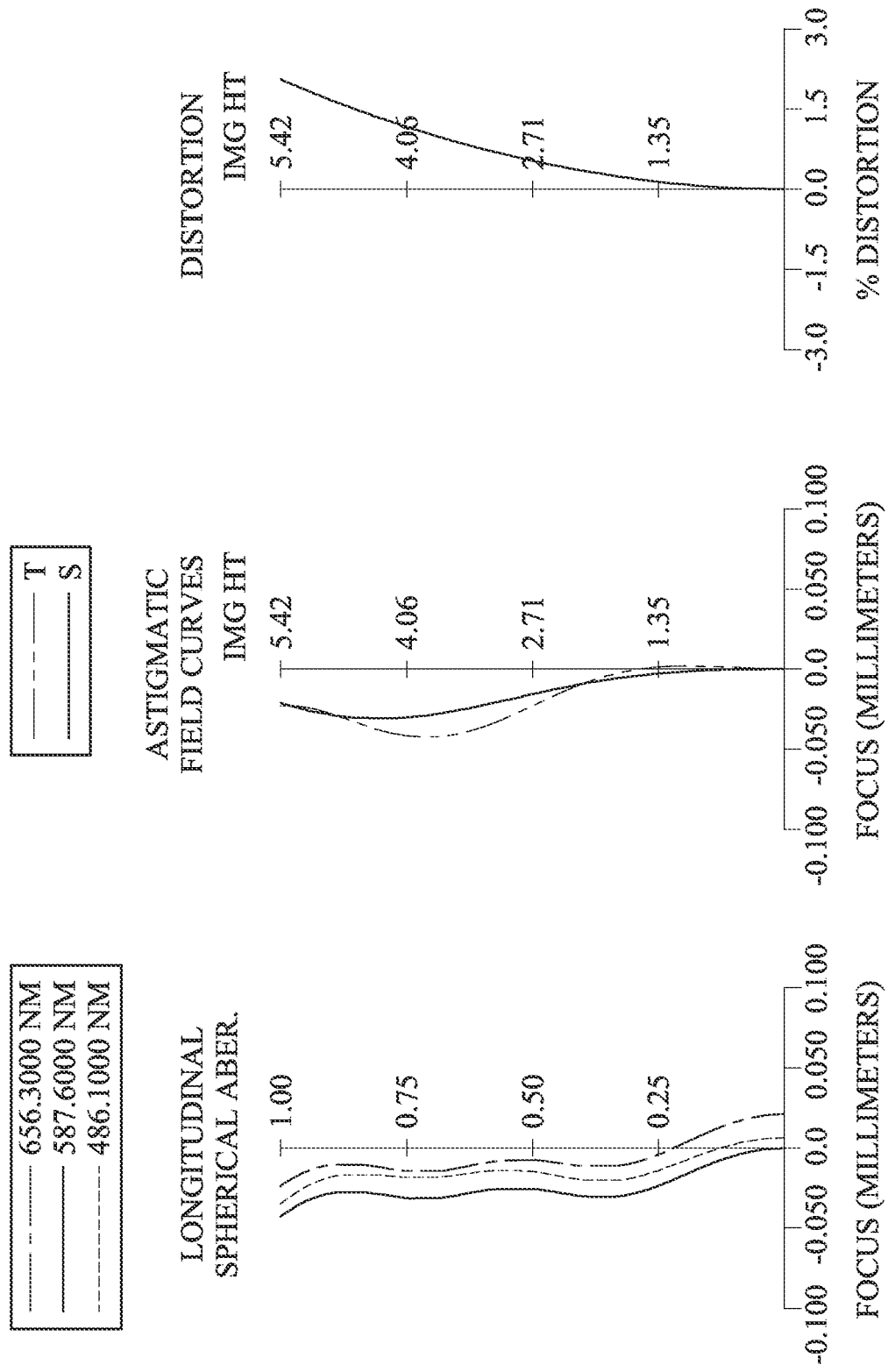
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical image system (its reference numeral is omitted) of the present disclosure and an image sensor 199. The optical image system includes, in order from an object side to an image side along an optical path, an aperture stop 100, a first lens element 110, a second lens element 120, a third lens element 130, a fourth lens element 140, a fifth lens element 150, a filter 193 and an image surface 196, wherein the fifth lens element 150 can be considered as a last lens element in this embodiment. The optical image system includes five lens elements (110, 120, 130, 140 and 150) with no additional lens element disposed between each of the adjacent five lens elements, wherein there is an air gap along an optical axis between each of all adjacent lens elements. In this embodiment, an air gap along the optical axis between two adjacent lens elements means the two adjacent lens elements are two non-cemented lens elements in paraxial regions thereof.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point. The image-side surface 152 of the fifth lens element 150 has at least one convex critical point in an off-axis region thereof.

The filter 193 is made of glass material and located between the fifth lens element 150 and the image surface 196, and will not affect the focal length of the optical image system. The image sensor 199 is disposed on or near the image surface 196 of the optical image system.

The equation of the aspheric surface profiles of the aforementioned lens elements of the 1st embodiment is expressed as follows:

$$X(Y) = (Y^2/R) / \left(1 + sqrt\left(1 - (1+k) \times (Y/R)^2\right)\right) + \sum_i (Ai) \times (Y^i),$$

where,

X is the displacement in parallel with the optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical image system of the image capturing unit according to the 1st embodiment, when a focal length of the optical image system is f, an equivalent focal length of the optical image system is fs, an f-number of the optical image system is Fno, and half of a maximum field of view of the optical image system is HFOV, these parameters have the following values: f=26.12 millimeters (mm), fs=106.17 millimeters, Fno=3.25, HFOV=11.5 degrees (deg.).

When an Abbe number of the third lens element 130 is V3, the following condition is satisfied: V3=56.0.

When a minimum value among Abbe numbers of all lens elements of the optical image system is Vdmin, the following condition is satisfied: Vdmin=18.4. In this embodiment, among the first through fifth lens elements (110-150), an Abbe number of the second lens element 120 is smaller than Abbe numbers of the other lens elements, and Vdmin is equal to the Abbe number of the second lens element 120.

When an Abbe number of a lens element having positive refractive power of the optical image system is Vp, the following conditions are satisfied: Vp=56.0; 20.4; and 56.0, which are respectively an Abbe number of the first lens element 110 with positive refractive power, an Abbe number of the fourth lens element 140 with positive refractive power and an Abbe number of the fifth lens element 150 with positive refractive power.

When the Abbe number of the fourth lens element 140 is V4, and the Abbe number of the fifth lens element 150 is V5, the following condition is satisfied: V4/V5=0.36.

When the Abbe number of the first lens element 110 is V1, the Abbe number of the second lens element 120 is V2, the Abbe number of the third lens element 130 is V3, the Abbe number of the fourth lens element 140 is V4, the Abbe number of the fifth lens element 150 is V5, an Abbe number of the i-th lens element (one lens element) is Vi, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the i-th lens element (one lens element) is Ni, and a minimum value of Vi/Ni is (Vi/Ni)min, the following condition is satisfied: (Vi/Ni)min=10.96. In this embodiment, among the first through fifth lens elements (110-150), the value of Vi/Ni of the second lens element 120 (i.e., V2/N2) is smaller than the values of Vi/Ni of the other lens elements, and the value of (Vi/Ni)min is equal to the value of Vi/Ni of the second lens element 120 (i.e., V2/N2).

When a distance along the optical axis between the second lens element 120 and the third lens element 130 is T23, and a sum of distances along the optical axis between each of all adjacent lens elements of the optical image system is ΣAT, the following condition is satisfied: T23/ΣAT=0.28. In this embodiment, a distance along the optical axis between two optical surfaces or elements is a distance in a paraxial region between any two of lens surface, aperture stop, stop, image surface, etc. In this embodiment, a distance along the optical axis between two adjacent lens elements is a distance in a paraxial region between two adjacent lens surfaces of the two adjacent lens elements. In this embodiment, ΣAT is a sum of axial distances between the first lens element 110 and the second lens element 120, the second lens element 120 and the third lens element 130, the third lens element 130 and the fourth lens element 140, and the fourth lens element 140 and the fifth lens element 150.

When the focal length of the optical image system is f, and a focal length of the first lens element 110 is f1, the following condition is satisfied: f/f1=1.76.

When the focal length of the optical image system is f, and a focal length of the third lens element 130 is f3, the following condition is satisfied: f/f3=−0.47.

When a distance along the optical axis between the object-side surface 111 of the first lens element 110 and the image surface 196 is TL, and the focal length of the optical image system is f, the following condition is satisfied: TL/f=1.00.

When the focal length of the optical image system is f, and an entrance pupil diameter of the optical image system is EPD, the following condition is satisfied: f/EPD=3.25.

When the focal length of the optical image system is f, and a maximum image height of the optical image system is ImgH, the following condition is satisfied: f/ImgH=4.82.

When the entrance pupil diameter of the optical image system is EPD, and the maximum image height of the optical image system is ImgH, the following condition is satisfied: EPD/ImgH=1.48.

When a maximum effective radius of the object-side surface 111 of the first lens element 110 is Y11, and the maximum image height of the optical image system is ImgH, the following condition is satisfied: Y11/ImgH=0.74.

When the entrance pupil diameter of the optical image system is EPD, and the sum of distances along the optical axis between each of all adjacent lens elements of the optical image system is ΣAT, the following condition is satisfied: EPD/ΣAT=3.56.

When the sum of distances along the optical axis between each of all adjacent lens elements of the optical image system is ΣAT, and a distance along the optical axis between the image-side surface 152 of the fifth lens element 150 and the image surface 196 is BL, the following condition is satisfied: ΣAT/BL=0.14.

When the distance along the optical axis between the image-side surface 152 of the fifth lens element 150 and the image surface 196 is BL, and the maximum image height of the optical image system is ImgH, the following condition is satisfied: BL/ImgH=2.92.

When a distance along the optical axis between the aperture stop 100 and the image-side surface 152 of the fifth lens element 150 of the optical image system is SD, and the distance along the optical axis between the image-side surface 152 of the fifth lens element 150 and the image surface 196 is BL, the following condition is satisfied: SD/BL=0.61.

When a maximum value among maximum effective radii of all lens surfaces of the optical image system is Ymax, and a minimum value among maximum effective radii of all lens surfaces of the optical image system is Ymin, the following condition is satisfied: Ymax/Ymin=1.12.

When the focal length of the optical image system is f, and half of the maximum field of view of the optical image system is HFOV, the following condition is satisfied: f×tan(HFOV)=5.31 [mm].

When the f-number of the optical image system is Fno, and the entrance pupil diameter of the optical image system is EPD, the following condition is satisfied: Fno×EPD=26.12 [mm].

When the maximum field of view of the optical image system is FOV, the following condition is satisfied: FOV=23.00 [deg.].

The detailed optical data of the 1st embodiment are shown in Table 1 and the aspheric surface data are shown in Table 2 below.

TABLE 1

1st Embodiment
f = 26.12 mm, Fno = 3.25, HFOV = 11.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.717 | | | | |
| 2 | Lens 1 | 10.512 | (ASP) | 2.770 | Plastic | 1.544 | 56.0 | 14.80 |
| 3 | | −31.143 | (ASP) | 1.434 | | | | |
| 4 | Lens 2 | 12.847 | (ASP) | 1.201 | Plastic | 1.679 | 18.4 | −12.55 |
| 5 | | 4.931 | (ASP) | 0.639 | | | | |
| 6 | Lens 3 | 33.299 | (ASP) | 1.600 | Plastic | 1.544 | 56.0 | −55.61 |
| 7 | | 15.579 | (ASP) | 0.104 | | | | |
| 8 | Lens 4 | 24.092 | (ASP) | 1.403 | Plastic | 1.660 | 20.4 | 20.19 |
| 9 | | −29.114 | (ASP) | 0.080 | | | | |
| 10 | Lens 5 | 4.111 | (ASP) | 1.093 | Plastic | 1.544 | 56.0 | 211.84 |
| 11 | | 3.864 | (ASP) | 12.000 | | | | |
| 12 | Filter | Plano | | 0.452 | Glass | 1.517 | 64.2 | — |
| 13 | | Plano | | 3.356 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k= | −7.3044E−01 | 1.4137E+01 | −1.9528E+00 | 2.9944E−01 | 2.7537E+01 |
| A4= | −9.4144E−05 | 7.5771E−05 | −4.1687E−03 | −7.8053E−03 | 6.6760E−04 |
| A6= | −1.9565E−05 | 4.2602E−05 | 7.0561E−04 | 1.4521E−03 | 6.7260E−04 |
| A8= | 2.8684E−06 | −4.8406E−07 | −7.5306E−05 | −2.0161E−04 | −1.0739E−04 |
| A10= | −2.2662E−07 | −2.7614E−07 | 4.7163E−06 | 1.5219E−05 | 8.3460E−06 |
| A12= | 8.6112E−09 | 1.9767E−08 | −1.5673E−07 | −5.8729E−07 | −2.4717E−07 |
| A14= | −1.2768E−10 | −4.2288E−10 | 2.0884E−09 | 8.1326E−09 | −1.9428E−09 |
| A16= | — | — | — | — | 1.6827E−10 |

| Surface # | 7 | 8 | 9 | 10 | 11 |
|---|---|---|---|---|---|
| k= | −6.4510E+01 | 3.3648E+01 | −5.5038E+00 | −2.8623E+00 | −2.5067E+00 |
| A4= | 2.2745E−03 | 3.4078E−03 | 2.2606E−03 | −4.6195E−03 | −4.4431E−03 |
| A6= | 1.2573E−05 | −5.1455E−04 | −5.9327E−04 | −4.5716E−04 | −4.2983E−05 |
| A8= | −2.3728E−05 | 7.4670E−05 | 1.1440E−04 | 9.1440E−05 | 7.1127E−06 |
| A10= | 4.1722E−06 | −7.5137E−06 | −1.4453E−05 | −1.2160E−05 | 8.6461E−07 |
| A12= | −3.6071E−07 | 4.5456E−07 | 1.1178E−06 | 1.0459E−06 | −1.0175E−07 |
| A14= | 1.9111E−08 | −1.2072E−08 | −4.6022E−08 | −4.7650E−08 | 3.0479E−09 |
| A16= | −4.6116E−10 | 4.7605E−11 | 7.9795E−10 | 8.1422E−10 | −1.7423E−11 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
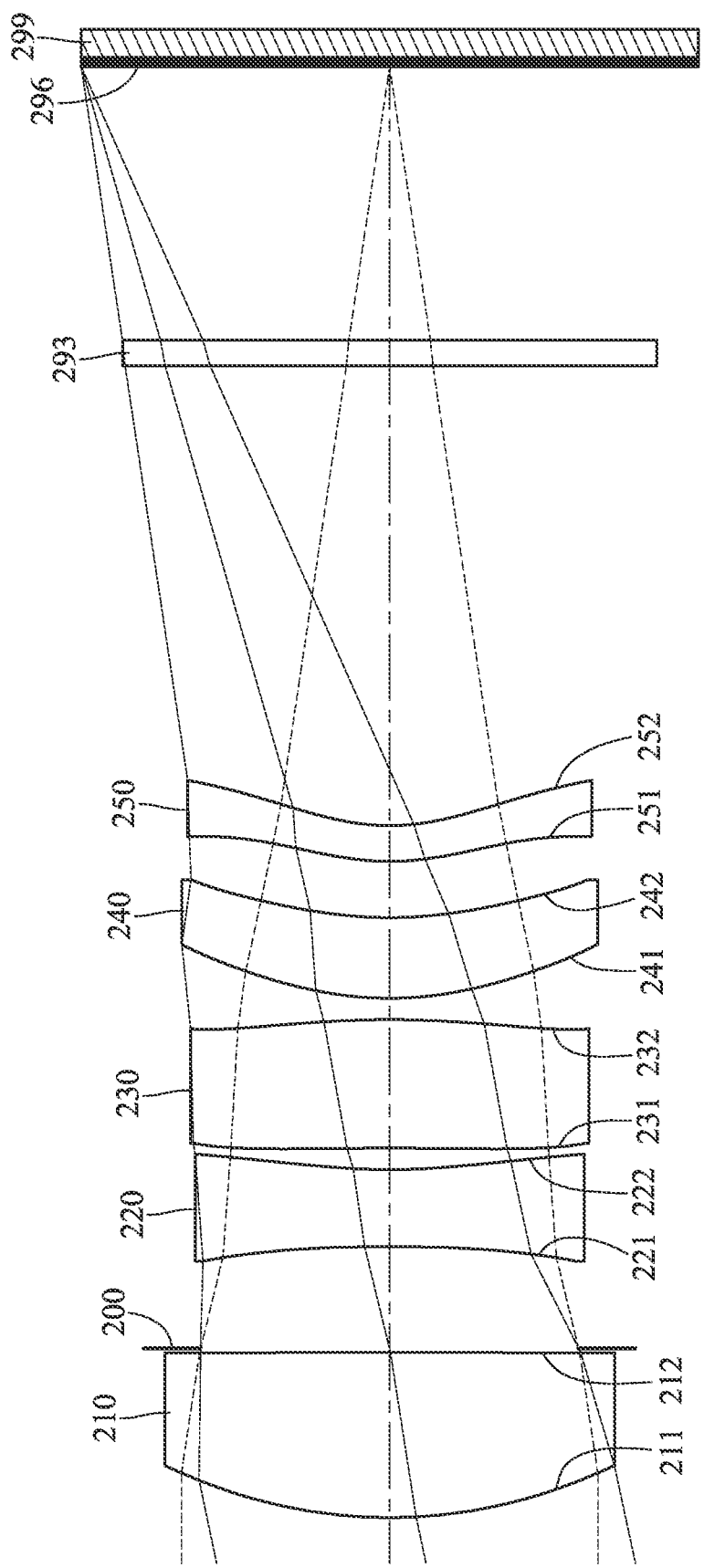
FIG. 3 is a schematic view of an image capturing unit according to the 2nd embodiment of the present disclosure.
Figure 4:
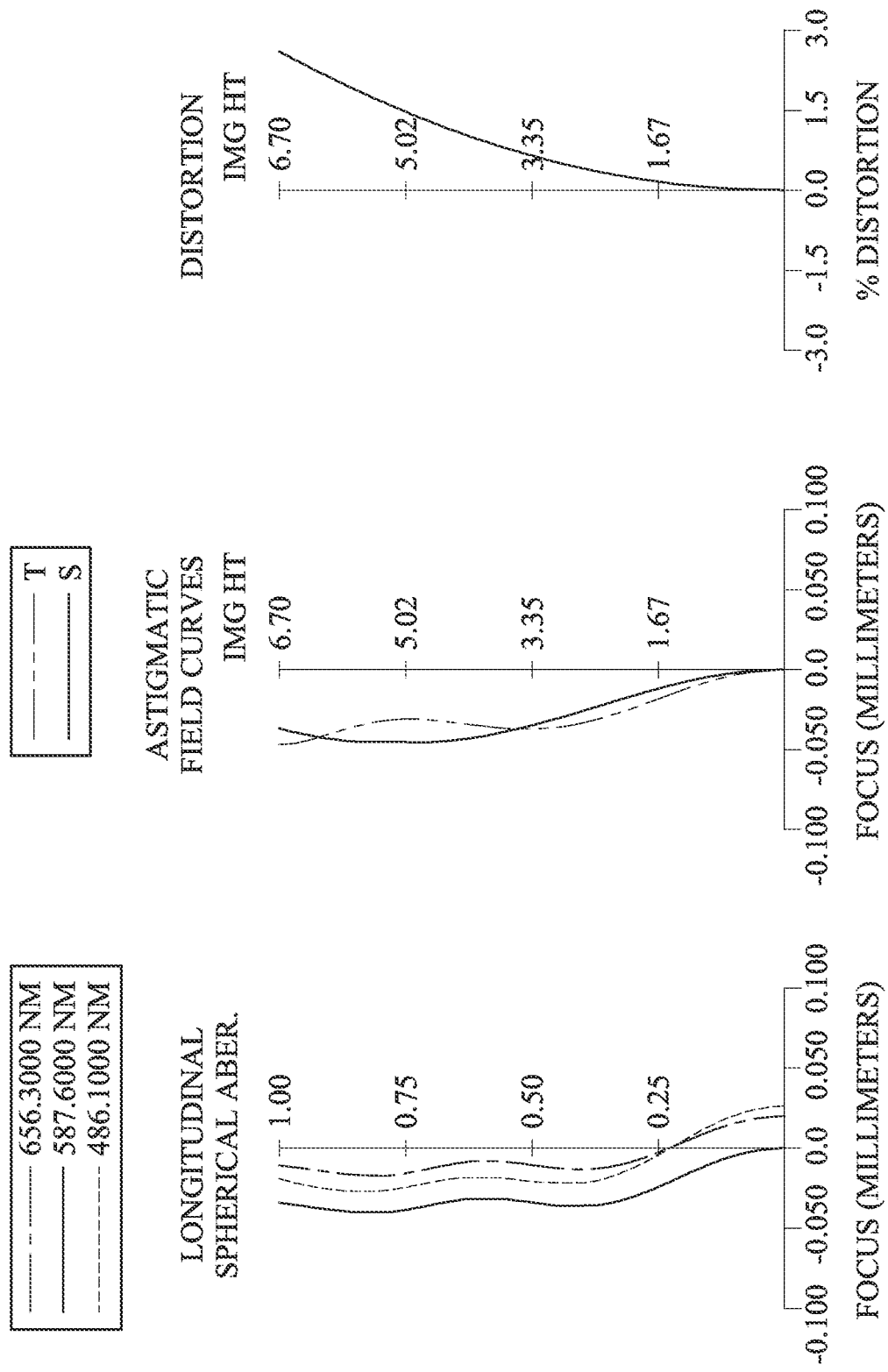
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical image system (its reference numeral is omitted) of the present disclosure and an image sensor 299. The optical image system includes, in order from an object side to an image side along an optical path, a first lens element 210, an aperture stop 200, a second lens element 220, a third lens element 230, a fourth lens element 240, a fifth lens element 250, a filter 293 and an image surface 296, wherein the fifth lens element 250 can be considered as a last lens element in this embodiment. The optical image system includes five lens elements (210, 220, 230, 240 and 250) with no additional lens element disposed between each of the adjacent five lens elements, wherein there is an air gap along an optical axis between each of all adjacent lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has at least one inflection point. The image-side surface 252 of the fifth lens element 250 has at least one inflection point.

The filter 293 is made of glass material and located between the fifth lens element 250 and the image surface 296, and will not affect the focal length of the optical image system. The image sensor 299 is disposed on or near the image surface 296 of the optical image system.

The detailed optical data of the 2nd embodiment are shown in Table 3 and the aspheric surface data are shown in Table 4 below.

TABLE 3

2nd Embodiment
f = 30.76 mm, Fno = 3.40, HFOV = 12.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.865 | (ASP) | 3.600 | Plastic | 1.545 | 56.1 | 19.13 |
| 2 | | −228.092 | (ASP) | 0.078 | | | | |
| 3 | Ape. Stop | Plano | | 2.216 | | | | |
| 4 | Lens 2 | −53.311 | (ASP) | 1.675 | Plastic | 1.679 | 18.4 | −14.16 |
| 5 | | 11.883 | (ASP) | 0.469 | | | | |
| 6 | Lens 3 | −132.310 | (ASP) | 2.798 | Plastic | 1.614 | 26.0 | 34.00 |
| 7 | | −18.172 | (ASP) | 0.464 | | | | |
| 8 | Lens 4 | 7.699 | (ASP) | 1.756 | Plastic | 1.660 | 20.4 | 51.52 |
| 9 | | 9.050 | (ASP) | 1.224 | | | | |
| 10 | Lens 5 | 5.740 | (ASP) | 0.779 | Plastic | 1.534 | 56.0 | −75.50 |
| 11 | | 4.788 | (ASP) | 10.000 | | | | |
| 12 | Filter | Plano | | 0.560 | Glass | 1.517 | 64.2 | — |
| 13 | | Plano | | 5.957 | | | | |
| 14 | Image | Plano | | | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k= | −1.3308E−01 | 5.0000E+01 | −7.4366E+00 | −8.9604E+00 | 5.0000E+01 |
| A4= | 8.2497E−08 | 1.0424E−05 | −2.0575E−03 | −3.7062E−03 | −4.5267E−04 |
| A6= | −2.9068E−06 | 5.9975E−06 | 2.3862E−04 | 5.1337E−04 | 2.2003E−04 |
| A8= | 2.9662E−07 | 1.3628E−07 | −1.6854E−05 | −4.4442E−05 | −2.3879E−05 |
| A10= | −1.7249E−08 | −3.4850E−08 | 6.9977E−07 | 2.2000E−06 | 1.2352E−06 |
| A12= | 4.8577E−10 | 1.2224E−09 | −1.6671E−08 | −5.5963E−08 | −2.2187E−08 |
| A14= | −6.7965E−12 | −1.9042E−11 | 1.5441E−10 | 5.4098E−10 | −1.8721E−10 |
| A16= | — | — | — | — | 7.0590E−12 |

| Surface # | 7 | 8 | 9 | 10 | 11 |
|---|---|---|---|---|---|
| k= | −6.9368E+01 | −5.0299E+00 | −2.0675E+01 | −6.9830E+00 | −3.0456E+00 |
| A4= | 2.9644E−04 | 1.0339E−03 | 1.6359E−03 | −8.9117E−04 | −2.0288E−03 |
| A6= | −1.0693E−05 | −1.5921E−04 | −2.2328E−04 | −1.8407E−04 | 1.8788E−05 |
| A8= | −2.9664E−06 | 1.6510E−05 | 2.6137E−05 | 2.1176E−05 | −5.3182E−07 |
| A10= | 5.6599E−07 | −1.0773E−06 | −2.1449E−06 | −1.6890E−06 | 1.6807E−07 |
| A12= | −3.7415E−08 | 4.1990E−08 | 1.0706E−07 | 9.4962E−08 | −7.0935E−09 |
| A14= | 1.2484E−09 | −8.0006E−10 | −2.6703E−09 | −2.8730E−09 | 5.6436E−11 |
| A16= | −1.6107E−11 | 4.9769E−12 | 2.4415E−11 | 3.4057E−11 | 8.9925E−13 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 30.76 | f/EPD | 3.40 |
| fs [mm] | 101.62 | f/ImgH | 4.59 |
| Fno | 3.40 | EPD/ImgH | 1.35 |
| HFOV [deg.] | 12.0 | Y11/ImgH | 0.73 |
| V3 | 26.0 | EPD/ΣAT | 2.03 |
| Vdmin | 18.4 | ΣAT/BL | 0.27 |
| Vp | 56.1; 26.0; 20.4 | BL/ImgH | 2.47 |
| V4/V5 | 0.36 | SD/BL | 0.69 |
| (Vi/Ni)min | 10.96 | Ymax/Ymin | 1.20 |
| T23/ΣAT | 0.11 | f × tan(HFOV) [mm] | 6.54 |
| f/f1 | 1.61 | Fno × EPD [mm] | 30.76 |
| f/f3 | 0.90 | FOV [deg.] | 24.00 |
| TL/f | 1.03 | — | — |

3rd Embodiment

Figure 5:
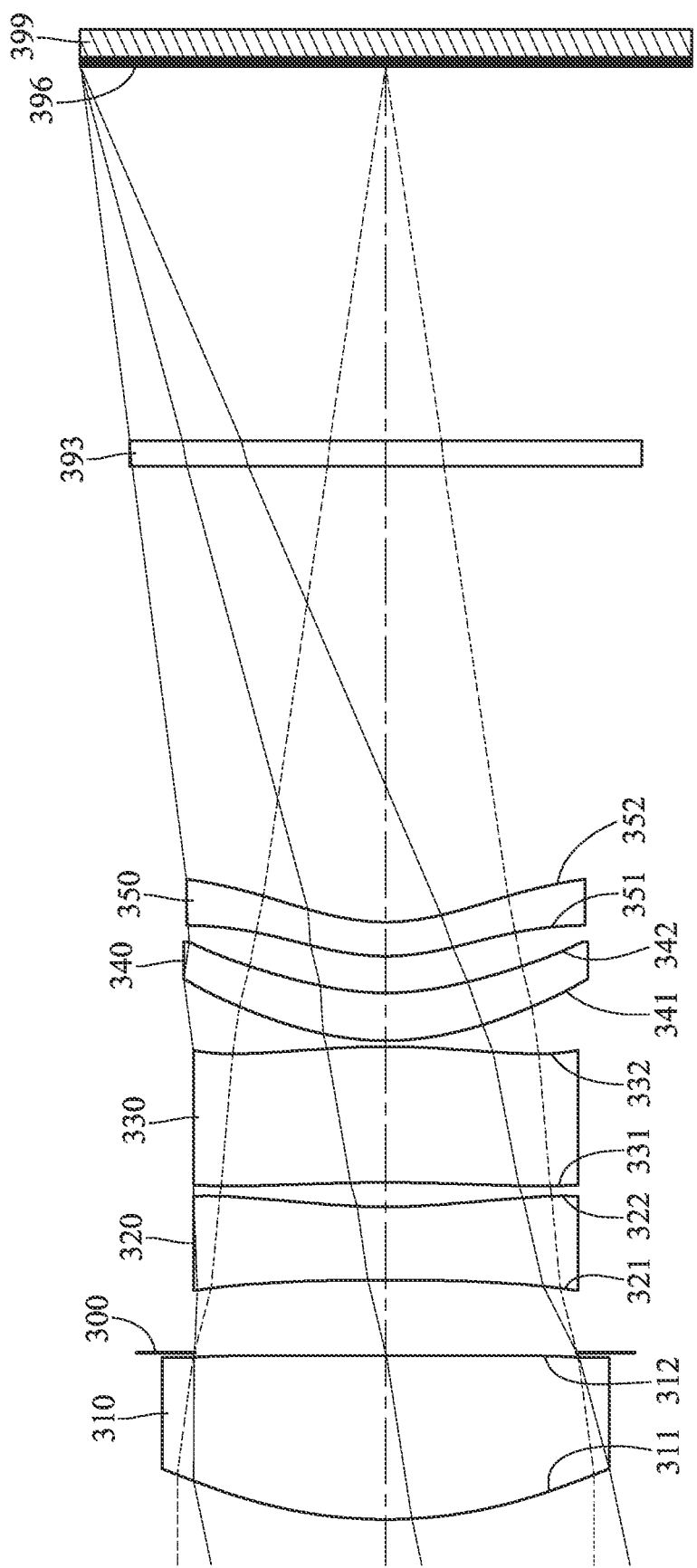
FIG. 5 is a schematic view of an image capturing unit according to the 3rd embodiment of the present disclosure.
Figure 6:
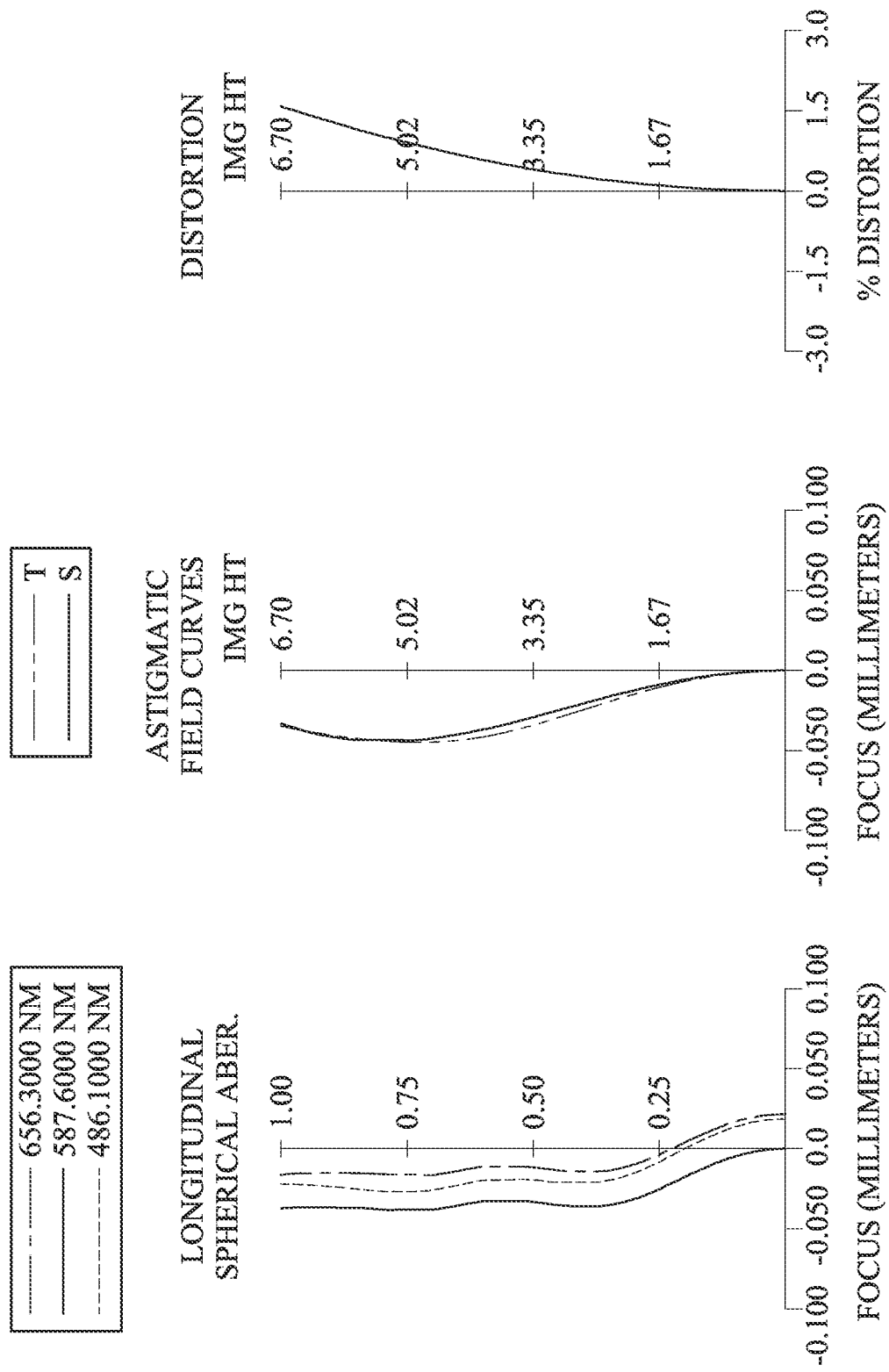
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical image system (its reference numeral is omitted) of the present disclosure and an image sensor 399. The optical image system includes, in order from an object side to an image side along an optical path, a first lens element 310, an aperture stop 300, a second lens element 320, a third lens element 330, a fourth lens element 340, a fifth lens element 350, a filter 393 and an image surface 396, wherein the fifth lens element 350 can be considered as a last lens element in this embodiment. The optical image system includes five lens elements (310, 320, 330, 340 and 350) with no additional lens element disposed between each of the adjacent five lens elements, wherein there is an air gap along an optical axis between each of all adjacent lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point.

The filter 393 is made of glass material and located between the fifth lens element 350 and the image surface 396, and will not affect the focal length of the optical image system. The image sensor 399 is disposed on or near the image surface 396 of the optical image system.

The detailed optical data of the 3rd embodiment are shown in Table 5 and the aspheric surface data are shown in Table 6 below.

TABLE 5

3rd Embodiment
f = 31.06 mm, Fno = 3.40, HFOV = 12.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.375 | (ASP) | 3.600 | Plastic | 1.545 | 56.1 | 19.06 |
| 2 | | 7417.427 | (ASP) | 0.054 | | | | |
| 3 | Ape. Stop | Plano | | 1.595 | | | | |
| 4 | Lens 2 | −186.848 | (ASP) | 1.607 | Plastic | 1.679 | 18.4 | −16.80 |
| 5 | | 12.193 | (ASP) | 0.536 | | | | |
| 6 | Lens 3 | −41.424 | (ASP) | 2.982 | Plastic | 1.651 | 21.5 | 35.26 |
| 7 | | −15.189 | (ASP) | 0.130 | | | | |
| 8 | Lens 4 | 6.199 | (ASP) | 1.047 | Plastic | 1.660 | 20.4 | 3414.06 |
| 9 | | 5.798 | (ASP) | 0.805 | | | | |
| 10 | Lens 5 | 4.830 | (ASP) | 0.750 | Plastic | 1.534 | 56.0 | −1968.95 |
| 11 | | 4.548 | (ASP) | 10.000 | | | | |

TABLE 5-continued

3rd Embodiment
f = 31.06 mm, Fno = 3.40, HFOV = 12.0 deg.

| Surface # | | Curvature Radius | Thickness | Material | Index | Abbe # | Focal Length |
|---|---|---|---|---|---|---|---|
| 12 | Filter | Plano | 0.560 | Glass | 1.517 | 64.2 | — |
| 13 | | Plano | 8.214 | | | | |
| 14 | Image | Plano | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k= | −3.7059E−01 | −9.0000E+01 | −1.8251E+01 | −1.1307E+01 | −4.3094E+01 |
| A4= | −2.3840E−05 | −9.5852E−05 | −2.0123E−03 | −3.8160E−03 | −4.1435E−04 |
| A6= | −5.5416E−06 | 4.1681E−06 | 2.3585E−04 | 5.1289E−04 | 2.1840E−04 |
| A8= | 2.9208E−07 | 1.8694E−08 | −1.6869E−05 | −4.4473E−05 | −2.3805E−05 |
| A10= | −1.9716E−08 | −4.2064E−08 | 7.0885E−07 | 2.1848E−06 | 1.2412E−06 |
| A12= | 5.0832E−10 | 1.3514E−09 | −1.7836E−08 | −5.5940E−08 | −2.3130E−08 |
| A14= | −7.3720E−12 | −1.4466E−11 | 2.0009E−10 | 5.3627E−10 | −2.5683E−10 |
| A16= | — | — | — | — | 8.9508E−12 |

| Surface # | 7 | 8 | 9 | 10 | 11 |
|---|---|---|---|---|---|
| k= | −7.7206E+01 | −4.2992E+00 | −1.2143E+01 | −6.2975E+00 | −3.3277E+00 |
| A4= | 5.4668E−04 | 1.0492E−03 | 1.8323E−03 | −8.7351E−04 | −2.1803E−03 |
| A6= | 2.6392E−06 | −1.5430E−04 | −2.2306E−04 | −1.8530E−04 | 1.8304E−05 |
| A8= | −2.9809E−06 | 1.6736E−05 | 2.5659E−05 | 2.1446E−05 | −3.6513E−07 |
| A10= | 5.5885E−07 | −1.0873E−06 | −2.1316E−06 | −1.6880E−06 | 1.7755E−07 |
| A12= | −3.6933E−08 | 4.1635E−08 | 1.0798E−07 | 9.4639E−08 | −7.3825E−09 |
| A14= | 1.2583E−09 | −7.7782E−10 | −2.7107E−09 | −2.8539E−09 | 1.3052E−12 |
| A16= | −1.8223E−11 | 4.3106E−12 | 2.3726E−11 | 3.2775E−11 | 2.6832E−12 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 31.06 | f/EPD | 3.40 |
| fs [mm] | 101.62 | f/ImgH | 4.64 |
| Fno | 3.40 | EPD/ImgH | 1.36 |
| HFOV [deg.] | 12.0 | Y11/ImgH | 0.73 |
| V3 | 21.5 | EPD/ΣAT | 2.93 |
| Vdmin | 18.4 | ΣAT/BL | 0.17 |
| Vp | 56.1; 21.5; 20.4 | BL/ImgH | 2.80 |
| V4/V5 | 0.36 | SD/BL | 0.50 |
| (Vi/Ni)min | 10.96 | Ymax/Ymin | 1.19 |
| T23/ΣAT | 0.17 | f × tan(HFOV) [mm] | 6.60 |
| f/f1 | 1.63 | Fno × EPD [mm] | 31.06 |
| f/f3 | 0.88 | FOV [deg.] | 24.00 |
| TL/f | 1.03 | — | — |

4th Embodiment

Figure 7:
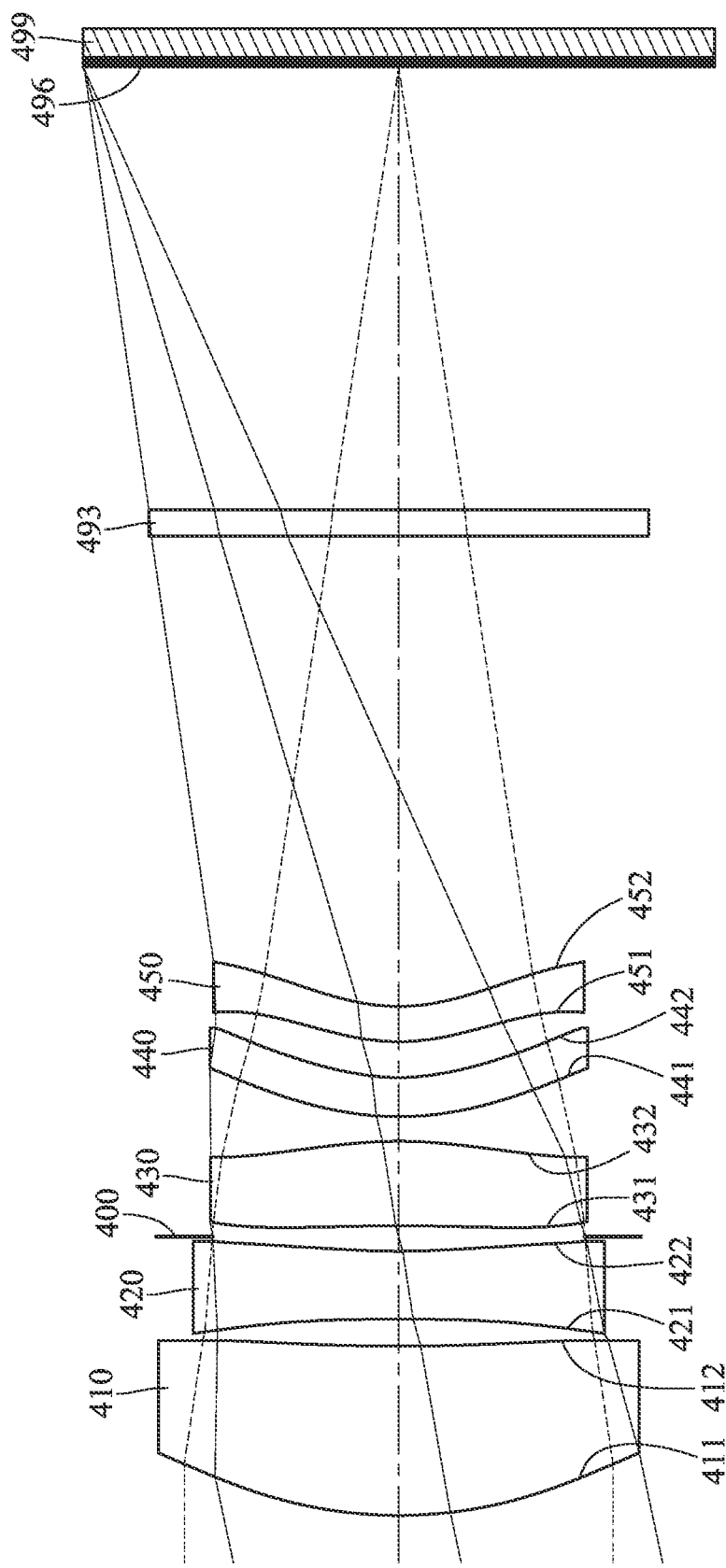
FIG. 7 is a schematic view of an image capturing unit according to the 4th embodiment of the present disclosure.
Figure 8:
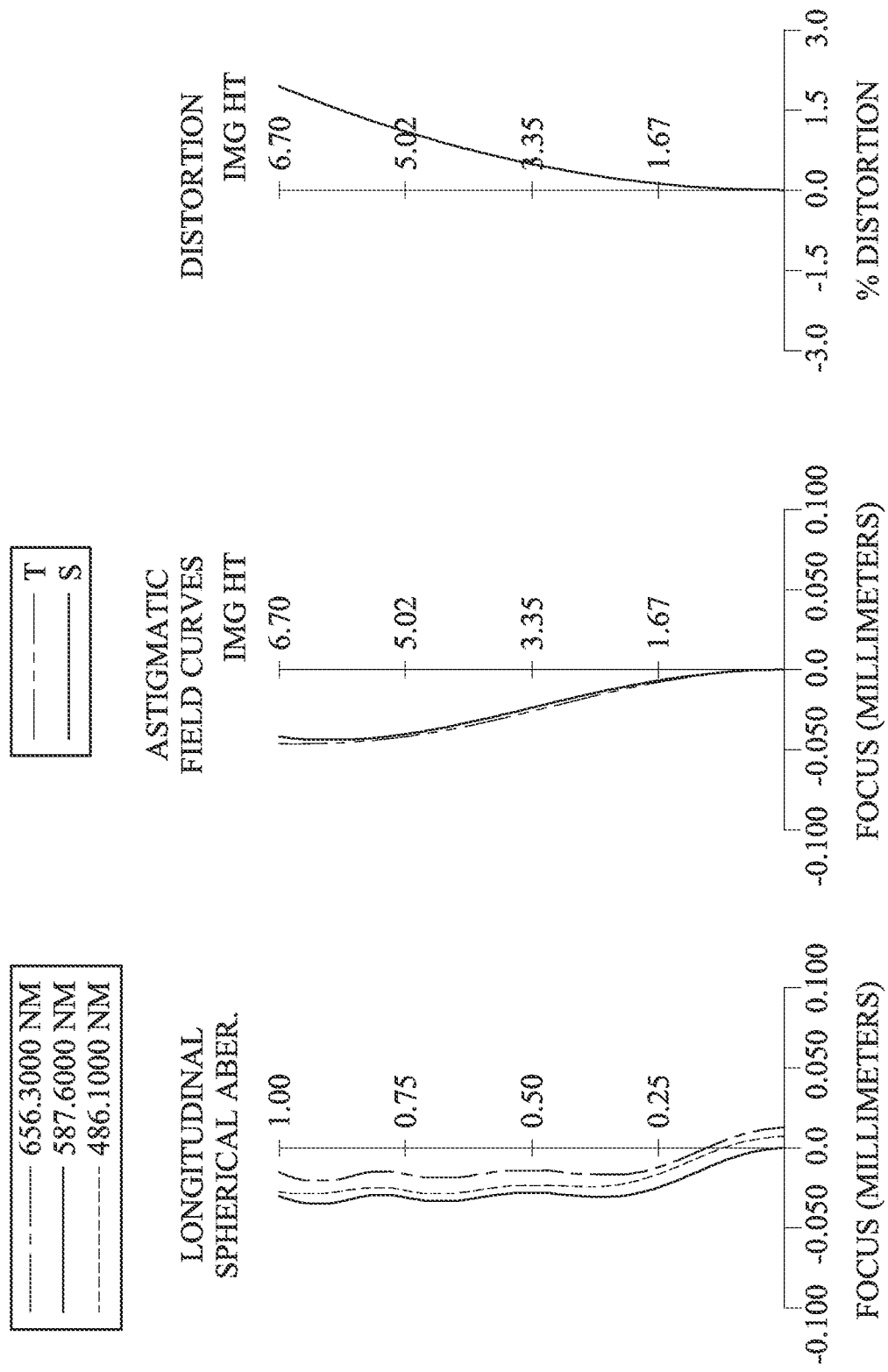
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical image system (its reference numeral is omitted) of the present disclosure and an image sensor 499. The optical image system includes, in order from an object side to an image side along an optical path, a first lens element 410, a second lens element 420, an aperture stop 400, a third lens element 430, a fourth lens element 440, a fifth lens element 450, a filter 493 and an image surface 496, wherein the fifth lens element 450 can be considered as a last lens element in this embodiment. The optical image system includes five lens elements (410, 420, 430, 440 and 450) with no additional lens element disposed between each of the adjacent five lens elements, wherein there is an air gap along an optical axis between each of all adjacent lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point.

The filter 493 is made of glass material and located between the fifth lens element 450 and the image surface 496, and will not affect the focal length of the optical image system. The image sensor 499 is disposed on or near the image surface 496 of the optical image system.

The detailed optical data of the 4th embodiment are shown in Table 7 and the aspheric surface data are shown in Table 8 below.

TABLE 7

4th Embodiment
f = 30.96 mm, Fno = 3.40, HFOV = 12.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.311 | (ASP) | 3.600 | Plastic | 1.545 | 56.1 | 21.38 |
| 2 | | 40.054 | (ASP) | 0.575 | | | | |
| 3 | Lens 2 | −79.203 | (ASP) | 1.444 | Plastic | 1.710 | 16.0 | −18.00 |
| 4 | | 15.353 | (ASP) | 0.312 | | | | |
| 5 | Ape. Stop | Plano | | 0.228 | | | | |
| 6 | Lens 3 | −46.843 | (ASP) | 1.800 | Plastic | 1.669 | 19.5 | 16.50 |
| 7 | | −9.073 | (ASP) | 0.521 | | | | |
| 8 | Lens 4 | 6.494 | (ASP) | 0.835 | Plastic | 1.660 | 20.4 | −33.72 |
| 9 | | 4.770 | (ASP) | 0.760 | | | | |
| 10 | Lens 5 | 4.346 | (ASP) | 0.750 | Plastic | 1.534 | 56.0 | −1548.01 |
| 11 | | 4.063 | (ASP) | 10.000 | | | | |
| 12 | Filter | Plano | | 0.560 | Glass | 1.517 | 64.2 | — |
| 13 | | Plano | | 9.422 | | | | |
| 14 | Image | Plano | | — | | | | |

Note:
Reference wavelength is 587.6 nm (d-line).

TABLE 8

Aspheric Coefficients

| Surface # | 1 | 2 | 3 | 4 | 6 |
|---|---|---|---|---|---|
| k= | −3.3861E−01 | −6.0859E+01 | 4.9935E+01 | −9.8434E+00 | −9.0000E+01 |
| A4= | −7.9368E−06 | −1.4420E−04 | −2.0954E−03 | −3.8754E−03 | −4.3044E−05 |
| A6= | −7.0006E−06 | 1.2596E−06 | 2.3380E−04 | 5.1687E−04 | 2.2341E−04 |
| A8= | 1.6782E−07 | 6.3724E−08 | −1.6610E−05 | −4.4024E−05 | −2.3856E−05 |
| A10= | −1.1316E−08 | −5.0164E−08 | 7.3292E−07 | 2.1907E−06 | 1.2404E−06 |
| A12= | 1.7259E−10 | 1.7738E−09 | −1.8183E−08 | −5.5738E−08 | −2.3119E−08 |
| A14= | −1.7832E−12 | −1.3150E−11 | 1.9861E−10 | 5.5958E−10 | −1.9285E−10 |
| A16= | — | — | — | — | 8.7409E−12 |

| Surface # | 7 | 8 | 9 | 10 | 11 |
|---|---|---|---|---|---|
| k= | −2.6851E+01 | −4.4892E+00 | −9.3447E+00 | −5.7962E+00 | −2.8420E+00 |
| A4= | 4.5081E−04 | 9.6803E−04 | 1.9772E−03 | −8.6029E−04 | −2.3943E−03 |
| A6= | 1.6766E−05 | −1.5263E−04 | −2.1622E−04 | −2.2009E−04 | 9.0017E−06 |
| A8= | −3.3066E−06 | 1.7157E−05 | 2.4740E−05 | 2.1666E−05 | −5.7846E−07 |
| A10= | 5.1567E−07 | −1.1181E−06 | −2.1064E−06 | −1.6721E−06 | 2.1317E−07 |
| A12= | −3.5976E−08 | 3.9403E−08 | 1.0948E−07 | 9.3365E−08 | −6.6348E−09 |
| A14= | 1.3221E−09 | −6.7098E−10 | −2.9971E−09 | −2.7777E−09 | −2.2898E−10 |
| A16= | −2.0349E−11 | −6.0494E−13 | 2.3619E−11 | 2.6534E−11 | 1.0614E−11 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 30.96 | f/EPD | 3.40 |
| fs [mm] | 101.62 | f/ImgH | 4.62 |
| Fno | 3.40 | EPD/ImgH | 1.36 |
| HFOV [deg.] | 12.0 | Y11/ImgH | 0.76 |
| V3 | 19.5 | EPD/ΣAT | 3.80 |
| Vdmin | 16.0 | ΣAT/BL | 0.12 |
| Vp | 56.1; 19.5 | BL/ImgH | 2.98 |
| V4/V5 | 0.36 | SD/BL | 0.24 |
| (Vi/Ni)min | 9.36 | Ymax/Ymin | 1.31 |
| T23/ΣAT | 0.23 | f × tan(HFOV) [mm] | 6.58 |
| f/f1 | 1.45 | Fno × EPD [mm] | 30.96 |
| f/f3 | 1.88 | FOV [deg.] | 24.00 |
| TL/f | 1.00 | — | — |

5th Embodiment

Figure 9:
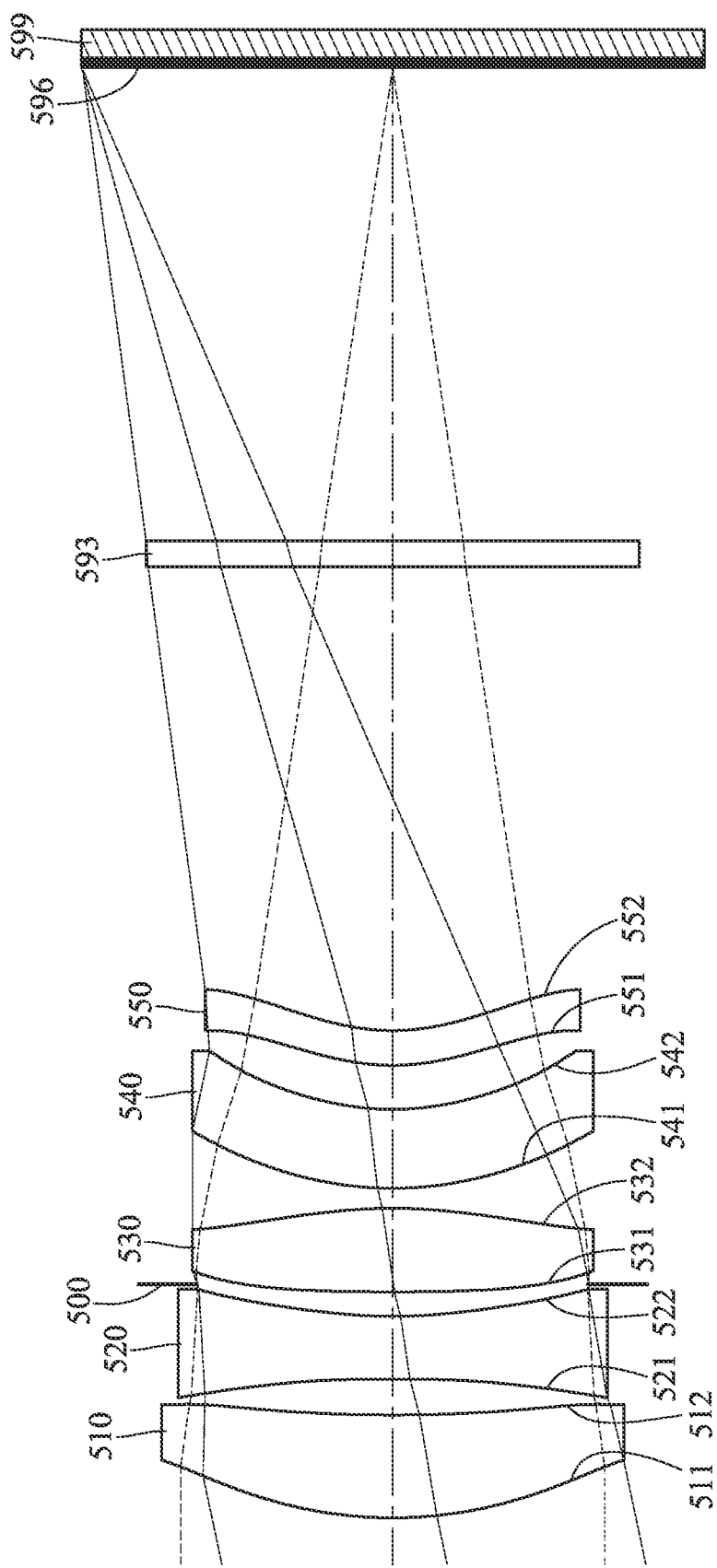
FIG. 9 is a schematic view of an image capturing unit according to the 5th embodiment of the present disclosure.
Figure 10:
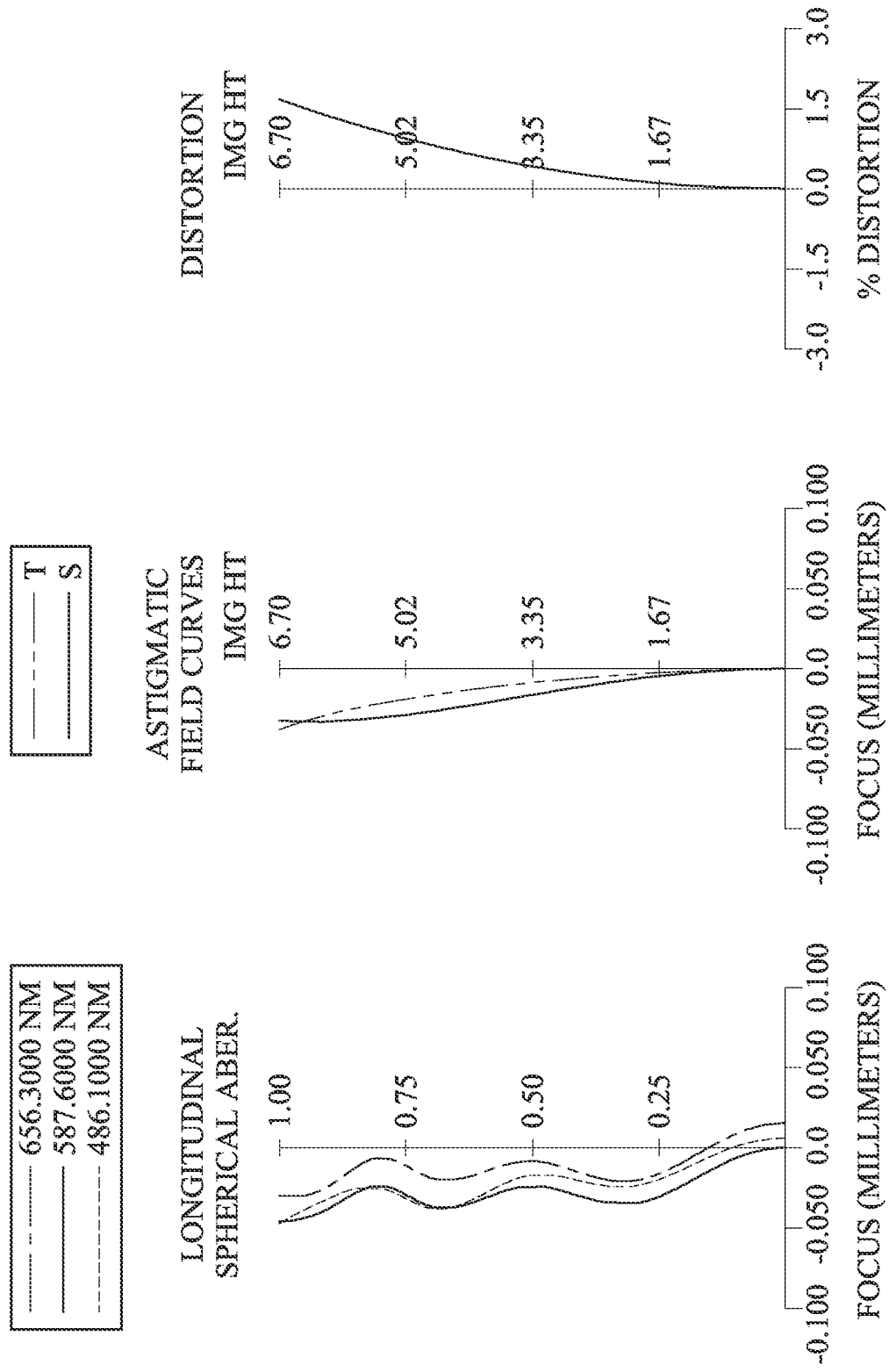
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical image system (its reference numeral is omitted) of the present disclosure and an image sensor 599. The optical image system includes, in order from an object side to an image side along an optical path, a first lens element 510, a second lens element 520, an aperture stop 500, a third lens element 530, a fourth lens element 540, a fifth lens element 550, a filter 593 and an image surface 596, wherein the fifth lens element 550 can be considered as a last lens element in this embodiment. The optical image system includes five lens elements (510, 520, 530, 540 and 550) with no additional lens element disposed between each of the adjacent five lens elements, wherein there is an air gap along an optical axis between each of all adjacent lens elements.

The first lens element 510 with positive refractive power has an object-side surface 511 being convex in a paraxial region thereof and an image-side surface 512 being concave in a paraxial region thereof. The first lens element 510 is made of glass material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point.

The filter 593 is made of glass material and located between the fifth lens element 550 and the image surface 596, and will not affect the focal length of the optical image system. The image sensor 599 is disposed on or near the image surface 596 of the optical image system.

The detailed optical data of the 5th embodiment are shown in Table 9 and the aspheric surface data are shown in Table 10 below.

TABLE 9

5th Embodiment
f = 31.04 mm, Fno = 3.40, HFOV = 12.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.265 | (ASP) | 2.218 | Glass | 1.581 | 40.9 | 21.23 |
| 2 | | 33.860 | (ASP) | 0.776 | | | | |
| 3 | Lens 2 | −45.512 | (ASP) | 1.351 | Plastic | 1.710 | 16.0 | −11.84 |
| 4 | | 10.438 | (ASP) | 0.686 | | | | |
| 5 | Ape. Stop | Plano | | −0.157 | | | | |
| 6 | Lens 3 | 61.961 | (ASP) | 1.800 | Plastic | 1.669 | 19.5 | 13.57 |
| 7 | | −10.510 | (ASP) | 0.432 | | | | |
| 8 | Lens 4 | 7.724 | (ASP) | 1.699 | Plastic | 1.660 | 20.4 | −47.38 |
| 9 | | 5.652 | (ASP) | 0.951 | | | | |
| 10 | Lens 5 | 4.728 | (ASP) | 0.750 | Plastic | 1.534 | 56.0 | 235.26 |
| 11 | | 4.641 | (ASP) | 10.000 | | | | |

TABLE 9-continued

5th Embodiment
f = 31.04 mm, Fno = 3.40, HFOV = 12.0 deg.

| Surface # | | Curvature Radius | Thickness | Material | Index | Abbe # | Focal Length |
|---|---|---|---|---|---|---|---|
| 12 | Filter | Plano | 0.560 | Glass | 1.517 | 64.2 | — |
| 13 | | Plano | 10.213 | | | | |
| 14 | Image | Plano | — | | | | |

Note:
Reference wavelength is 587.6 nm (d-line).

TABLE 10

Aspheric Coefficients

| Surface # | 1 | 2 | 3 | 4 | 6 |
|---|---|---|---|---|---|
| k= | −2.1964E−01 | 2.1005E+01 | 9.2273E+00 | −2.4186E+00 | 3.2613E+01 |
| A4= | 1.6314E−05 | −3.3548E−05 | −2.0618E−03 | −3.6449E−03 | −4.5222E−05 |
| A6= | −4.8200E−06 | −2.4007E−07 | 2.4066E−04 | 5.1488E−04 | 2.2250E−04 |
| A8= | −4.3278E−08 | 1.7001E−07 | −1.6711E−05 | −4.3937E−05 | −2.4224E−05 |
| A10= | −6.7081E−09 | −6.0413E−08 | 7.2500E−07 | 2.1899E−06 | 1.2207E−06 |
| A12= | −1.9842E−10 | 1.2030E−09 | −1.7989E−08 | −5.6347E−08 | −2.2822E−08 |
| A14= | 1.4426E−12 | 2.6136E−12 | 1.9551E−10 | 5.6462E−10 | −1.0615E−10 |
| A16= | — | — | — | — | 6.0281E−12 |

| Surface # | 7 | 8 | 9 | 10 | 11 |
|---|---|---|---|---|---|
| k= | −2.4604E+01 | −3.0373E+00 | −9.6308E+00 | −5.5541E+00 | −2.3395E+00 |
| A4= | 1.6111E−04 | 1.0567E−03 | 2.4566E−03 | −5.9580E−03 | −2.1784E−03 |
| A6= | 5.3250E−06 | −1.4980E−04 | −1.8032E−04 | −2.0999E−04 | 1.3461E−05 |
| A8= | −3.5172E−06 | 1.7747E−05 | 2.5016E−05 | 2.1100E−05 | −1.4267E−06 |
| A10= | 5.2719E−07 | −1.1147E−06 | −2.1225E−06 | −1.6721E−06 | 1.4847E−07 |
| A12= | −3.5473E−08 | 3.8455E−08 | 1.0966E−07 | 9.0821E−08 | −6.6123E−09 |
| A14= | 1.2873E−09 | −6.4037E−10 | −3.0137E−09 | −2.9994E−09 | −1.3762E−10 |
| A16= | −1.9048E−11 | 2.0037E−12 | 2.4311E−11 | 3.7088E−11 | 9.9409E−12 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 31.04 | f/EPD | 3.40 |
| fs [mm] | 101.62 | f/ImgH | 4.63 |
| Fno | 3.40 | EPD/ImgH | 1.36 |
| HFOV [deg.] | 12.0 | Y11/ImgH | 0.74 |
| V3 | 19.5 | EPD/ΣAT | 3.40 |
| Vdmin | 16.0 | ΣAT/BL | 0.13 |
| Vp | 40.9; 19.5; 56.0 | BL/ImgH | 3.10 |
| V4/V5 | 0.36 | SD/BL | 0.26 |
| (Vi/Ni)min | 9.36 | Ymax/Ymin | 1.26 |
| T23/ΣAT | 0.20 | f × tan(HFOV) [mm] | 6.60 |
| f/f1 | 1.46 | Fno × EPD [mm] | 31.04 |
| f/f3 | 2.29 | FOV [deg.] | 24.00 |
| TL/f | 1.01 | — | — |

6th Embodiment

Figure 11:
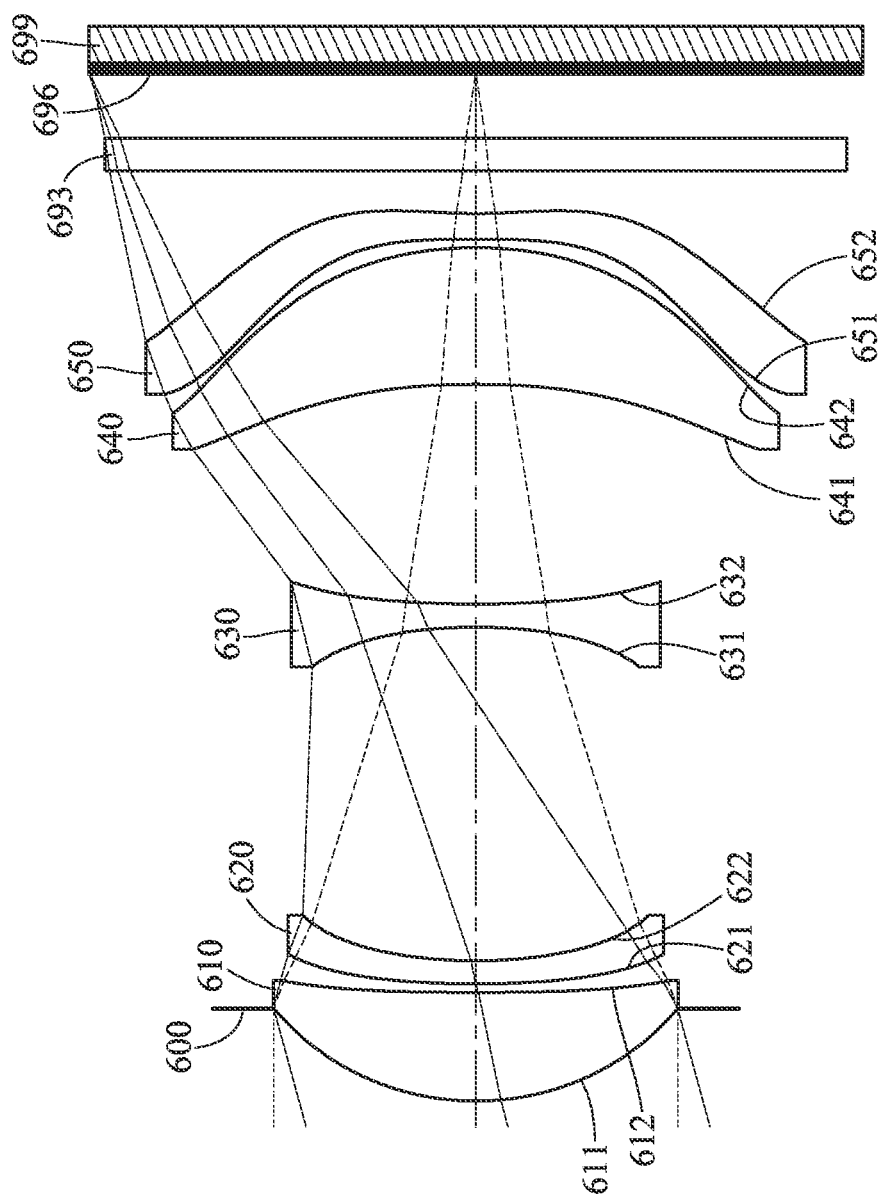
FIG. 11 is a schematic view of an image capturing unit according to the 6th embodiment of the present disclosure.
Figure 12:
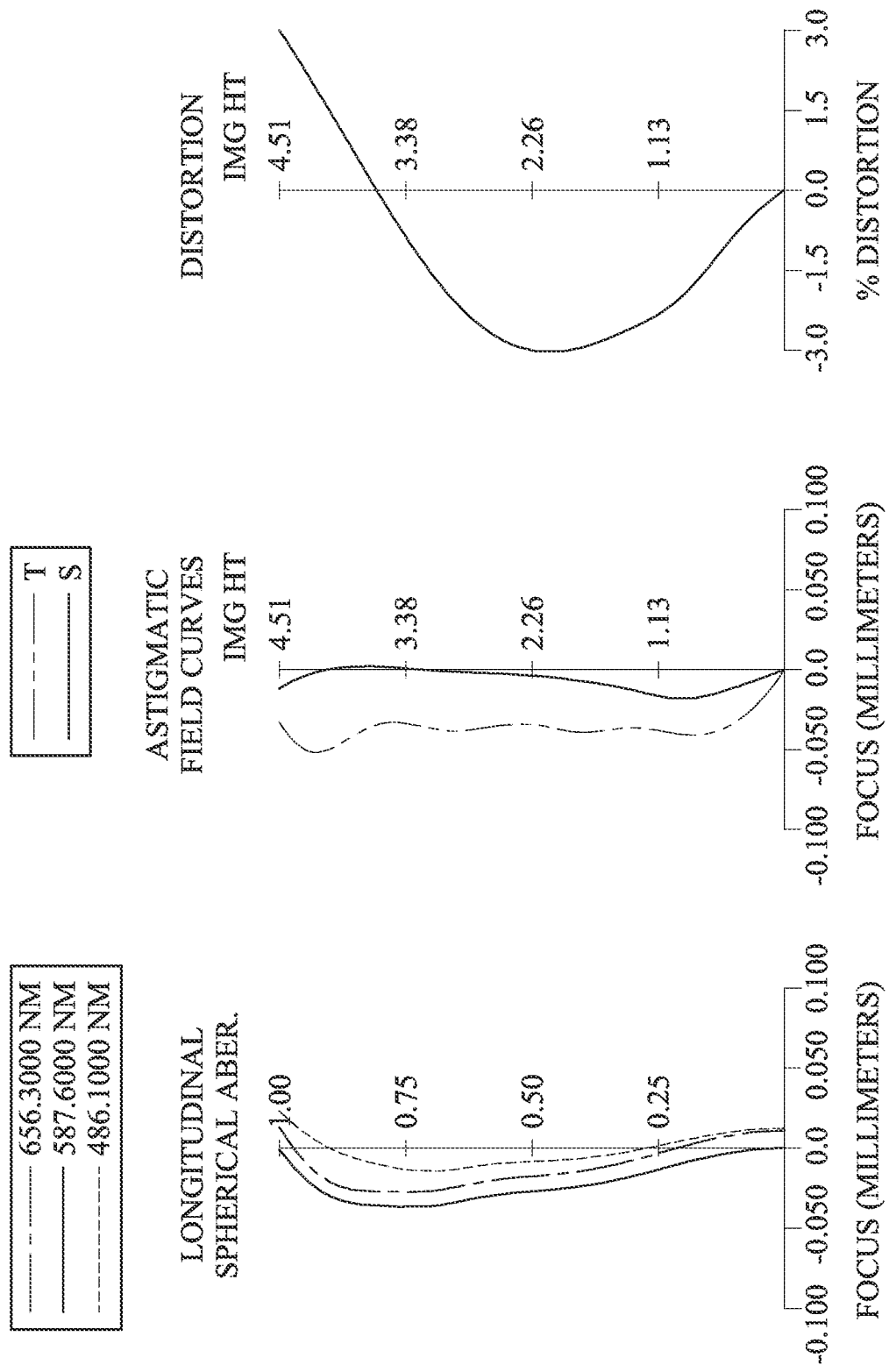
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical image system (its reference numeral is omitted) of the present disclosure and an image sensor 699. The optical image system includes, in order from an object side to an image side along an optical path, an aperture stop 600, a first lens element 610, a second lens element 620, a third lens element 630, a fourth lens element 640, a fifth lens element 650, a filter 693 and an image surface 696, wherein the fifth lens element 650 can be considered as a last lens element in this embodiment. The optical image system includes five lens elements (610, 620, 630, 640 and 650) with no additional lens element disposed between each of the adjacent five lens elements, wherein there is an air gap along an optical axis between each of all adjacent lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point. The image-side surface 652 of the fifth lens element 650 has at least one convex critical point in an off-axis region thereof.

The filter 693 is made of glass material and located between the fifth lens element 650 and the image surface 696, and will not affect the focal length of the optical image system. The image sensor 699 is disposed on or near the image surface 696 of the optical image system.

The detailed optical data of the 6th embodiment are shown in Table 11 and the aspheric surface data are shown in Table 12 below.

TABLE 11

6th Embodiment
$f = 16.03$ mm, Fno = 3.40, HFOV = 15.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.077 | | | | |
| 2 | Lens 1 | 3.168 | (ASP) | 1.270 | Plastic | 1.544 | 56.0 | 6.22 |
| 3 | | 42.685 | (ASP) | 0.100 | | | | |
| 4 | Lens 2 | 11.137 | (ASP) | 0.270 | Plastic | 1.700 | 17.0 | −17.60 |
| 5 | | 5.790 | (ASP) | 3.898 | | | | |
| 6 | Lens 3 | −6.603 | (ASP) | 0.270 | Plastic | 1.566 | 37.4 | −7.20 |
| 7 | | 10.818 | (ASP) | 2.568 | | | | |
| 8 | Lens 4 | −9.766 | (ASP) | 1.596 | Plastic | 1.660 | 20.4 | 10.85 |
| 9 | | −4.400 | (ASP) | 0.100 | | | | |
| 10 | Lens 5 | −23.209 | (ASP) | 0.300 | Plastic | 1.544 | 56.0 | −8.93 |
| 11 | | 6.164 | (ASP) | 0.500 | | | | |
| 12 | Filter | Plano | | 0.376 | Glass | 1.517 | 64.2 | — |
| 13 | | Plano | | 0.752 | | | | |
| 14 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k= | −5.7369E−02 | 5.0000E+01 | 6.3429E+00 | 1.5856E+00 | 9.1068E+00 |
| A4= | 7.7086E−04 | 2.0917E−03 | −1.1797E−03 | −2.9861E−04 | −1.7439E−02 |
| A6= | −4.4735E−05 | 4.9010E−04 | 2.8039E−03 | 2.8656E−03 | 8.9740E−03 |
| A8= | 5.0564E−05 | −7.8366E−05 | −9.8981E−04 | −9.0211E−04 | −2.3699E−03 |
| A10= | −4.9671E−06 | −6.7128E−06 | 3.6235E−04 | 3.9944E−04 | −2.4592E−04 |
| A12= | −1.1864E−07 | 1.7120E−06 | −9.3234E−05 | −9.4536E−05 | 3.8573E−04 |
| A14= | 6.5183E−08 | 2.1031E−07 | 1.3592E−05 | 1.0837E−05 | −1.0805E−04 |
| A16= | 3.9134E−09 | −3.6036E−08 | −8.0419E−07 | −1.2824E−07 | 1.0458E−05 |

| Surface # | 7 | 8 | 9 | 10 | 11 |
|---|---|---|---|---|---|
| k= | 1.4625E+01 | 4.8132E+00 | −2.8781E+00 | 2.2001E+01 | −9.0000E+01 |
| A4= | −1.5286E−02 | −9.5408E−03 | −3.7433E−03 | −2.9852E−02 | −2.8015E−02 |
| A6= | 1.2108E−02 | 2.8119E−03 | −5.0012E−03 | 1.8605E−05 | 2.9924E−03 |
| A8= | −5.1524E−03 | −5.5099E−04 | 1.9517E−03 | 8.0166E−04 | −3.8796E−04 |
| A10= | 1.5156E−03 | 7.4234E−05 | −3.8445E−04 | −1.6955E−04 | 5.1328E−05 |
| A12= | −2.8781E−04 | −6.0853E−06 | 4.3506E−05 | 1.9620E−05 | −3.9058E−06 |
| A14= | 3.0376E−05 | 2.7215E−07 | −2.8220E−06 | −1.2775E−06 | 1.3397E−07 |
| A16= | −1.3632E−06 | −4.9024E−09 | 9.7621E−08 | 4.3432E−08 | −7.4040E−10 |
| A18= | — | — | −1.3901E−09 | −6.0165E−10 | −3.9102E−11 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 16.03 | f/EPD | 3.40 |
| fs [mm] | 78.96 | f/ImgH | 3.55 |
| Fno | 3.40 | EPD/ImgH | 1.05 |
| HFOV [deg.] | 15.3 | Y11/ImgH | 0.52 |
| V3 | 37.4 | EPD/ΣAT | 0.71 |
| Vdmin | 17.0 | ΣAT/BL | 4.09 |
| Vp | 56.0; 20.4 | BL/ImgH | 0.36 |
| V4/V5 | 0.36 | SD/BL | 5.71 |
| (Vi/Ni)min | 10.00 | Ymax/Ymin | 2.02 |
| T23/ΣAT | 0.58 | f × tan(HFOV) [mm] | 4.39 |
| f/f1 | 2.58 | Fno × EPD [mm] | 16.03 |
| f/f3 | −2.23 | FOV [deg.] | 30.60 |
| TL/f | 0.75 | — | — |

7th Embodiment

Figure 13:
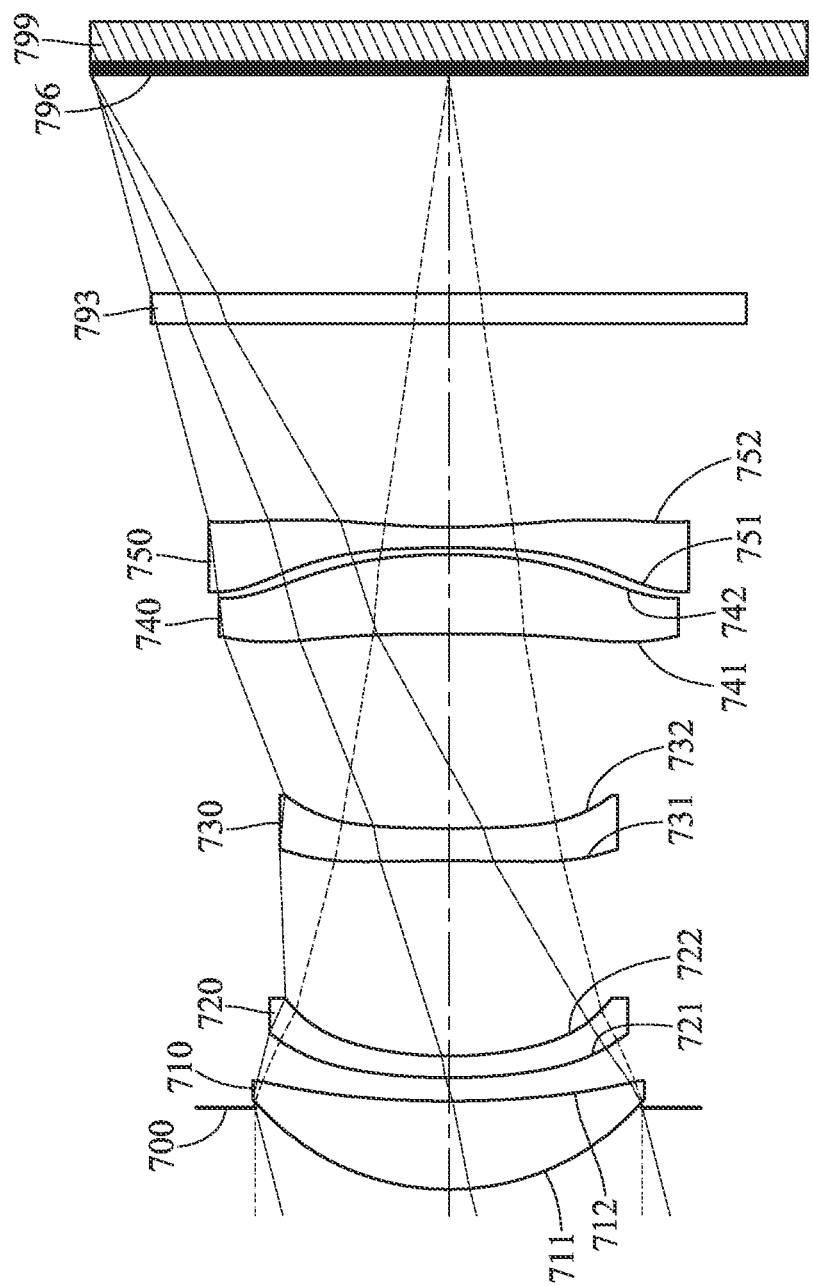
FIG. 13 is a schematic view of an image capturing unit according to the 7th embodiment of the present disclosure.
Figure 14:
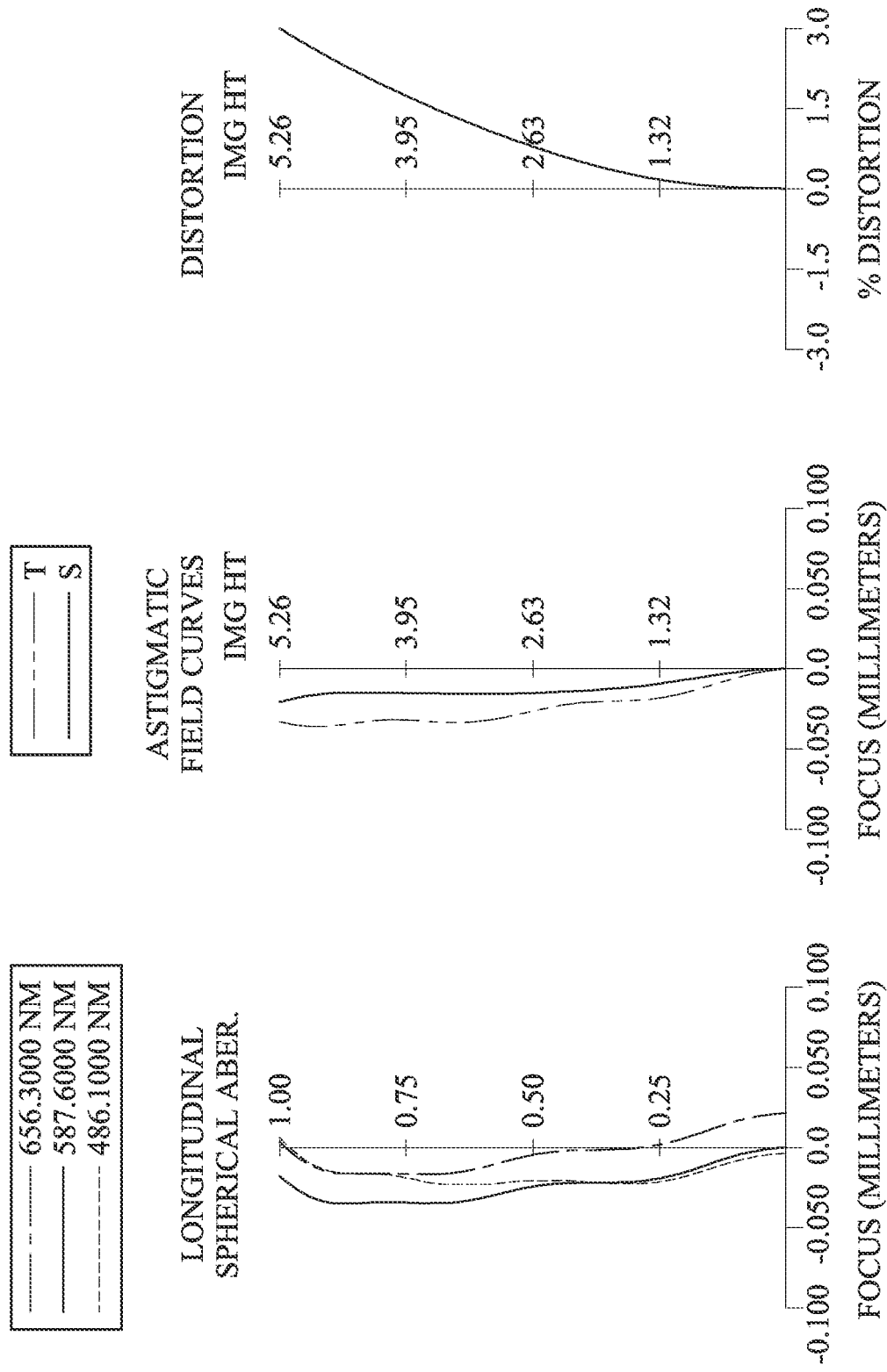
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical image system (its reference numeral is omitted) of the present disclosure and an image sensor 799. The optical image system includes, in order from an object side to an image side along an optical path, an aperture stop 700, a first lens element 710, a second lens element 720, a third lens element 730, a fourth lens element 740, a fifth lens element 750, a filter 793 and an image surface 796, wherein the fifth lens element 750 can be considered as a last lens element in this embodiment. The optical image system includes five lens elements (710, 720, 730, 740 and 750) with no additional lens element disposed between each of the adjacent five lens elements, wherein there is an air gap along an optical axis between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point. The image-side surface 752 of the fifth lens element 750 has at least one convex critical point in an off-axis region thereof.

The filter 793 is made of glass material and located between the fifth lens element 750 and the image surface 796, and will not affect the focal length of the optical image system. The image sensor 799 is disposed on or near the image surface 796 of the optical image system.

The detailed optical data of the 7th embodiment are shown in Table 13 and the aspheric surface data are shown in Table 14 below.

TABLE 13

7th Embodiment
f = 19.79 mm, Fno = 3.48, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.198 | | | | |
| 2 | Lens 1 | 3.854 | (ASP) | 1.299 | Plastic | 1.544 | 56.0 | 8.86 |
| 3 | | 17.012 | (ASP) | 0.343 | | | | |
| 4 | Lens 2 | 9.099 | (ASP) | 0.320 | Plastic | 1.679 | 18.4 | −25.89 |
| 5 | | 5.911 | (ASP) | 2.872 | | | | |
| 6 | Lens 3 | −42.967 | (ASP) | 0.476 | Plastic | 1.660 | 20.4 | −20.90 |
| 7 | | 20.407 | (ASP) | 2.862 | | | | |
| 8 | Lens 4 | −74.271 | (ASP) | 1.169 | Plastic | 1.660 | 20.4 | 14.49 |
| 9 | | −8.526 | (ASP) | 0.100 | | | | |
| 10 | Lens 5 | −18.948 | (ASP) | 0.300 | Plastic | 1.544 | 56.0 | −11.28 |
| 11 | | 9.118 | (ASP) | 3.000 | | | | |

TABLE 13-continued

7th Embodiment
f = 19.79 mm, Fno = 3.48, HFOV = 14.5 deg.

| Surface # | | Curvature Radius | Thickness | Material | Index | Abbe # | Focal Length |
|---|---|---|---|---|---|---|---|
| 12 | Filter | Plano | 0.439 | Glass | 1.517 | 64.2 | — |
| 13 | | Plano | 3.220 | | | | |
| 14 | Image | Plano | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k= | 4.0757E−02 | 2.6725E+01 | 4.4709E+00 | 2.9659E+00 | 4.9597E+01 |
| A4= | 4.8677E−04 | 9.8152E−04 | 1.1128E−04 | −5.5476E−04 | −4.5490E−04 |
| A6= | −4.8678E−05 | −2.4710E−05 | 1.0725E−03 | 1.3699E−03 | 2.3410E−03 |
| A8= | 2.6177E−05 | −1.5036E−05 | −9.5668E−05 | −7.5971E−05 | −1.5082E−04 |
| A10= | −5.9482E−06 | −1.6482E−06 | 8.4339E−06 | 1.7295E−05 | −1.7681E−05 |
| A12= | 6.3589E−07 | 3.7802E−07 | −5.9532E−07 | −8.8552E−07 | 8.8346E−07 |
| A14= | −3.6204E−08 | −2.0957E−08 | 2.0732E−10 | −1.2865E−07 | 3.5648E−07 |
| A16= | 8.4011E−10 | −1.4511E−10 | 1.2007E−09 | 2.6699E−08 | −3.7871E−08 |

| Surface # | 7 | 8 | 9 | 10 | 11 |
|---|---|---|---|---|---|
| k= | 2.1310E+01 | −4.8952E+00 | −7.8738E−01 | −9.0000E+01 | −3.7123E+01 |
| A4= | 8.8582E−04 | −6.1421E−03 | −5.8596E−03 | −1.1546E−02 | −3.8762E−03 |
| A6= | 2.5819E−03 | 6.5682E−04 | 6.6435E−04 | 1.3686E−03 | 3.3728E−05 |
| A8= | −1.4680E−04 | 6.8313E−06 | −2.8926E−05 | −1.8633E−04 | 3.2134E−06 |
| A10= | −2.6758E−06 | 2.1139E−06 | −5.3350E−06 | 1.0358E−05 | 1.4063E−06 |
| A12= | −2.6008E−07 | −6.7988E−07 | 1.7843E−06 | 1.2500E−06 | −7.3063E−08 |
| A14= | 8.5237E−08 | 4.5586E−08 | −1.4491E−07 | −1.4841E−07 | −1.4552E−09 |
| A16= | −1.8718E−08 | −1.0270E−09 | 3.6176E−09 | 4.0405E−09 | 1.3455E−10 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

7th Embodiment

| | | | |
|---|---|---|---|
| f [mm] | 19.79 | f/EPD | 3.48 |
| fs [mm] | 83.52 | f/ImgH | 3.76 |
| Fno | 3.48 | EPD/ImgH | 1.08 |
| HFOV [deg.] | 14.5 | Y11/ImgH | 0.55 |
| V3 | 20.4 | EPD/ΣAT | 0.92 |
| Vdmin | 18.4 | ΣAT/BL | 0.93 |
| Vp | 56.0; 20.4 | BL/ImgH | 1.27 |
| V4/V5 | 0.36 | SD/BL | 1.28 |
| (Vi/Ni)min | 10.96 | Ymax/Ymin | 1.47 |
| T23/ΣAT | 0.46 | f × tan(HFOV) [mm] | 5.12 |
| f/f1 | 2.24 | Fno × EPD [mm] | 19.79 |
| f/f3 | −0.95 | FOV [deg.] | 29.00 |
| TL/f | 0.83 | | |

8th Embodiment

Figure 15:
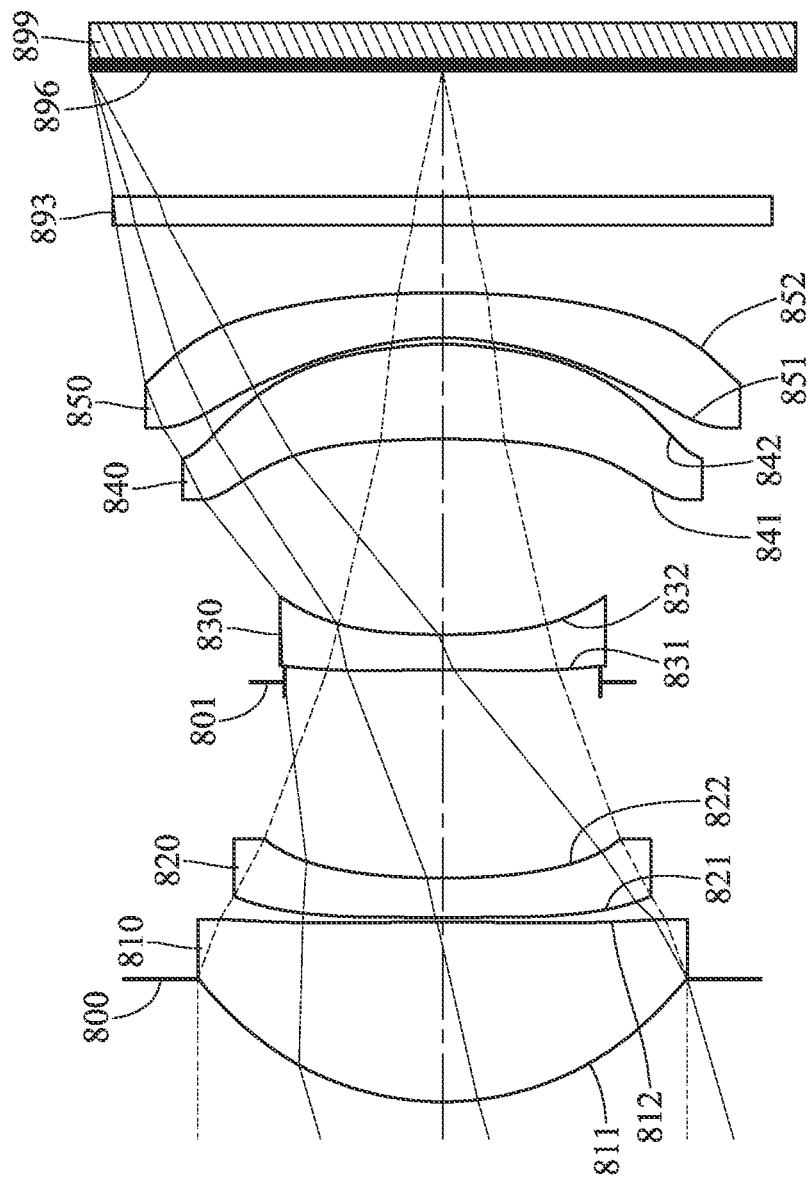
FIG. 15 is a schematic view of an image capturing unit according to the 8th embodiment of the present disclosure.
Figure 16:
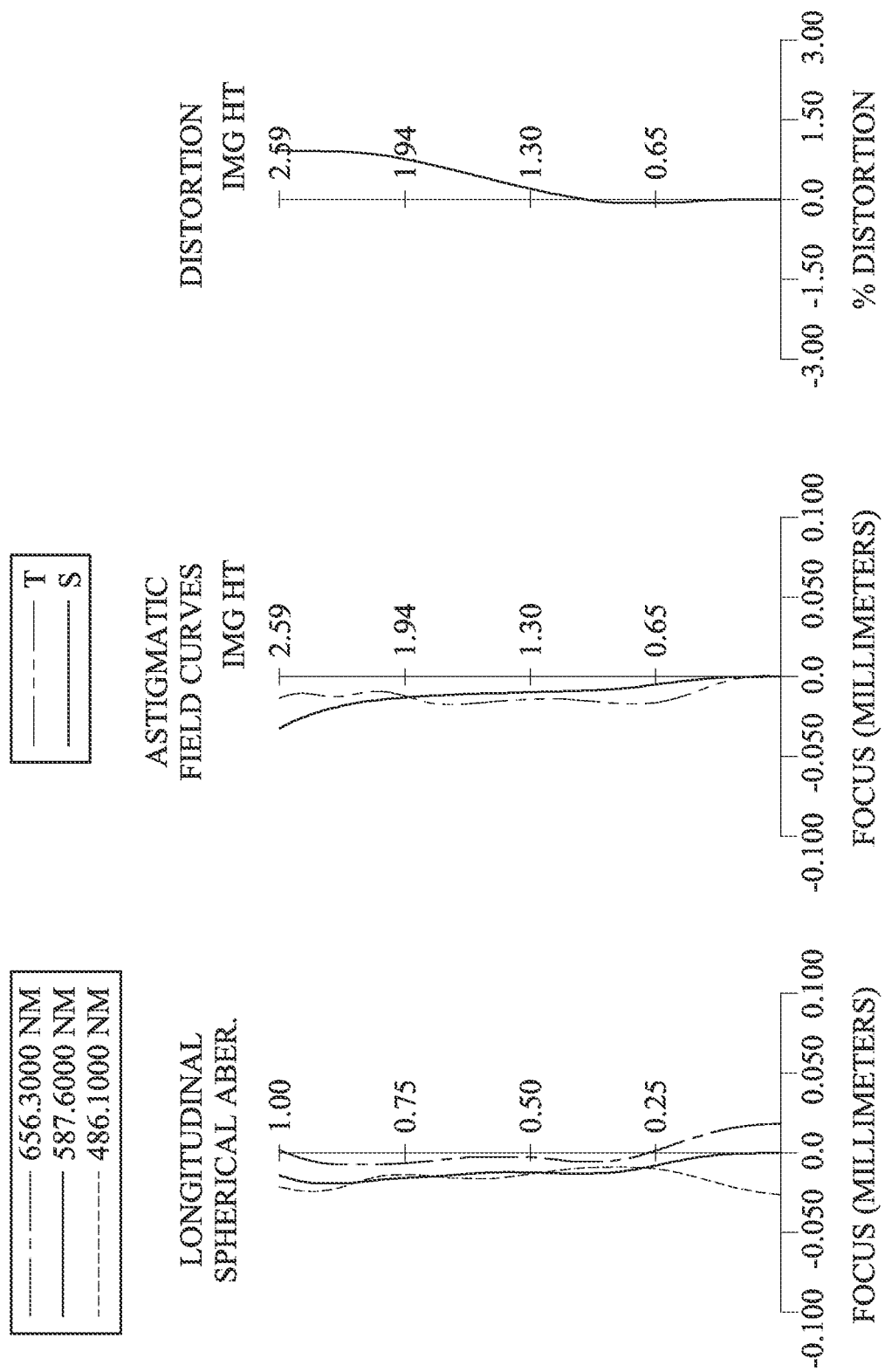
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical image system (its reference numeral is omitted) of the present disclosure and an image sensor 899. The optical image system includes, in order from an object side to an image side along an optical path, an aperture stop 800, a first lens element 810, a second lens element 820, a stop 801, a third lens element 830, a fourth lens element 840, a fifth lens element 850, a filter 893 and an image surface 896, wherein the fifth lens element 850 can be considered as a last lens element in this embodiment. The optical image system includes five lens elements (810, 820, 830, 840 and 850) with no additional lens element disposed between each of the adjacent five lens elements, wherein there is an air gap along an optical axis between each of all adjacent lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point.

The filter 893 is made of glass material and located between the fifth lens element 850 and the image surface 896, and will not affect the focal length of the optical image system. The image sensor 899 is disposed on or near the image surface 896 of the optical image system.

The detailed optical data of the 8th embodiment are shown in Table 15 and the aspheric surface data are shown in Table 16 below.

TABLE 15

8th Embodiment
f = 8.81 mm, Fno = 2.45, HFOV = 16.3 deg.

| Surface # |         | Curvature Radius |       | Thickness | Material | Index | Abbe # | Focal Length |
|-----------|---------|------------------|-------|-----------|----------|-------|--------|--------------|
| 0         | Object  | Plano            |       | Infinity  |          |       |        |              |
| 1         | Ape. Stop | Plano          |       | −0.902    |          |       |        |              |
| 2         | Lens 1  | 2.186            | (ASP) | 1.321     | Plastic  | 1.545 | 56.1   | 4.04         |
| 3         |         | 281.834          | (ASP) | 0.035     |          |       |        |              |
| 4         | Lens 2  | 20.710           | (ASP) | 0.290     | Plastic  | 1.669 | 19.5   | −11.05       |
| 5         |         | 5.417            | (ASP) | 1.440     |          |       |        |              |
| 6         | Stop    | Plano            |       | 0.092     |          |       |        |              |
| 7         | Lens 3  | −13.195          | (ASP) | 0.260     | Plastic  | 1.587 | 28.3   | −7.03        |
| 8         |         | 6.046            | (ASP) | 1.438     |          |       |        |              |
| 9         | Lens 4  | −7.453           | (ASP) | 0.697     | Plastic  | 1.669 | 19.5   | 4.22         |
| 10        |         | −2.123           | (ASP) | 0.049     |          |       |        |              |
| 11        | Lens 5  | −1.662           | (ASP) | 0.330     | Plastic  | 1.534 | 55.9   | −4.13        |
| 12        |         | −7.234           | (ASP) | 0.500     |          |       |        |              |
| 13        | Filter  | Plano            |       | 0.210     | Glass    | 1.517 | 64.2   | —            |
| 14        |         | Plano            |       | 0.925     |          |       |        |              |
| 15        | Image   | Plano            |       | —         |          |       |        |              |

Note:
Reference wavelength is 587.6 nm (d-line).
An effective radius of the stop 801 (Surface 6) is 1.159 mm.

TABLE 16

Aspheric Coefficients

| Surface # | 2 | 3 | 4 | 5 | 7 |
|---|---|---|---|---|---|
| k= | −1.2472E−01 | 0.0000E+00 | 5.1308E+01 | 1.2524E+01 | −1.0199E+00 |
| A4= | 7.2755E−04 | −1.0855E−01 | −1.0212E−01 | −9.7411E−03 | 7.9039E−02 |
| A6= | 9.5433E−04 | 3.0297E−01 | 3.0257E−01 | 5.7289E−02 | −8.0135E−02 |
| A8= | −9.8960E−04 | −3.8244E−01 | −3.6869E−01 | −4.5923E−02 | 1.8006E−01 |
| A10= | 1.1816E−03 | 2.7453E−01 | 2.4951E−01 | 4.1712E−03 | −3.2148E−01 |
| A12= | −7.7925E−04 | −1.1769E−01 | −9.4445E−02 | 2.0720E−02 | 3.6730E−01 |
| A14= | 2.4058E−04 | 2.9864E−02 | 1.8691E−02 | −1.2812E−02 | −2.5971E−01 |
| A16= | −2.8523E−05 | −4.1538E−03 | −1.5012E−03 | 2.3791E−03 | 1.0234E−01 |
| A18= | — | 2.4497E−04 | — | — | −1.7119E−02 |

| Surface # | 8 | 9 | 10 | 11 | 12 |
|---|---|---|---|---|---|
| k= | 1.5175E+01 | 0.0000E+00 | −1.0000E+00 | −1.0000E+00 | 0.0000E+00 |
| A4= | 8.7249E−02 | 5.5089E−03 | 3.0585E−01 | 4.0306E−01 | −3.8943E−03 |
| A6= | −2.3167E−02 | −1.0484E−01 | −5.5056E−01 | −6.4887E−01 | −1.1718E−02 |
| A8= | −3.5795E−02 | 1.8375E−01 | 5.1247E−01 | 5.7118E−01 | 1.1483E−02 |
| A10= | 2.2498E−01 | −2.1835E−01 | −3.0121E−01 | −2.9658E−01 | −4.1924E−03 |
| A12= | −4.9097E−01 | 1.6510E−01 | 1.1663E−01 | 9.4048E−02 | −8.5941E−05 |
| A14= | 5.9026E−01 | −7.8173E−02 | −2.9751E−02 | −1.8258E−02 | 4.5893E−04 |
| A16= | −4.1280E−01 | 2.2323E−02 | 4.6960E−03 | 2.0966E−03 | −1.3236E−04 |
| A18= | 1.5684E−01 | −3.4766E−03 | −3.8569E−04 | −1.2814E−04 | 1.6137E−05 |
| A20= | −2.5027E−02 | 2.2515E−04 | 1.0226E−05 | 3.0630E−06 | −7.3698E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.81 | f/EPD | 2.45 |
| fs [mm] | 74.06 | f/ImgH | 3.40 |
| Fno | 2.45 | EPD/ImgH | 1.39 |
| HFOV [deg.] | 16.3 | Y11/ImgH | 0.69 |
| V3 | 28.3 | EPD/ΣAT | 1.18 |
| Vdmin | 19.5 | ΣAT/BL | 1.87 |
| Vp | 56.1; 19.5 | BL/ImgH | 0.63 |
| V4/V5 | 0.35 | SD/BL | 3.09 |
| (Vi/Ni)min | 11.68 | Ymax/Ymin | 1.86 |
| T23/ΣAT | 0.50 | f × tan(HFOV) [mm] | 2.57 |
| f/f1 | 2.18 | Fno × EPD [mm] | 8.81 |
| f/f3 | −1.25 | FOV [deg.] | 32.52 |
| TL/f | 0.86 | — | — |

9th Embodiment

Figure 17:
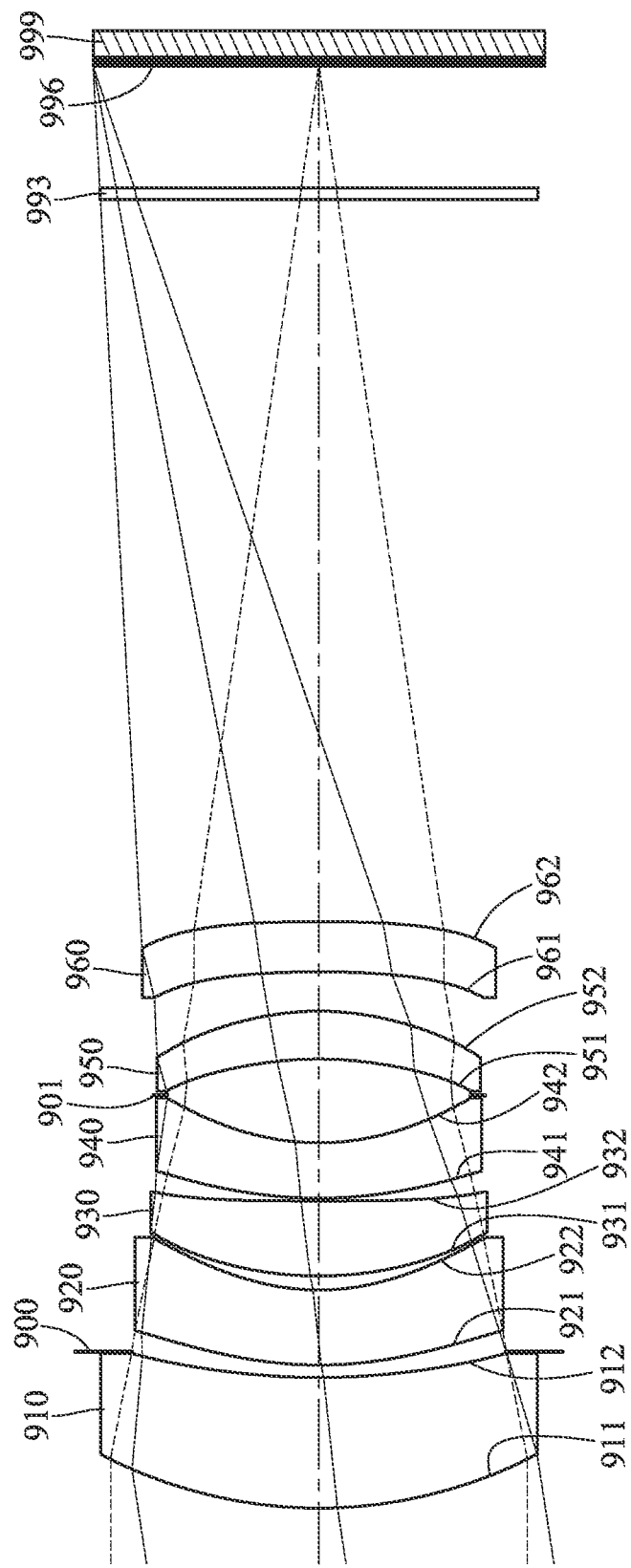
FIG. 17 is a schematic view of an image capturing unit according to the 9th embodiment of the present disclosure.
Figure 18:
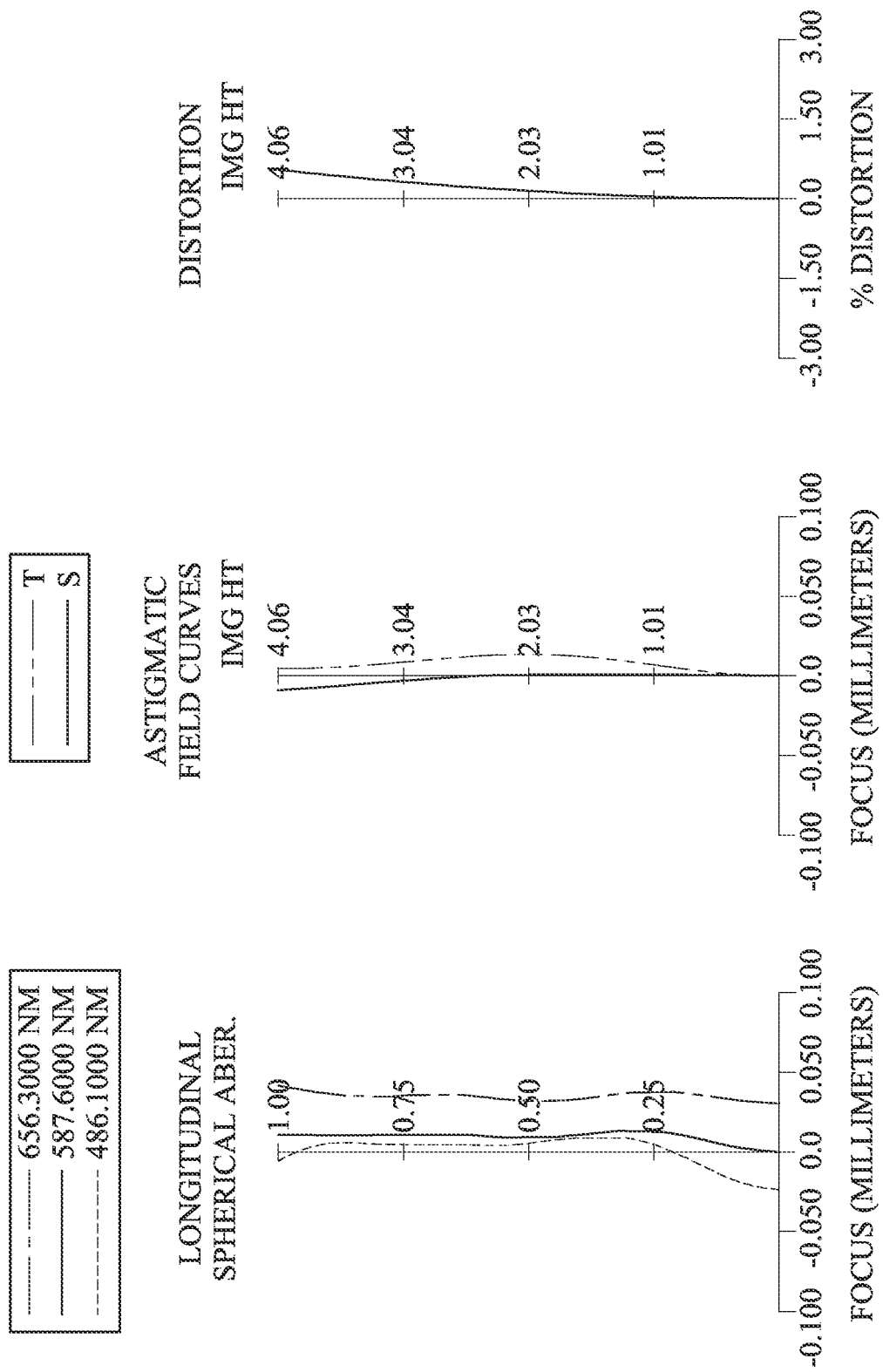
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical image system (its reference numeral is omitted) of the present disclosure and an image sensor 999. The optical image system includes, in order from an object side to an image side along an optical path, a first lens element 910, an aperture stop 900, a second lens element 920, a third lens element 930, a fourth lens element 940, a stop 901, a fifth lens element 950, a sixth lens element 960, a filter 993 and an image surface 996, wherein the sixth lens element 960 can be considered as a last lens element in this embodiment. The optical image system includes six lens elements (910, 920, 930, 940, 950 and 960) with no additional lens element disposed between each of the adjacent six lens elements, wherein there is an air gap along an optical axis between each of all adjacent lens elements.

The first lens element 910 with positive refractive power has an object-side surface 911 being convex in a paraxial region thereof and an image-side surface 912 being concave in a paraxial region thereof. The first lens element 910 is made of glass material and has the object-side surface 911 and the image-side surface 912 being both spherical.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric.

The filter 993 is made of glass material and located between the sixth lens element 960 and the image surface 996, and will not affect the focal length of the optical image system. The image sensor 999 is disposed on or near the image surface 996 of the optical image system.

The detailed optical data of the 9th embodiment are shown in Table 17 and the aspheric surface data are shown in Table 18 below.

TABLE 17

9th Embodiment
f = 26.15 mm, Fno = 3.49, HFOV = 8.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.417 | (SPH) | 2.350 | Glass | 1.697 | 55.5 | 27.28 |
| 2 | | 13.374 | (SPH) | 0.464 | | | | |
| 3 | Ape. Stop | Plano | | −0.240 | | | | |
| 4 | Lens 2 | 7.148 | (ASP) | 1.350 | Plastic | 1.614 | 25.6 | −20.61 |
| 5 | | 4.240 | (ASP) | 0.253 | | | | |
| 6 | Lens 3 | 6.651 | (ASP) | 1.350 | Plastic | 1.544 | 56.0 | 12.79 |
| 7 | | 141.091 | (ASP) | 0.050 | | | | |
| 8 | Lens 4 | 8.149 | (ASP) | 0.997 | Plastic | 1.639 | 23.5 | −18.92 |
| 9 | | 4.635 | (ASP) | 0.858 | | | | |
| 10 | Stop | Plano | | 0.650 | | | | |
| 11 | Lens 5 | −6.330 | (ASP) | 0.861 | Plastic | 1.669 | 19.5 | 25.83 |
| 12 | | −4.886 | (ASP) | 0.708 | | | | |
| 13 | Lens 6 | −17.802 | (ASP) | 0.903 | Plastic | 1.639 | 23.5 | −62.10 |
| 14 | | −32.941 | (ASP) | 13.000 | | | | |

TABLE 17-continued

9th Embodiment
f = 26.15 mm, Fno = 3.49, HFOV = 8.8 deg.

| Surface # | | Curvature Radius | Thickness | Material | Index | Abbe # | Focal Length |
|---|---|---|---|---|---|---|---|
| 15 | Filter | Plano | 0.210 | Glass | 1.517 | 64.2 | — |
| 16 | | Plano | 2.190 | | | | |
| 17 | Image | Plano | — | | | | |

Note:
Reference wavelength is 587.6 nm (d-line).
An effective radius of the stop 901 (Surface 10) is 2.730 mm.

TABLE 18

Aspheric Coefficients

| Surface # | 4 | 5 | 6 | 7 | 8 |
|---|---|---|---|---|---|
| k= | 0.0000E+00 | −9.9342E−01 | 0.0000E+00 | 0.0000E+00 | 0.0000E+00 |
| A4= | −1.5605E−03 | −3.3089E−04 | 1.7106E−03 | 1.2627E−03 | −6.9699E−04 |
| A6= | −2.4263E−05 | −5.9588E−04 | −7.2354E−04 | 2.5584E−04 | 2.2764E−04 |
| A8= | 5.3735E−06 | 1.2560E−04 | 1.7685E−04 | −5.8162E−05 | −1.0188E−04 |
| A10= | −3.9176E−07 | −1.2137E−05 | −2.0905E−05 | 4.0306E−06 | 1.6526E−05 |
| A12= | 9.4156E−09 | 5.4092E−07 | 1.2687E−06 | 1.3471E−07 | −1.1040E−06 |
| A14= | — | −9.3017E−09 | −3.0615E−08 | −1.6326E−08 | 2.3267E−08 |

| Surface # | 9 | 11 | 12 | 13 | 14 |
|---|---|---|---|---|---|
| k= | 0.0000E+00 | 0.0000E+00 | −6.8443E+00 | 0.0000E+00 | 0.0000E+00 |
| A4= | 9.3749E−05 | 6.2685E−03 | −5.8031E−04 | −4.5096E−04 | −2.9373E−03 |
| A6= | −5.2125E−04 | −1.4779E−03 | −8.0836E−04 | −8.8262E−04 | −5.6276E−05 |
| A8= | 6.6397E−05 | 2.0047E−04 | 1.4330E−04 | 2.0211E−04 | 2.8111E−05 |
| A10= | −2.6089E−06 | −1.9009E−05 | −1.4427E−05 | −2.7243E−05 | −4.6480E−06 |
| A12= | −9.6783E−08 | 7.5588E−07 | 5.8800E−07 | 1.8713E−06 | 2.9551E−07 |
| A14= | — | — | — | −5.6859E−08 | −7.8531E−09 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 26.15 | f/EPD | 3.49 |
| fs [mm] | 139.53 | f/ImgH | 6.44 |
| Fno | 3.49 | EPD/ImgH | 1.85 |
| HFOV [deg.] | 8.8 | Y11/ImgH | 0.97 |
| V3 | 56.0 | EPD/ΣAT | 2.73 |
| Vdmin | 19.5 | ΣAT/BL | 0.18 |
| Vp | 55.5; 56.0; 19.5 | BL/ImgH | 3.79 |
| V4/V5 | 1.21 | SD/BL | 0.50 |
| (Vi/Ni)min | 11.68 | Ymax/Ymin | 1.44 |
| T23/ΣAT | 0.09 | f × tan(HFOV) [mm] | 4.05 |
| f/f1 | 0.96 | Fno × EPD [mm] | 26.15 |
| f/f3 | 2.05 | FOV [deg.] | 17.60 |
| TL/f | 0.99 | — | — |

10th Embodiment

Figure 19:
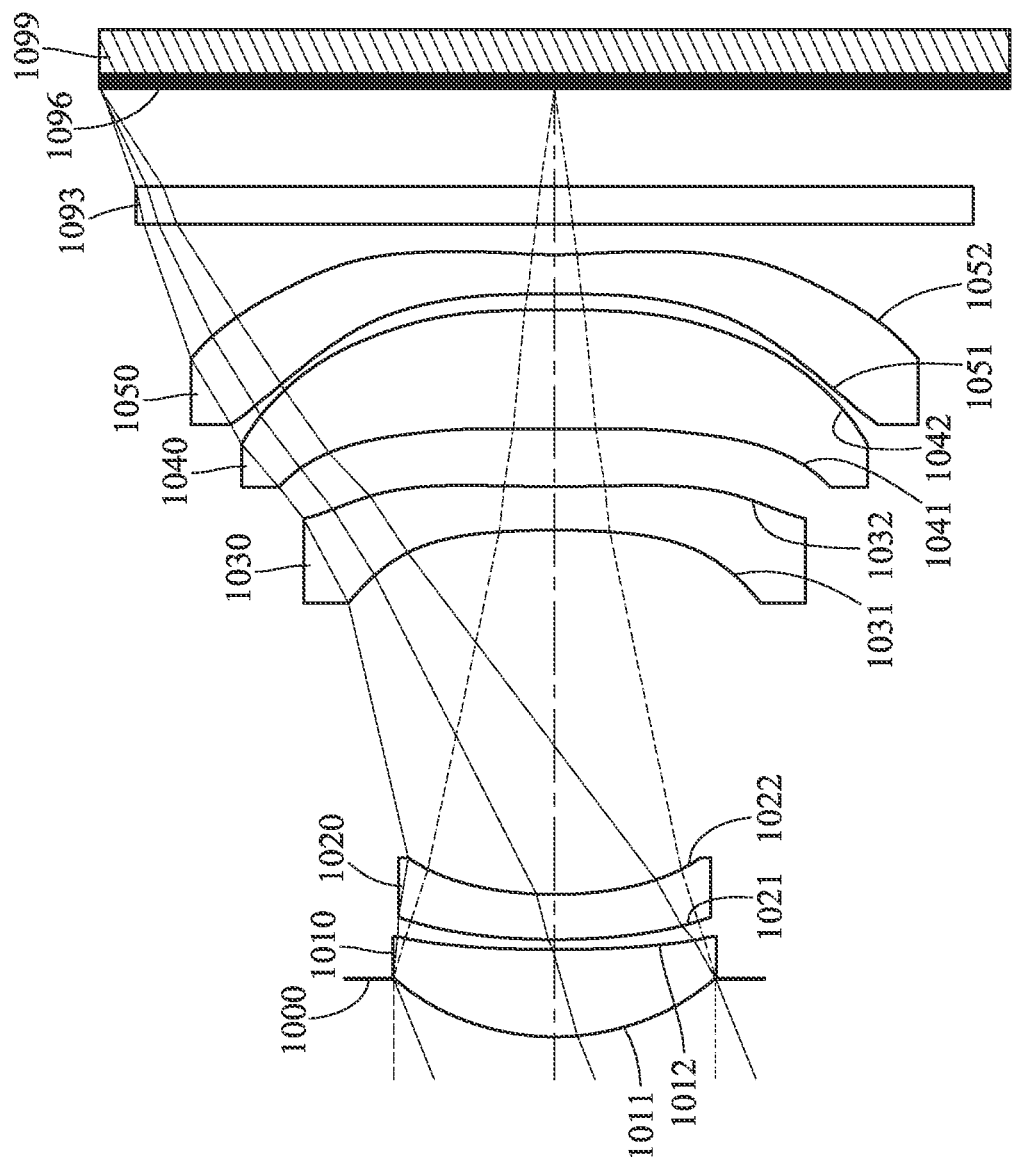
FIG. 19 is a schematic view of an image capturing unit according to the 10th embodiment of the present disclosure.
Figure 20:
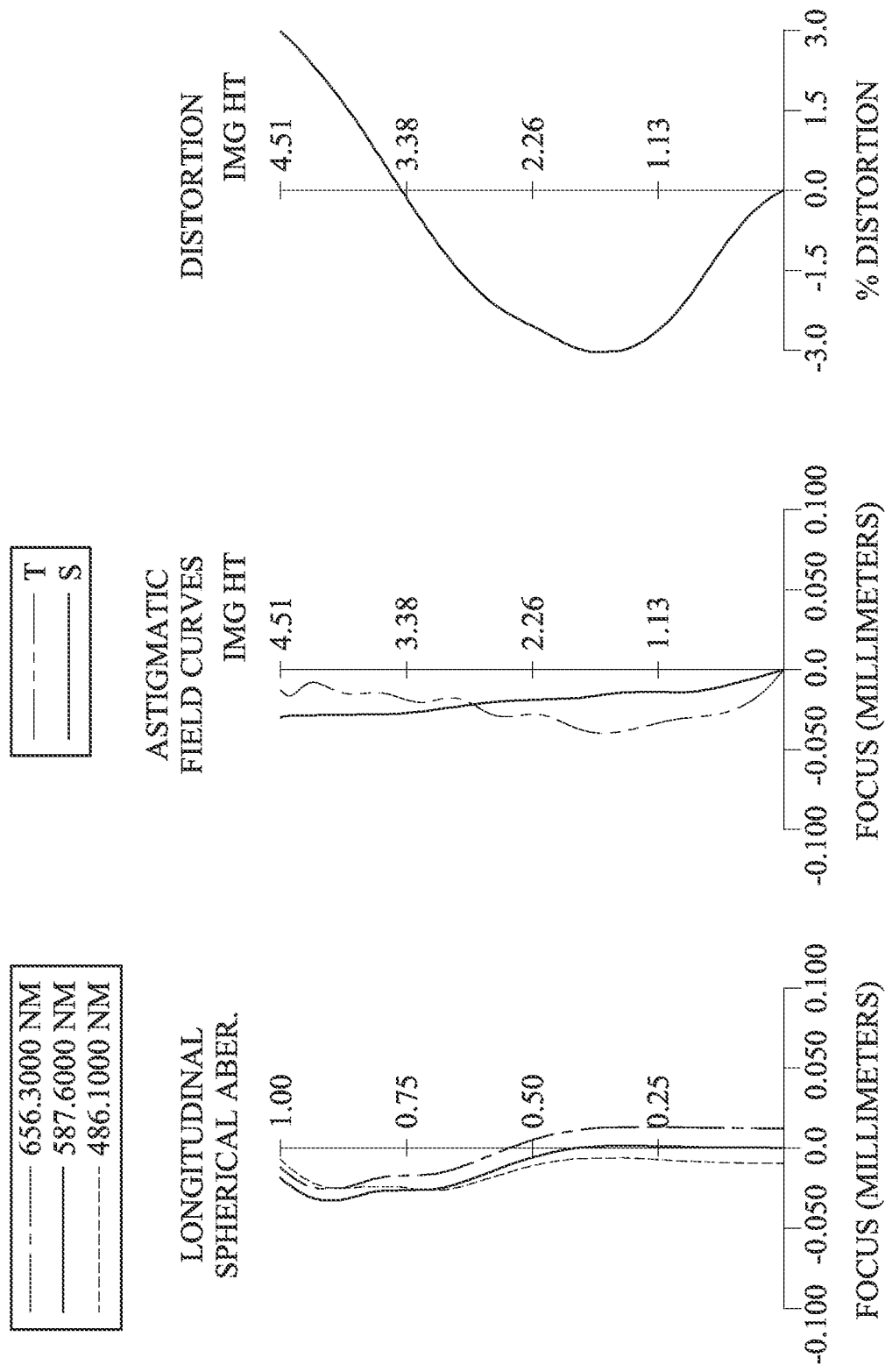
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical image system (its reference numeral is omitted) of the present disclosure and an image sensor 1099. The optical image system includes, in order from an object side to an image side along an optical path, an aperture stop 1000, a first lens element 1010, a second lens element 1020, a third lens element 1030, a fourth lens element 1040, a fifth lens element 1050, a filter 1093 and an image surface 1096, wherein the fifth lens element 1050 can be considered as a last lens element in this embodiment. The optical image system includes five lens elements (1010, 1020, 1030, 1040 and 1050) with no additional lens element disposed between each of the adjacent five lens elements, wherein there is an air gap along an optical axis between each of all adjacent lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric. The object-side surface 1051 of the fifth lens element 1050 has at least one inflection point. The image-side surface 1052 of the fifth lens element 1050 has at least one inflection point. The image-side surface 1052 of the fifth lens element 1050 has at least one convex critical point in an off-axis region thereof.

The filter 1093 is made of glass material and located between the fifth lens element 1050 and the image surface 1096, and will not affect the focal length of the optical image system. The image sensor 1099 is disposed on or near the image surface 1096 of the optical image system.

The detailed optical data of the 10th embodiment are shown in Table 19 and the aspheric surface data are shown in Table 20 below.

TABLE 19

10th Embodiment
f = 10.86 mm, Fno = 3.40, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.577 | | | | |
| 2 | Lens 1 | 2.534 | (ASP) | 0.866 | Plastic | 1.544 | 56.0 | 5.61 |
| 3 | | 13.178 | (ASP) | 0.100 | | | | |
| 4 | Lens 2 | 7.024 | (ASP) | 0.448 | Plastic | 1.700 | 17.0 | −14.10 |
| 5 | | 3.996 | (ASP) | 3.619 | | | | |
| 6 | Lens 3 | −8.884 | (ASP) | 0.433 | Plastic | 1.566 | 37.4 | −10.52 |
| 7 | | 18.362 | (ASP) | 0.571 | | | | |
| 8 | Lens 4 | 24.895 | (ASP) | 1.185 | Plastic | 1.660 | 20.4 | 14.05 |
| 9 | | −14.497 | (ASP) | 0.157 | | | | |
| 10 | Lens 5 | −35.476 | (ASP) | 0.390 | Plastic | 1.544 | 56.0 | −8.26 |
| 11 | | 5.165 | (ASP) | 0.300 | | | | |
| 12 | Filter | Plano | | 0.376 | Glass | 1.517 | 64.2 | — |
| 13 | | Plano | | 0.975 | | | | |
| 14 | Image | Plano | | — | | | | |

Note:
Reference wavelength is 587.6 nm (d-line).

TABLE 20

Aspheric Coefficients

| Surface # | 2 | 3 | 4 | 5 | 6 |
|---|---|---|---|---|---|
| k= | −6.6448E−03 | 5.0000E+01 | 6.4509E+00 | 3.3592E+00 | 1.5508E+01 |
| A4= | 7.3047E−04 | 1.3737E−03 | 6.0413E−03 | 7.8762E−03 | −5.6979E−03 |
| A6= | 2.4805E−04 | 1.5545E−04 | −1.2545E−03 | −1.4492E−03 | −9.3092E−03 |
| A8= | 1.8229E−04 | −1.3050E−04 | 2.0749E−03 | 2.5852E−03 | −1.1186E−04 |
| A10= | −5.3199E−06 | −4.8379E−06 | −1.7926E−03 | −1.0255E−03 | 1.5690E−03 |
| A12= | −1.0325E−05 | 3.6663E−06 | 7.8806E−04 | −2.0333E−05 | −6.2782E−04 |
| A14= | 2.1479E−06 | 6.4699E−06 | −1.6757E−04 | 1.4435E−04 | 1.0872E−04 |
| A16= | 2.4927E−06 | 9.6708E−07 | 1.3512E−05 | −2.2984E−05 | −6.8654E−06 |

| Surface # | 7 | 8 | 9 | 10 | 11 |
|---|---|---|---|---|---|
| k= | −5.6836E+01 | −5.8726E+01 | 4.6193E+00 | 3.0220E−01 | −7.1816E+01 |
| A4= | −1.5947E−02 | −3.4726E−02 | −9.1248E−03 | −5.6009E−02 | −5.9634E−02 |
| A6= | 9.1836E−04 | 4.5220E−03 | −1.3475E−02 | 2.7212E−02 | 3.4371E−02 |
| A8= | −9.0274E−04 | 3.5787E−03 | 7.3945E−03 | −9.1863E−03 | −1.1482E−02 |
| A10= | 3.0561E−04 | −1.8354E−03 | −1.6079E−03 | 1.7760E−03 | 2.1425E−03 |
| A12= | −4.7944E−05 | 3.5462E−04 | 1.5372E−04 | −1.9928E−04 | −2.3289E−04 |
| A14= | 4.7533E−06 | −3.2059E−05 | −3.2134E−06 | 1.2930E−05 | 1.4722E−05 |
| A16= | −2.2059E−07 | 1.1233E−06 | −4.3518E−07 | −4.4979E−07 | −5.0288E−07 |
| A18= | — | — | 2.2100E−08 | 6.4869E−09 | 7.1806E−09 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 10.86 | f/EPD | 3.40 |
| fs [mm] | 53.46 | f/ImgH | 2.41 |
| Fno | 3.40 | EPD/ImgH | 0.71 |
| HFOV [deg.] | 22.0 | Y11/ImgH | 0.36 |
| V3 | 37.4 | EPD/ΣAT | 0.72 |
| Vdmin | 17.0 | ΣAT/BL | 2.69 |
| Vp | 56.0; 20.4 | BL/ImgH | 0.37 |
| V4/V5 | 0.36 | SD/BL | 4.36 |
| (Vi/Ni)min | 10.00 | Ymax/Ymin | 2.49 |
| T23/ΣAT | 0.81 | f × tan(HFOV) [mm] | 4.39 |
| f/f1 | 1.94 | Fno × EPD [mm] | 10.86 |
| f/f3 | −1.03 | FOV [deg.] | 44.00 |
| TL/f | 0.87 | — | — |

11th Embodiment

Figure 21:
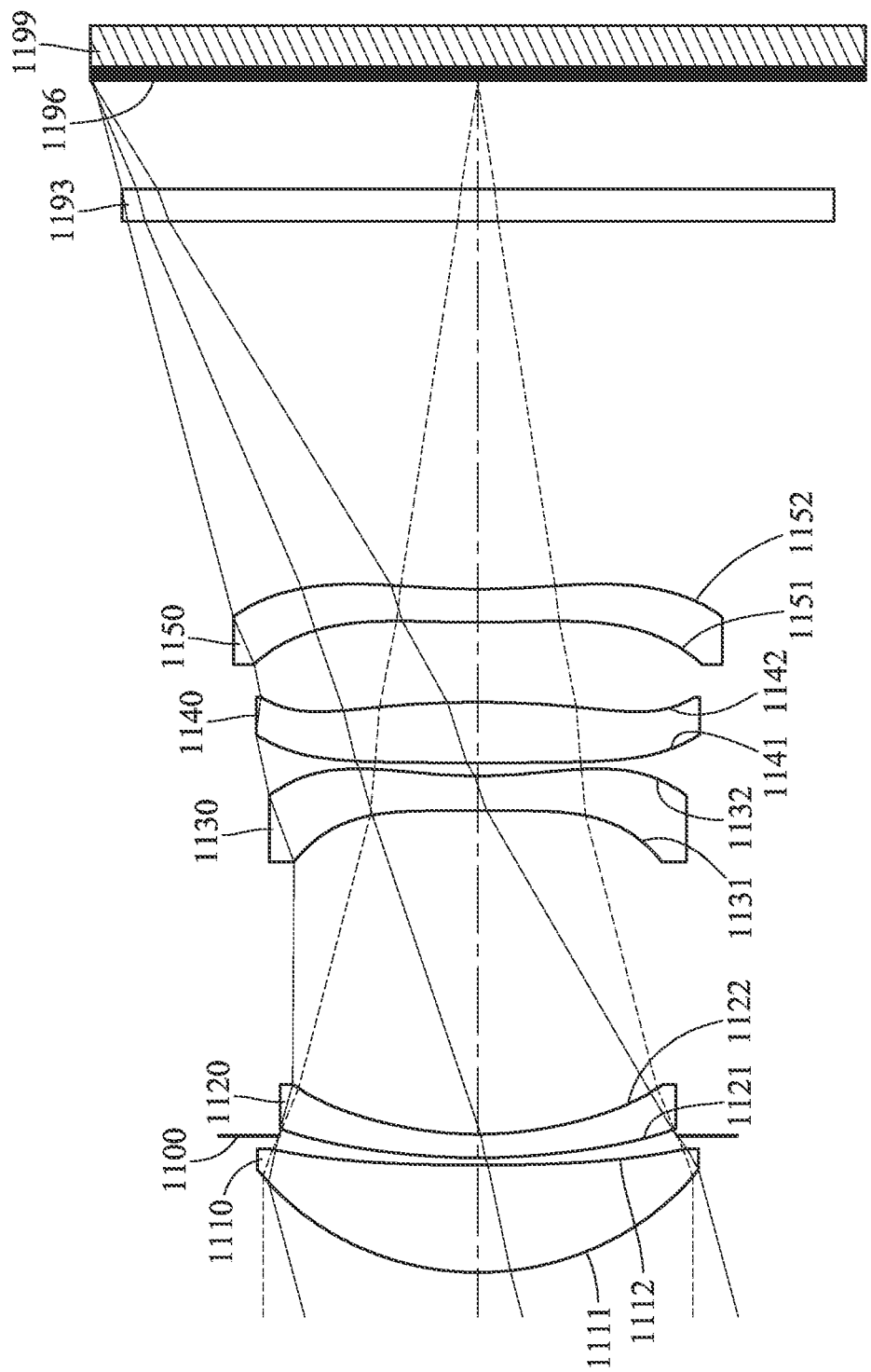
FIG. 21 is a schematic view of an image capturing unit according to the 11th embodiment of the present disclosure.
Figure 22:
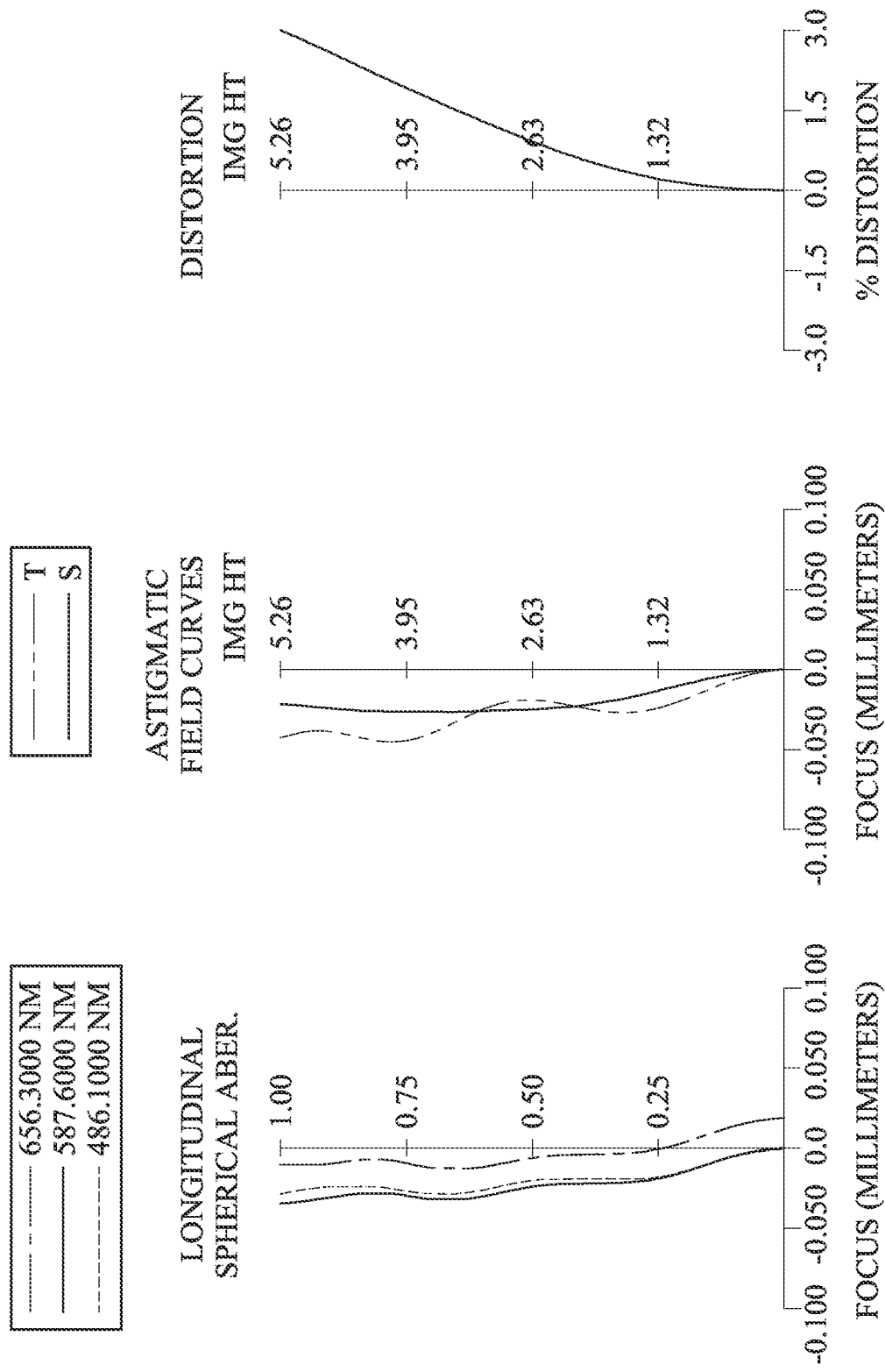
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical image system (its reference numeral is omitted) of the present disclosure and an image sensor 1199. The optical image system includes, in order from an object side to an image side along an optical path, a first lens element 1110, an aperture stop 1100, a second lens element 1120, a third lens element 1130, a fourth lens element 1140, a fifth lens element 1150, a filter 1193 and an image surface 1196, wherein the fifth lens element 1150 can be considered as a last lens element in this embodiment. The optical image system includes five lens elements (1110, 1120, 1130, 1140 and 1150) with no additional lens element disposed between each of the adjacent five lens elements, wherein there is an air gap along an optical axis between each of all adjacent lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The object-side surface 1151 of the fifth lens element 1150 has at least one inflection point. The image-side surface 1152 of the fifth lens element 1150 has at least one inflection point. The image-side surface 1152 of the fifth lens element 1150 has at least one convex critical point in an off-axis region thereof.

The filter 1193 is made of glass material and located between the fifth lens element 1150 and the image surface 1196, and will not affect the focal length of the optical image system. The image sensor 1199 is disposed on or near the image surface 1196 of the optical image system.

The detailed optical data of the 11th embodiment are shown in Table 21 and the aspheric surface data are shown in Table 22 below.

TABLE 21

11th Embodiment
f = 18.97 mm, Fno = 3.25, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.997 | (ASP) | 1.457 | Plastic | 1.544 | 56.0 | 8.36 |
| 2 | | 28.864 | (ASP) | 0.400 | | | | |
| 3 | Ape. Stop | Plano | | −0.300 | | | | |
| 4 | Lens 2 | 8.688 | (ASP) | 0.320 | Plastic | 1.679 | 18.4 | −17.51 |
| 5 | | 4.946 | (ASP) | 4.395 | | | | |
| 6 | Lens 3 | 49.730 | (ASP) | 0.475 | Plastic | 1.544 | 56.0 | −13.99 |
| 7 | | 6.576 | (ASP) | 0.179 | | | | |
| 8 | Lens 4 | 177.395 | (ASP) | 0.822 | Plastic | 1.669 | 19.5 | 18.48 |
| 9 | | −13.267 | (ASP) | 1.087 | | | | |
| 10 | Lens 5 | 19.024 | (ASP) | 0.450 | Plastic | 1.634 | 23.8 | −30.01 |
| 11 | | 9.425 | (ASP) | 5.000 | | | | |

TABLE 21-continued

11th Embodiment
f = 18.97 mm, Fno = 3.25, HFOV = 15.1 deg.

| Surface # | | Curvature Radius | Thickness | Material | Index | Abbe # | Focal Length |
|---|---|---|---|---|---|---|---|
| 12 | Filter | Plano | 0.439 | Glass | 1.517 | 64.2 | — |
| 13 | | Plano | 1.476 | | | | |
| 14 | Image | Plano | — | | | | |

Note:
Reference wavelength is 587.6 nm (d-line).

TABLE 22

Aspheric Coefficients

| Surface # | 1 | 2 | 4 | 5 | 6 |
|---|---|---|---|---|---|
| k= | −3.8964E−02 | −8.4186E+01 | −8.1521E+00 | 6.3113E−01 | −9.0000E+01 |
| A4= | 4.0284E−04 | 1.5079E−03 | −3.4913E−03 | −6.1885E−03 | −2.0159E−02 |
| A6= | −2.7392E−05 | 5.2414E−06 | 1.0331E−03 | 1.2615E−03 | 9.6566E−04 |
| A8= | 1.5616E−05 | 8.3956E−06 | −8.7870E−05 | −1.4377E−04 | −2.0415E−04 |
| A10= | −2.8210E−06 | −7.2788E−07 | 4.2836E−06 | 1.9615E−05 | 2.3830E−05 |
| A12= | 3.1575E−07 | −1.0642E−07 | −3.3119E−07 | −2.5505E−06 | −9.7472E−07 |
| A14= | −1.2488E−08 | 1.0585E−08 | 2.9078E−08 | 1.8913E−07 | −5.3381E−07 |
| A16= | — | — | — | — | 6.0757E−08 |

| Surface # | 7 | 8 | 9 | 10 | 11 |
|---|---|---|---|---|---|
| k= | −1.6487E+01 | 5.0000E+01 | −1.5253E+01 | 1.2708E+01 | −2.4801E−01 |
| A4= | −1.0316E−02 | 1.7782E−03 | −4.6986E−04 | −1.1219E−02 | −1.1516E−02 |
| A6= | 1.5518E−04 | −2.9228E−04 | −2.0556E−04 | −1.5632E−04 | 4.1359E−04 |
| A8= | −4.1989E−05 | 1.5507E−04 | 1.7536E−04 | 1.3442E−04 | 1.4652E−05 |
| A10= | 3.8300E−06 | −1.2661E−05 | −1.1688E−05 | −1.8407E−05 | −1.2424E−06 |
| A12= | −5.6849E−07 | 2.4520E−07 | 1.1576E−06 | 1.1206E−06 | −4.1362E−07 |
| A14= | 4.1562E−08 | −6.1880E−10 | −1.7950E−07 | −4.2551E−08 | 4.6172E−08 |
| A16= | 1.0048E−09 | 4.2731E−10 | 8.4679E−09 | 8.8227E−10 | −1.4660E−09 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 18.97 | f/EPD | 3.25 |
| fs [mm] | 80.05 | f/ImgH | 3.60 |
| Fno | 3.25 | EPD/ImgH | 1.11 |
| HFOV [deg.] | 15.1 | Y11/ImgH | 0.57 |
| V3 | 56.0 | EPD/ΣAT | 1.01 |
| Vdmin | 18.4 | ΣAT/BL | 0.83 |
| Vp | 56.0; 19.5 | BL/ImgH | 1.31 |
| V4/V5 | 0.82 | SD/BL | 1.07 |
| (Vi/Ni)min | 10.96 | Ymax/Ymin | 1.33 |
| T23/ΣAT | 0.76 | f × tan(HFOV) [mm] | 5.12 |
| f/f1 | 2.27 | Fno × EPD [mm] | 18.97 |
| f/f3 | −1.36 | FOV [deg.] | 30.20 |
| TL/f | 0.85 | — | — |

12th Embodiment

Figure 23:
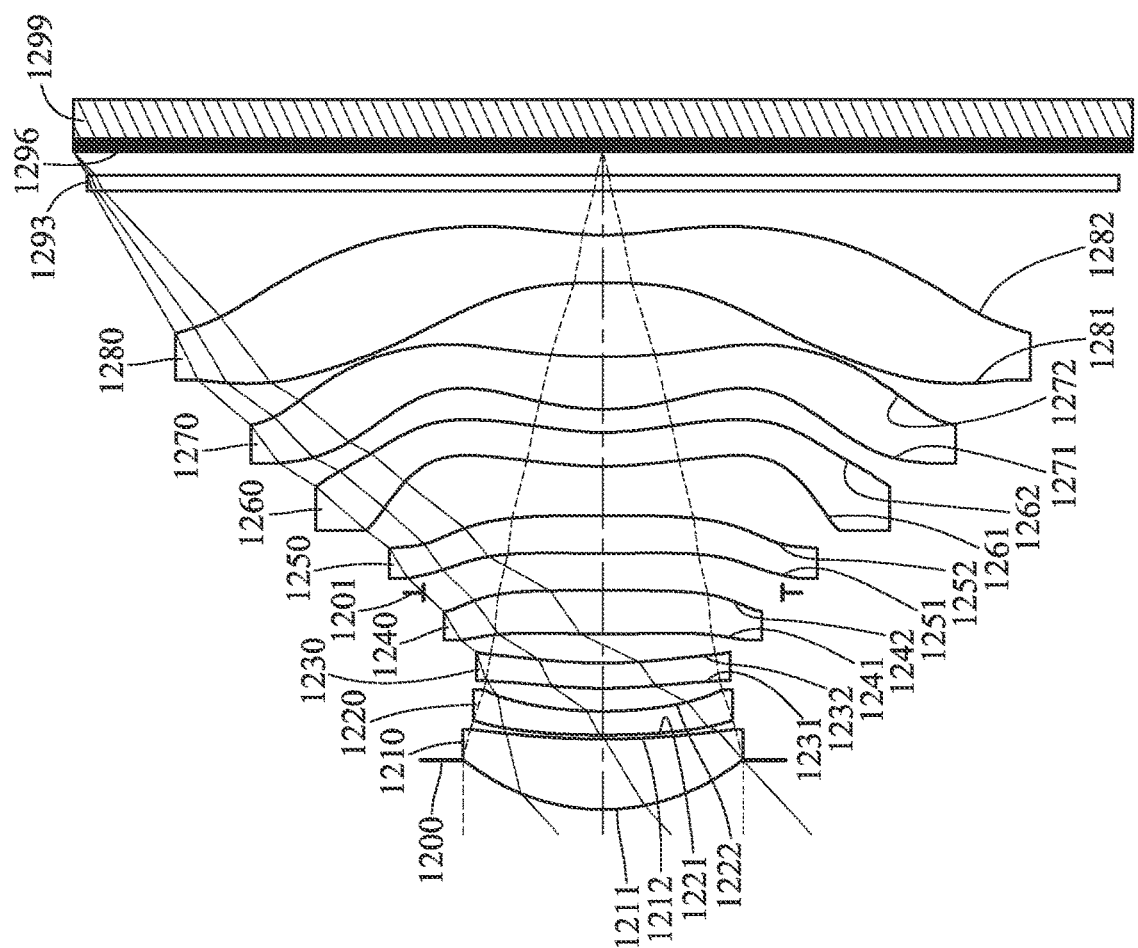
FIG. 23 is a schematic view of an image capturing unit according to the 12th embodiment of the present disclosure.
Figure 24:
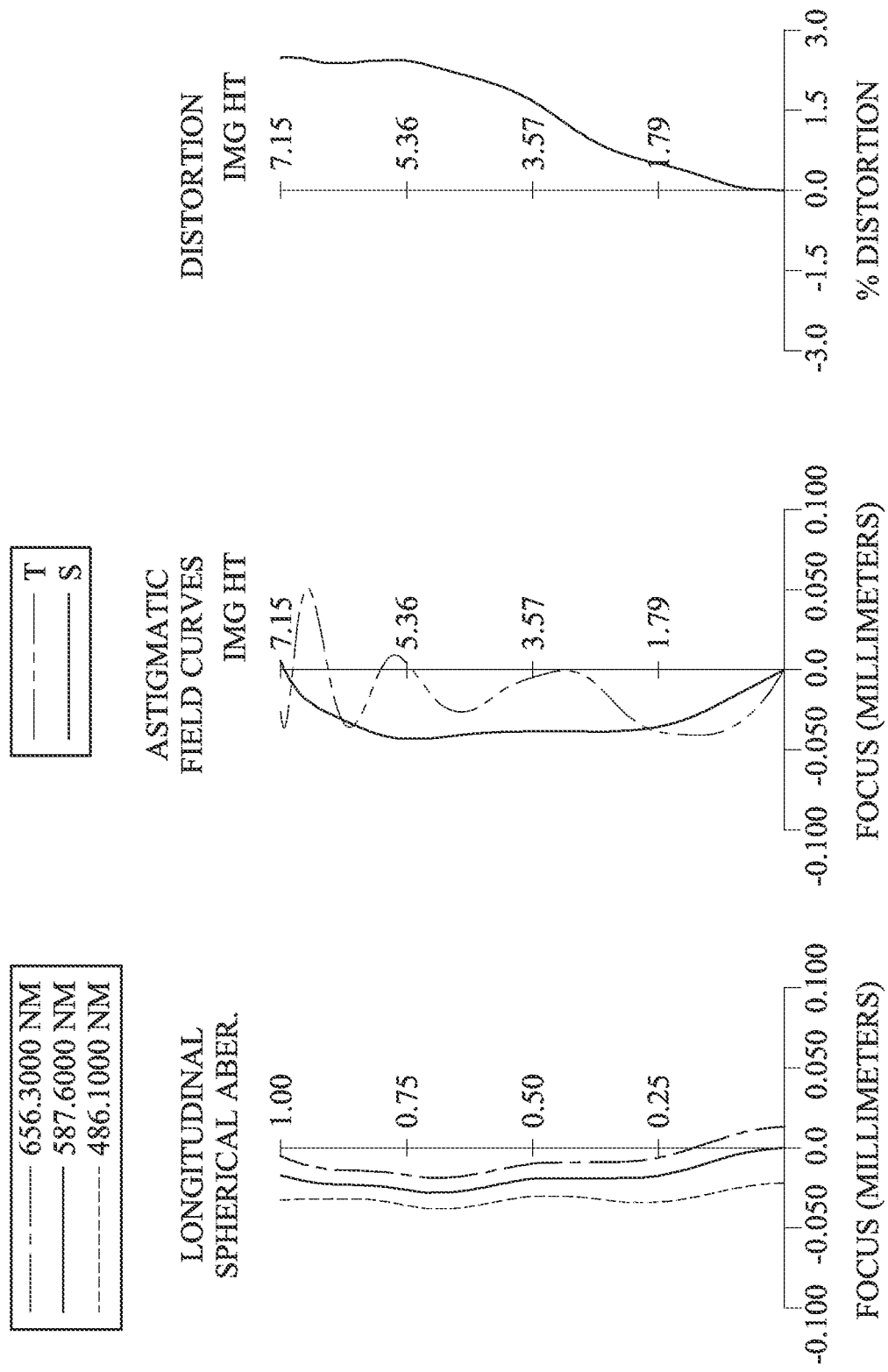
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the optical image system (its reference numeral is omitted) of the present disclosure and an image sensor 1299. The optical image system includes, in order from an object side to an image side along an optical path, an aperture stop 1200, a first lens element 1210, a second lens element 1220, a third lens element 1230, a fourth lens element 1240, a stop 1201, a fifth lens element 1250, a sixth lens element 1260, a seventh lens element 1270, an eighth lens element 1280, a filter 1293 and an image surface 1296, wherein the eighth lens element 1280 can be considered as a last lens element in this embodiment. The optical image system includes eight lens elements (1210, 1220, 1230, 1240, 1250, 1260, 1270 and 1280) with no additional lens element disposed between each of the adjacent eight lens elements, wherein there is an air gap along an optical axis between each of all adjacent lens elements.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric.

The second lens element 1220 with negative refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with negative refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric.

The fourth lens element 1240 with positive refractive power has an object-side surface 1241 being convex in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with positive refractive power has an object-side surface 1251 being convex in a paraxial region thereof and an image-side surface 1252 being convex in a paraxial region thereof. The fifth lens element 1250 is made of plastic material and has the object-side surface 1251 and the image-side surface 1252 being both aspheric. The object-side surface 1251 of the fifth lens element 1250 has at least one inflection point. The image-side surface 1252 of the fifth lens element 1250 has at least one inflection point.

The sixth lens element 1260 with negative refractive power has an object-side surface 1261 being convex in a paraxial region thereof and an image-side surface 1262 being concave in a paraxial region thereof. The sixth lens element 1260 is made of plastic material and has the object-side surface 1261 and the image-side surface 1262 being both aspheric.

The seventh lens element 1270 with positive refractive power has an object-side surface 1271 being convex in a paraxial region thereof and an image-side surface 1272 being concave in a paraxial region thereof. The seventh lens element 1270 is made of plastic material and has the object-side surface 1271 and the image-side surface 1272 being both aspheric.

The eighth lens element 1280 with negative refractive power has an object-side surface 1281 being concave in a paraxial region thereof and an image-side surface 1282 being concave in a paraxial region thereof. The eighth lens element 1280 is made of plastic material and has the object-side surface 1281 and the image-side surface 1282 being both aspheric. The image-side surface 1282 of the eighth lens element 1280 has at least one convex critical point in an off-axis region thereof.

The filter 1293 is made of glass material and located between the eighth lens element 1280 and the image surface 1296, and will not affect the focal length of the optical image system. The image sensor 1299 is disposed on or near the image surface 1296 of the optical image system.

The detailed optical data of the 12th embodiment are shown in Table 23 and the aspheric surface data are shown in Table 24 below.

TABLE 23

12th Embodiment
f = 7.60 mm, Fno = 2.01, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.665 | | | | |
| 2 | Lens 1 | 2.959 | (ASP) | 0.950 | Plastic | 1.545 | 56.1 | 7.32 |
| 3 | | 10.182 | (ASP) | 0.054 | | | | |
| 4 | Lens 2 | 10.909 | (ASP) | 0.320 | Plastic | 1.686 | 18.4 | −18.25 |
| 5 | | 5.760 | (ASP) | 0.310 | | | | |
| 6 | Lens 3 | 6.771 | (ASP) | 0.340 | Plastic | 1.686 | 18.4 | −418.89 |
| 7 | | 6.480 | (ASP) | 0.405 | | | | |
| 8 | Lens 4 | 22.798 | (ASP) | 0.586 | Plastic | 1.544 | 56.0 | 40.78 |
| 9 | | −822.475 | (ASP) | −0.030 | | | | |
| 10 | Stop | Plano | | 0.530 | | | | |
| 11 | Lens 5 | 45.378 | (ASP) | 0.511 | Plastic | 1.544 | 56.0 | 63.80 |
| 12 | | −147.091 | (ASP) | 0.665 | | | | |
| 13 | Lens 6 | 5.313 | (ASP) | 0.460 | Plastic | 1.566 | 37.4 | −22.57 |
| 14 | | 3.635 | (ASP) | 0.310 | | | | |
| 15 | Lens 7 | 3.265 | (ASP) | 0.713 | Plastic | 1.544 | 56.0 | 8.20 |
| 16 | | 11.234 | (ASP) | 1.002 | | | | |
| 17 | Lens 8 | −12.017 | (ASP) | 0.645 | Plastic | 1.534 | 55.9 | −5.84 |
| 18 | | 4.288 | (ASP) | 0.600 | | | | |
| 19 | Filter | Plano | | 0.210 | Glass | 1.517 | 64.2 | — |
| 20 | | Plano | | 0.316 | | | | |
| 21 | Image | Plano | | — | | | | |

Note:
Reference wavelength is 587.6 nm (d-line).
An effective radius of the stop 1201 (Surface 10) is 2.425 mm.

TABLE 24

Aspheric Coefficients

| Surface # | 2 | 3 | 4 | 5 | 6 |
|---|---|---|---|---|---|
| k= | −6.5082E−01 | −3.6458E+01 | 1.3484E+01 | 3.8832E+00 | −1.1323E+00 |
| A4= | 3.0929E−03 | −7.5676E−03 | −7.6770E−03 | −8.3354E−04 | −1.8687E−02 |

TABLE 24-continued

| Aspheric Coefficients | | | | | |
|---|---|---|---|---|---|
| A6= | −4.2474E−05 | 1.0163E−02 | 1.3264E−02 | 6.6643E−03 | 5.8543E−03 |
| A8= | 6.0718E−04 | −5.0238E−03 | −6.3159E−03 | −3.1522E−03 | −4.6014E−03 |
| A10= | −4.9586E−04 | 1.2216E−03 | 1.4610E−03 | 7.7999E−04 | 3.0935E−03 |
| A12= | 1.9552E−04 | −1.5098E−04 | −1.3766E−04 | −1.2883E−04 | −1.3970E−03 |
| A14= | −3.7900E−05 | 7.3415E−06 | 3.9721E−06 | 2.2230E−05 | 3.4914E−04 |
| A16= | 2.6505E−06 | — | — | — | −3.3105E−05 |

| Surface # | 7 | 8 | 9 | 11 | 12 |
|---|---|---|---|---|---|
| k= | 2.2190E+00 | 0.0000E+00 | 0.0000E+00 | 0.0000E+00 | 0.0000E+00 |
| A4= | −1.7247E−02 | −6.4006E−03 | −1.3068E−02 | −1.3560E−02 | −1.6750E−02 |
| A6= | 2.8275E−03 | −1.2432E−02 | 8.4783E−03 | 8.8839E−03 | 9.3568E−03 |
| A8= | −9.0842E−04 | 1.7482E−02 | −1.5153E−02 | −1.0976E−02 | −8.9058E−03 |
| A10= | −1.3640E−04 | −1.5698E−02 | 1.3065E−02 | 6.9291E−03 | 4.6631E−03 |
| A12= | 5.6992E−04 | 8.2685E−03 | −6.9196E−03 | −2.6884E−03 | −1.4978E−03 |
| A14= | −3.6327E−04 | −2.5555E−03 | 2.2685E−03 | 6.3428E−04 | 2.9439E−04 |
| A16= | 1.0686E−04 | 4.2950E−04 | −4.4782E−04 | −8.6585E−05 | −3.3689E−05 |
| A18= | −1.1570E−05 | −2.9817E−05 | 4.8858E−05 | 6.2510E−06 | 2.0466E−06 |
| A20= | — | — | −2.2497E−06 | −1.8436E−07 | −5.0931E−08 |

| Surface # | 13 | 14 | 15 | 16 | 17 |
|---|---|---|---|---|---|
| k= | −3.6729E+01 | −2.1902E+01 | −1.0000E+00 | 4.5257E−02 | 0.0000E+00 |
| A4= | −3.0780E−03 | −8.0543E−03 | −2.0539E−02 | 1.4539E−02 | −3.7906E−02 |
| A6= | 2.0053E−03 | −1.6862E−03 | 3.4069E−03 | −4.5946E−03 | 7.8574E−03 |
| A8= | −1.5531E−03 | 1.2429E−03 | −2.2617E−03 | −3.4667E−04 | −8.1220E−04 |
| A10= | 5.3840E−04 | −3.5759E−04 | 5.9307E−04 | 2.6345E−04 | 5.0440E−05 |
| A12= | −1.3417E−04 | 4.9008E−05 | −8.5203E−05 | −4.4720E−05 | −1.9501E−06 |
| A14= | 2.0685E−05 | −3.4293E−06 | 7.6819E−06 | 4.0521E−06 | 4.6132E−08 |
| A16= | −1.8766E−06 | 1.1833E−07 | −4.4602E−07 | −2.2054E−07 | −6.0164E−10 |
| A18= | 9.3337E−08 | −1.5546E−09 | 1.6163E−08 | 7.2350E−09 | 2.4460E−12 |
| A20= | −1.9605E−09 | −1.9314E−12 | −3.3194E−10 | −1.3211E−10 | 3.3161E−14 |

| Surface # | 18 |
|---|---|
| k= | −1.0000E+00 |
| A4= | −4.3918E−02 |
| A6= | 9.7440E−03 |
| A8= | −1.8384E−03 |
| A10= | 2.7781E−04 |
| A12= | −3.1116E−05 |
| A14= | 2.4655E−06 |
| A16= | −1.3571E−07 |
| A18= | 5.1274E−09 |
| A20= | −1.3008E−10 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 7.60 | f/EPD | 2.01 |
| fs [mm] | 23.49 | f/ImgH | 1.06 |
| Fno | 2.01 | EPD/ImgH | 0.53 |
| HFOV [deg.] | 42.6 | Y11/ImgH | 0.26 |
| V3 | 18.4 | EPD/ΣAT | 1.17 |
| Vdmin | 18.4 | ΣAT/BL | 2.88 |
| Vp | 56.1; 56.0; 56.0; 56.0 | BL/ImgH | 0.16 |
| V4/V5 | 1.00 | SD/BL | 6.31 |
| (Vi/Ni)min | 10.91 | Ymax/Ymin | 3.58 |
| T23/ΣAT | 0.10 | f × tan(HFOV) [mm] | 6.99 |

-continued

| 12th Embodiment | | | |
|---|---|---|---|
| f/f1 | 1.04 | Fno × EPD [mm] | 7.60 |
| f/f3 | −0.02 | FOV [deg.] | 85.20 |
| TL/f | 1.17 | — | — |

13th Embodiment

Figure 25:
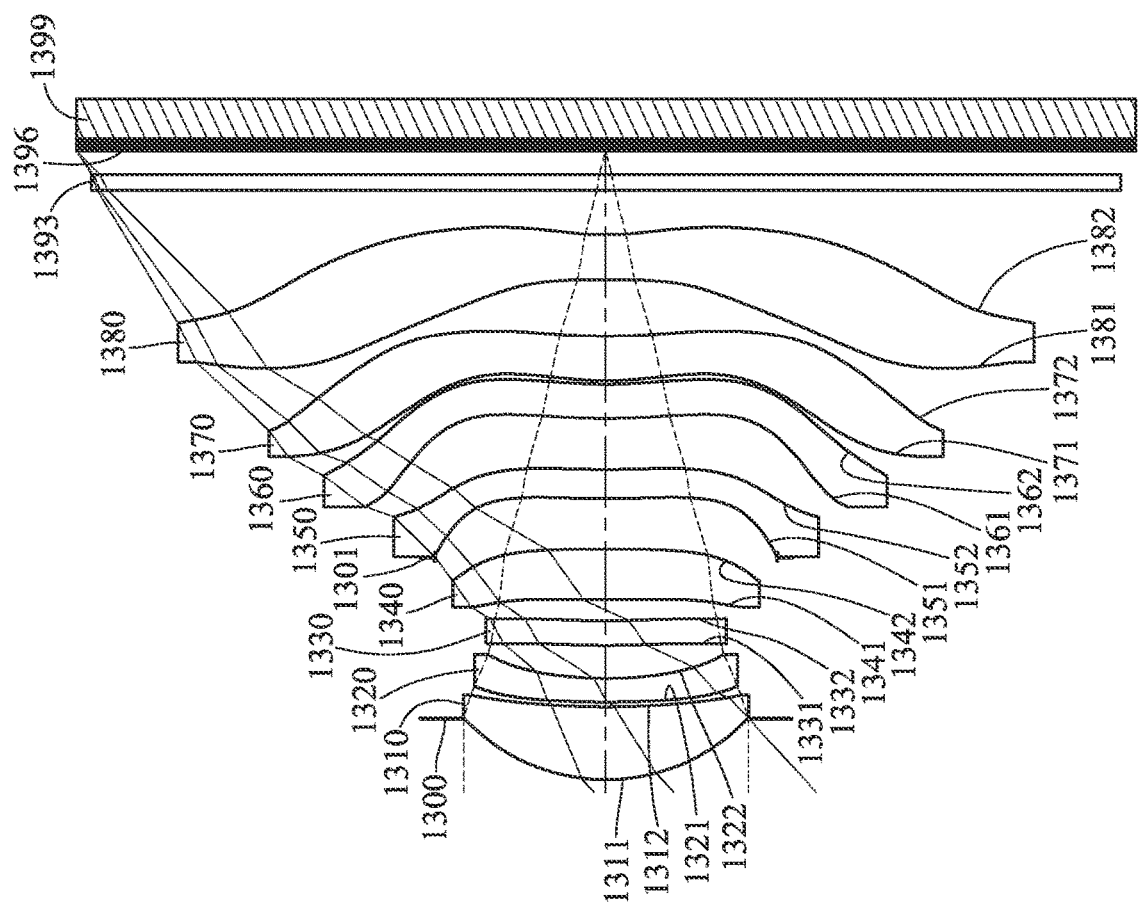
FIG. 25 is a schematic view of an image capturing unit according to the 13th embodiment of the present disclosure.
Figure 26:
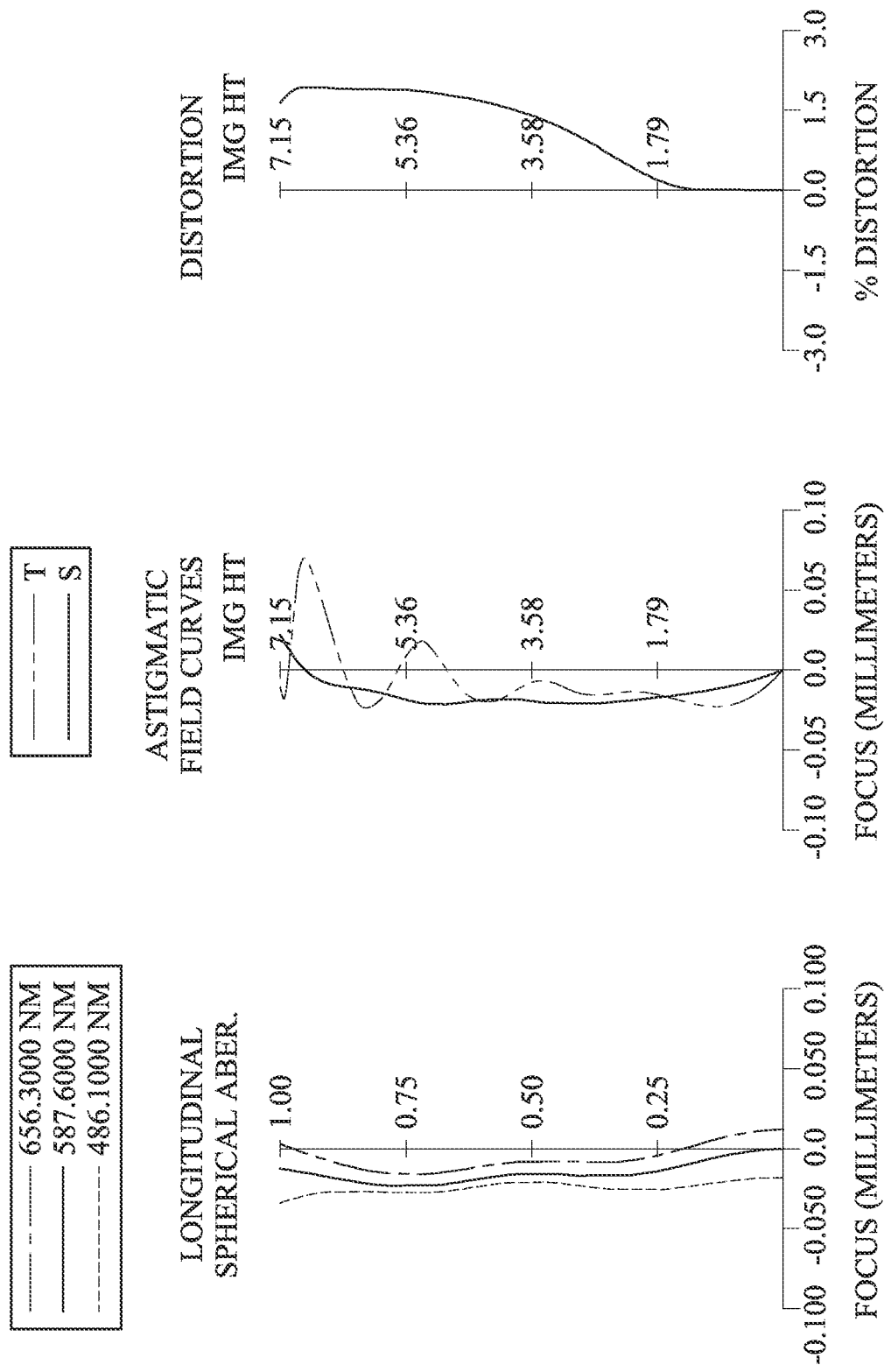
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the optical image system (its reference numeral is omitted) of the present disclosure and an image sensor 1399. The optical image system includes, in order from an object side to an image side along an optical path, an aperture stop 1300, a first lens element 1310, a second lens element 1320, a third lens element 1330, a fourth lens element 1340, a stop 1301, a fifth lens element 1350, a sixth lens element 1360, a seventh lens element 1370, an eighth lens element 1380, a filter 1393 and an image surface 1396, wherein the eighth lens element 1380 can be considered as a last lens element in this embodiment. The optical image system includes eight lens elements (1310, 1320, 1330, 1340, 1350, 1360, 1370 and 1380) with no additional lens element disposed between each of the adjacent eight lens elements, wherein there is an air gap along an optical axis between each of all adjacent lens elements.

The first lens element 1310 with positive refractive power has an object-side surface 1311 being convex in a paraxial region thereof and an image-side surface 1312 being concave in a paraxial region thereof. The first lens element 1310 is made of plastic material and has the object-side surface 1311 and the image-side surface 1312 being both aspheric.

The second lens element 1320 with negative refractive power has an object-side surface 1321 being convex in a paraxial region thereof and an image-side surface 1322 being concave in a paraxial region thereof. The second lens element 1320 is made of plastic material and has the object-side surface 1321 and the image-side surface 1322 being both aspheric.

The third lens element 1330 with negative refractive power has an object-side surface 1331 being convex in a paraxial region thereof and an image-side surface 1332 being concave in a paraxial region thereof. The third lens element 1330 is made of plastic material and has the object-side surface 1331 and the image-side surface 1332 being both aspheric.

The fourth lens element 1340 with positive refractive power has an object-side surface 1341 being convex in a paraxial region thereof and an image-side surface 1342 being convex in a paraxial region thereof. The fourth lens element 1340 is made of plastic material and has the object-side surface 1341 and the image-side surface 1342 being both aspheric.

The fifth lens element 1350 with positive refractive power has an object-side surface 1351 being convex in a paraxial region thereof and an image-side surface 1352 being concave in a paraxial region thereof. The fifth lens element 1350 is made of plastic material and has the object-side surface 1351 and the image-side surface 1352 being both aspheric. The object-side surface 1351 of the fifth lens element 1350 has at least one inflection point. The image-side surface 1352 of the fifth lens element 1350 has at least one inflection point.

The sixth lens element 1360 with negative refractive power has an object-side surface 1361 being convex in a paraxial region thereof and an image-side surface 1362 being concave in a paraxial region thereof. The sixth lens element 1360 is made of plastic material and has the object-side surface 1361 and the image-side surface 1362 being both aspheric.

The seventh lens element 1370 with positive refractive power has an object-side surface 1371 being convex in a paraxial region thereof and an image-side surface 1372 being concave in a paraxial region thereof. The seventh lens element 1370 is made of plastic material and has the object-side surface 1371 and the image-side surface 1372 being both aspheric.

The eighth lens element 1380 with negative refractive power has an object-side surface 1381 being concave in a paraxial region thereof and an image-side surface 1382 being concave in a paraxial region thereof. The eighth lens element 1380 is made of plastic material and has the object-side surface 1381 and the image-side surface 1382 being both aspheric. The image-side surface 1382 of the eighth lens element 1380 has at least one convex critical point in an off-axis region thereof.

The filter 1393 is made of glass material and located between the eighth lens element 1380 and the image surface 1396, and will not affect the focal length of the optical image system. The image sensor 1399 is disposed on or near the image surface 1396 of the optical image system.

The detailed optical data of the 13th embodiment are shown in Table 25 and the aspheric surface data are shown in Table 26 below.

TABLE 25

13th Embodiment
f = 7.68 mm, Fno = 2.00, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.830 | | | | |
| 2 | Lens 1 | 2.645 | (ASP) | 0.982 | Plastic | 1.545 | 56.1 | 6.36 |
| 3 | | 9.686 | (ASP) | 0.066 | | | | |
| 4 | Lens 2 | 10.954 | (ASP) | 0.320 | Plastic | 1.686 | 18.4 | −16.06 |
| 5 | | 5.427 | (ASP) | 0.445 | | | | |
| 6 | Lens 3 | 12.234 | (ASP) | 0.340 | Plastic | 1.686 | 18.4 | −362.31 |
| 7 | | 11.528 | (ASP) | 0.284 | | | | |
| 8 | Lens 4 | 24.910 | (ASP) | 0.684 | Plastic | 1.544 | 56.0 | 29.77 |
| 9 | | −45.862 | (ASP) | −0.106 | | | | |
| 10 | Stop | Plano | | 0.790 | | | | |
| 11 | Lens 5 | 11.736 | (ASP) | 0.393 | Plastic | 1.544 | 56.0 | 524.22 |
| 12 | | 12.095 | (ASP) | 0.688 | | | | |
| 13 | Lens 6 | 7.681 | (ASP) | 0.462 | Plastic | 1.587 | 28.3 | −36.65 |
| 14 | | 5.535 | (ASP) | 0.048 | | | | |
| 15 | Lens 7 | 4.644 | (ASP) | 0.607 | Plastic | 1.544 | 56.0 | 15.54 |
| 16 | | 9.832 | (ASP) | 0.761 | | | | |
| 17 | Lens 8 | −85.874 | (ASP) | 0.610 | Plastic | 1.534 | 56.0 | −6.55 |
| 18 | | 3.657 | (ASP) | 0.600 | | | | |
| 19 | Filter | Plano | | 0.210 | Glass | 1.517 | 64.2 | — |
| 20 | | Plano | | 0.315 | | | | |
| 21 | Image | Plano | | — | | | | |

Note:
Reference wavelength is 587.6 nm (d-line).
An effective radius of the stop 1301 (Surface 10) is 2.310 mm.

TABLE 26

| Aspheric Coefficients | | | | | |
|---|---|---|---|---|---|
| Surface # | 2 | 3 | 4 | 5 | 6 |
| k= | −5.1808E−01 | −3.6788E+01 | −6.3082E+01 | 4.6976E+00 | 1.4636E+01 |
| A4= | 3.4483E−03 | −1.3225E−02 | −1.0711E−02 | −4.6862E−03 | −2.1744E−02 |
| A6= | 1.3469E−03 | 1.5298E−02 | 1.9939E−02 | 1.1631E−02 | 7.8232E−03 |
| A8= | −9.0730E−04 | −4.3573E−03 | −6.5183E−03 | −5.2073E−03 | −8.0452E−03 |
| A10= | 7.2112E−04 | −1.5439E−03 | −1.6075E−03 | 7.3753E−04 | 6.4924E−03 |
| A12= | −3.0608E−04 | 1.3631E−03 | 1.8445E−03 | 2.5125E−04 | −3.3824E−03 |
| A14= | 6.6513E−05 | −3.2938E−04 | −4.8672E−04 | −5.2739E−05 | 9.9496E−04 |
| A16= | −5.9072E−06 | 2.7146E−05 | 4.3704E−05 | 0.0000E+00 | −1.1735E−04 |
| Surface # | 7 | 8 | 9 | 11 | 12 |
| k= | 9.1333E+00 | 0.0000E+00 | 0.0000E+00 | 0.0000E+00 | 0.0000E+00 |
| A4= | −2.6325E−02 | −1.7742E−02 | −1.7827E−02 | −3.3873E−02 | −4.2379E−02 |
| A6= | 1.2907E−02 | −2.1284E−03 | 6.1732E−03 | 1.5822E−02 | 2.4194E−02 |
| A8= | −1.4166E−02 | 6.0046E−03 | −9.0132E−03 | −1.3051E−02 | −1.7974E−02 |
| A10= | 1.2216E−02 | −6.9963E−03 | 6.5407E−03 | 6.2522E−03 | 8.6319E−03 |
| A12= | −6.6757E−03 | 4.3327E−03 | −2.7804E−03 | −1.9164E−03 | −2.7295E−03 |
| A14= | 2.1945E−03 | −1.5279E−03 | 6.2478E−04 | 3.3947E−04 | 5.6207E−04 |
| A16= | −3.7027E−04 | 2.9215E−04 | −5.0573E−05 | −2.8486E−05 | −7.3055E−05 |
| A18= | 2.4356E−05 | −2.2799E−05 | −4.9703E−06 | 8.7873E−08 | 5.7252E−06 |
| A20= | — | — | 8.8970E−07 | 1.0266E−07 | −2.4548E−07 |
| Surface # | 13 | 14 | 15 | 16 | 17 |
| k= | −7.6878E+00 | −5.4977E+01 | −1.0000E+00 | 0.0000E+00 | 0.0000E+00 |
| A4= | −3.6192E−02 | −3.0337E−02 | −3.9645E−02 | 8.4983E−03 | −6.1387E−02 |
| A6= | 2.5744E−02 | 2.3099E−02 | 8.1412E−03 | −2.0662E−02 | 1.5249E−02 |
| A8= | −1.4727E−02 | −1.1809E−02 | −4.0669E−03 | 9.6418E−03 | −1.2792E−03 |
| A10= | 4.8718E−03 | 3.0183E−03 | 1.3985E−03 | −2.5332E−03 | −1.2994E−04 |
| A12= | −1.0878E−03 | −4.0205E−04 | −2.8817E−04 | 4.2813E−04 | 4.4040E−05 |
| A14= | 1.7123E−04 | 1.9777E−05 | 3.7803E−05 | −4.9376E−05 | −5.2493E−06 |
| A16= | −1.8837E−05 | 1.7942E−06 | −3.2408E−06 | 3.9790E−06 | 3.7322E−07 |
| A18= | 1.3729E−06 | −3.4779E−07 | 1.8092E−07 | −2.2393E−07 | −1.7576E−08 |
| A20= | −5.8738E−08 | 2.3279E−08 | −6.3425E−09 | 8.6074E−09 | 5.6429E−10 |
| Surface # | 18 | | | | |
| k= | −1.0000E+00 | | | | |
| A4= | −7.0873E−02 | | | | |
| A6= | 2.0491E−02 | | | | |
| A8= | −4.1898E−03 | | | | |
| A10= | 6.1254E−04 | | | | |
| A12= | −6.5647E−05 | | | | |
| A14= | 5.2186E−06 | | | | |
| A16= | −3.0772E−07 | | | | |
| A18= | 1.3333E−08 | | | | |
| A20= | −4.1660E−10 | | | | |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 7.68 | f/EPD | 2.00 |
| fs [mm] | 23.52 | f/ImgH | 1.07 |
| Fno | 2.00 | EPD/ImgH | 0.54 |
| HFOV [deg.] | 42.6 | Y11/ImgH | 0.27 |
| V3 | 18.4 | EPD/ΣAT | 1.29 |
| Vdmin | 18.4 | ΣAT/BL | 2.64 |
| Vp | 56.1; 56.0; 56.0; 56.0 | BL/ImgH | 0.16 |
| V4/V5 | 1.00 | SD/BL | 5.82 |
| (Vi/Ni)min | 10.91 | Ymax/Ymin | 3.66 |
| T23/ΣAT | 0.15 | f × tan(HFOV) [mm] | 7.06 |
| f/f1 | 1.21 | Fno × EPD [mm] | 7.68 |
| f/f3 | −0.02 | FOV [deg.] | 85.20 |
| TL/f | 1.11 | — | — |

14th Embodiment

Figure 27:
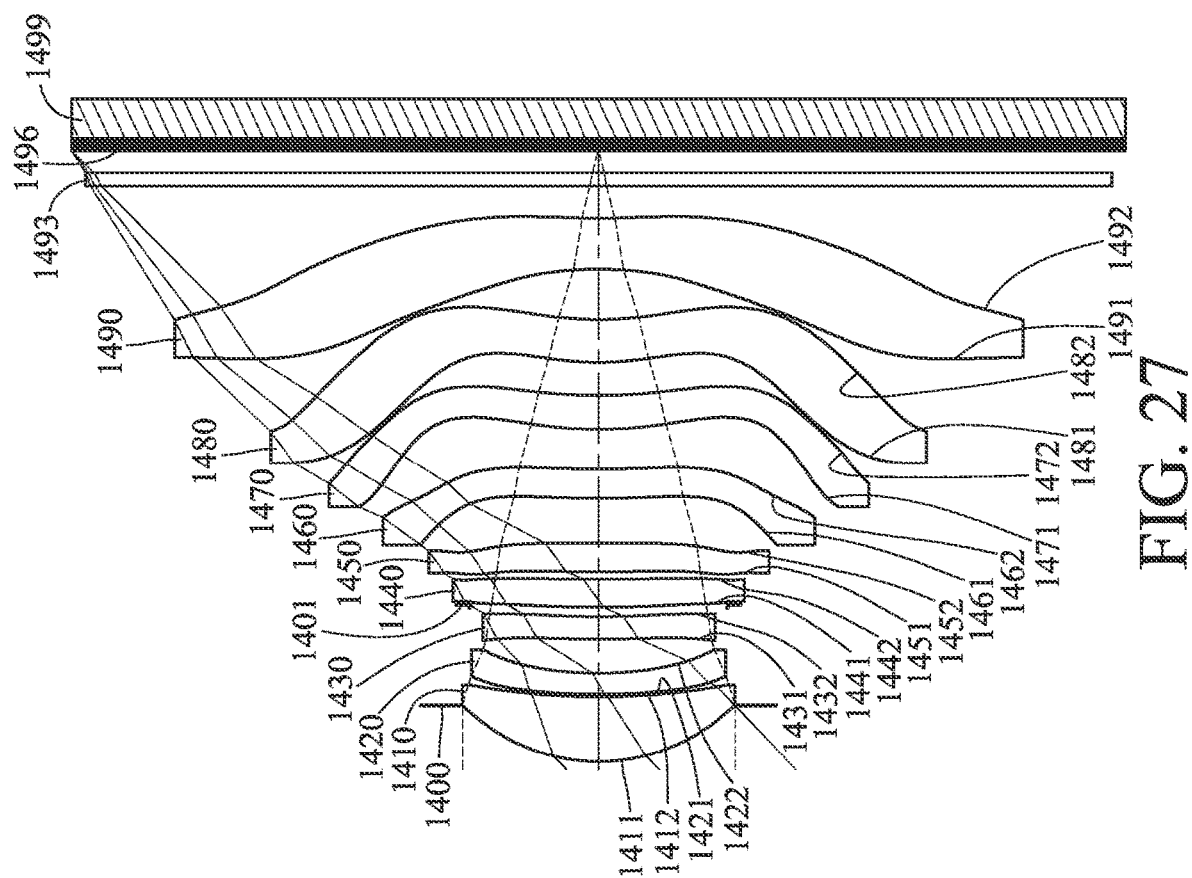
FIG. 27 is a schematic view of an image capturing unit according to the 14th embodiment of the present disclosure.
Figure 28:
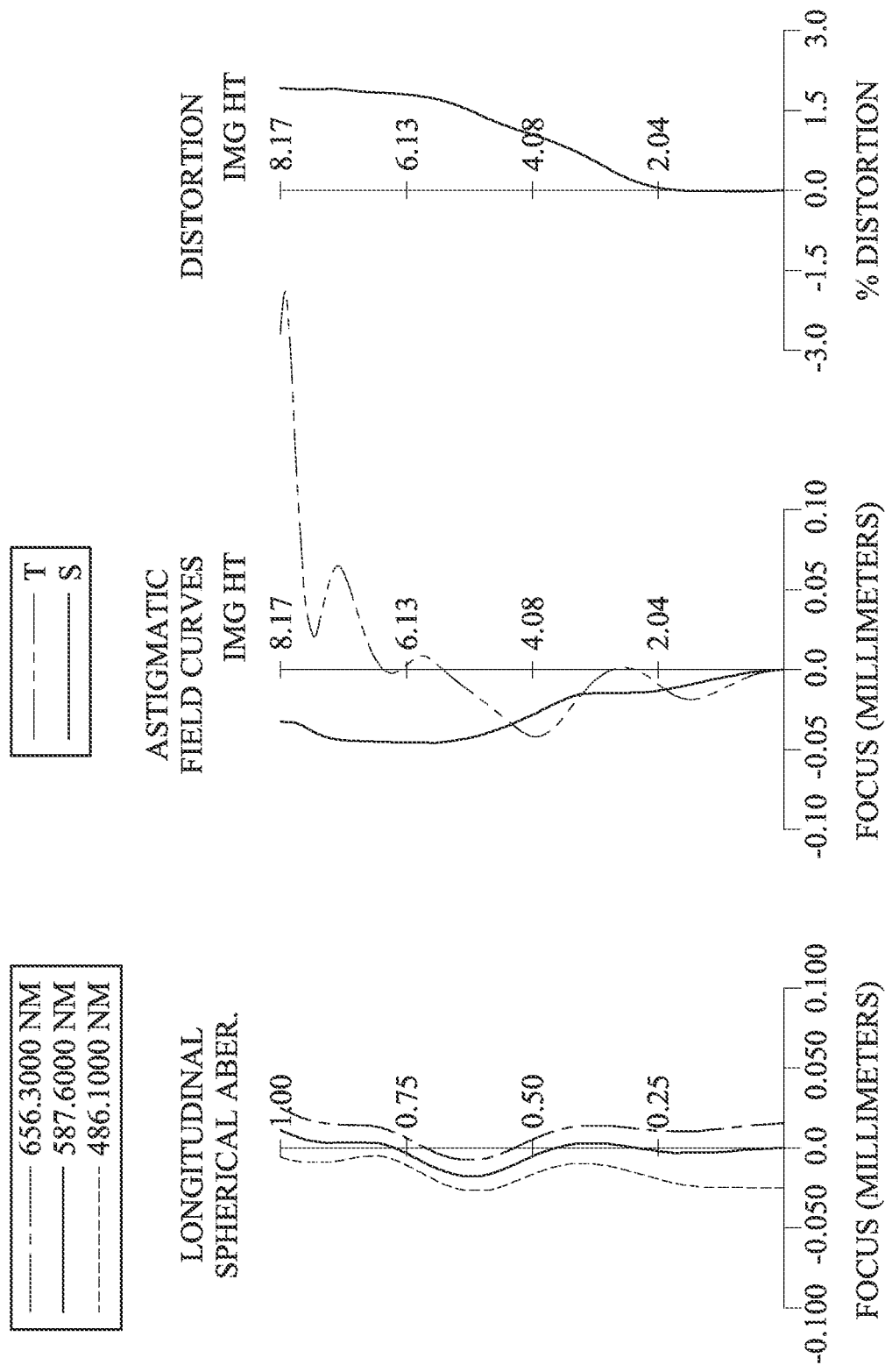
FIG. 28 shows spherical aberration curves, astigmatic field curves and a distortion curve of the image capturing unit according to the 14th embodiment.

FIG. 27 is a schematic view of an image capturing unit according to the 14th embodiment of the present disclosure. FIG. 28 shows, in order from left to right, spherical aberration curves, astigmatic field curves and a distortion curve of the image capturing unit according to the 14th embodiment. In FIG. 27, the image capturing unit includes the optical image system (its reference numeral is omitted) of the present disclosure and an image sensor 1499. The optical image system includes, in order from an object side to an image side along an optical path, an aperture stop 1400, a first lens element 1410, a second lens element 1420, a third lens element 1430, a stop 1401, a fourth lens element 1440, a fifth lens element 1450, a sixth lens element 1460, a seventh lens element 1470, an eighth lens element 1480, a ninth lens element 1490, a filter 1493 and an image surface 1496, wherein the ninth lens element 1490 can be considered as a last lens element in this embodiment. The optical image system includes nine lens elements (1410, 1420, 1430, 1440, 1450, 1460, 1470, 1480 and 1490) with no additional lens element disposed between each of the adjacent nine lens elements, wherein there is an air gap along an optical axis between each of all adjacent lens elements.

The first lens element 1410 with positive refractive power has an object-side surface 1411 being convex in a paraxial region thereof and an image-side surface 1412 being concave in a paraxial region thereof. The first lens element 1410 is made of plastic material and has the object-side surface 1411 and the image-side surface 1412 being both aspheric.

The second lens element 1420 with negative refractive power has an object-side surface 1421 being convex in a paraxial region thereof and an image-side surface 1422 being concave in a paraxial region thereof. The second lens element 1420 is made of plastic material and has the object-side surface 1421 and the image-side surface 1422 being both aspheric.

The third lens element 1430 with negative refractive power has an object-side surface 1431 being convex in a paraxial region thereof and an image-side surface 1432 being concave in a paraxial region thereof. The third lens element 1430 is made of plastic material and has the object-side surface 1431 and the image-side surface 1432 being both aspheric.

The fourth lens element 1440 with positive refractive power has an object-side surface 1441 being convex in a paraxial region thereof and an image-side surface 1442 being concave in a paraxial region thereof. The fourth lens element 1440 is made of plastic material and has the object-side surface 1441 and the image-side surface 1442 being both aspheric.

The fifth lens element 1450 with positive refractive power has an object-side surface 1451 being convex in a paraxial region thereof and an image-side surface 1452 being concave in a paraxial region thereof. The fifth lens element 1450 is made of plastic material and has the object-side surface 1451 and the image-side surface 1452 being both aspheric. The object-side surface 1451 of the fifth lens element 1450 has at least one inflection point. The image-side surface 1452 of the fifth lens element 1450 has at least one inflection point.

The sixth lens element 1460 with positive refractive power has an object-side surface 1461 being convex in a paraxial region thereof and an image-side surface 1462 being concave in a paraxial region thereof. The sixth lens element 1460 is made of plastic material and has the object-side surface 1461 and the image-side surface 1462 being both aspheric.

The seventh lens element 1470 with positive refractive power has an object-side surface 1471 being convex in a paraxial region thereof and an image-side surface 1472 being concave in a paraxial region thereof. The seventh lens element 1470 is made of plastic material and has the object-side surface 1471 and the image-side surface 1472 being both aspheric.

The eighth lens element 1480 with positive refractive power has an object-side surface 1481 being convex in a paraxial region thereof and an image-side surface 1482 being concave in a paraxial region thereof. The eighth lens element 1480 is made of plastic material and has the object-side surface 1481 and the image-side surface 1482 being both aspheric.

The ninth lens element 1490 with negative refractive power has an object-side surface 1491 being concave in a paraxial region thereof and an image-side surface 1492 being concave in a paraxial region thereof. The ninth lens element 1490 is made of plastic material and has the object-side surface 1491 and the image-side surface 1492 being both aspheric. The image-side surface 1492 of the ninth lens element 1490 has at least one convex critical point in an off-axis region thereof.

The filter 1493 is made of glass material and located between the ninth lens element 1490 and the image surface 1496, and will not affect the focal length of the optical image system. The image sensor 1499 is disposed on or near the image surface 1496 of the optical image system.

The detailed optical data of the 14th embodiment are shown in Table 27 and the aspheric surface data are shown in Table 28 below.

TABLE 27

14th Embodiment
f = 8.48 mm, Fno = 2.00, HFOV = 43.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.870 | | | | |
| 2 | Lens 1 | 2.989 | (ASP) | 1.006 | Plastic | 1.545 | 56.1 | 7.32 |
| 3 | | 10.481 | (ASP) | 0.037 | | | | |
| 4 | Lens 2 | 9.899 | (ASP) | 0.330 | Plastic | 1.669 | 19.5 | −20.85 |
| 5 | | 5.713 | (ASP) | 0.525 | | | | |
| 6 | Lens 3 | 14.412 | (ASP) | 0.350 | Plastic | 1.686 | 18.4 | −73.33 |
| 7 | | 11.092 | (ASP) | 0.186 | | | | |
| 8 | Stop | Plano | | −0.038 | | | | |
| 9 | Lens 4 | 22.327 | (ASP) | 0.431 | Plastic | 1.544 | 56.0 | 80.21 |
| 10 | | 45.407 | (ASP) | 0.116 | | | | |
| 11 | Lens 5 | 18.634 | (ASP) | 0.442 | Plastic | 1.544 | 56.0 | 50.05 |
| 12 | | 58.545 | (ASP) | 0.699 | | | | |
| 13 | Lens 6 | 13.178 | (ASP) | 0.452 | Plastic | 1.566 | 37.4 | 208.47 |
| 14 | | 14.650 | (ASP) | 0.625 | | | | |
| 15 | Lens 7 | 6.977 | (ASP) | 0.524 | Plastic | 1.544 | 56.0 | 62.81 |
| 16 | | 8.535 | (ASP) | 0.517 | | | | |

TABLE 27-continued

14th Embodiment
f = 8.48 mm, Fno = 2.00, HFOV = 43.4 deg.

| Surface # | | Curvature Radius | | Thickness | Material | Index | Abbe # | Focal Length |
|---|---|---|---|---|---|---|---|---|
| 17 | Lens 8 | 4.468 | (ASP) | 0.660 | Plastic | 1.544 | 56.0 | 49.23 |
| 18 | | 5.083 | (ASP) | 0.786 | | | | |
| 19 | Lens 9 | −5.850 | (ASP) | 0.787 | Plastic | 1.534 | 56.0 | −7.28 |
| 20 | | 12.164 | (ASP) | 0.500 | | | | |
| 21 | Filter | Plano | | 0.210 | Glass | 1.517 | 64.2 | — |
| 22 | | Plano | | 0.340 | | | | |
| 23 | Image | Plano | | — | | | | |

Note:
Reference wavelength is 587.6 nm (d-line).
An effective radius of the stop 1401 (Surface 8) is 1.999 mm.

TABLE 28

Aspheric Coefficients

| Surface # | 2 | 3 | 4 | 5 | 6 |
|---|---|---|---|---|---|
| k= | −4.8436E−01 | −2.8826E+01 | 7.9308E+00 | 5.6563E+00 | −5.7865E+01 |
| A4= | 3.0281E−03 | −6.3881E−03 | −8.6450E−03 | −1.7857E−03 | −1.1057E−02 |
| A6= | −7.9002E−04 | 1.1694E−02 | 1.3201E−02 | 2.6162E−03 | −3.4036E−03 |
| A8= | 1.1752E−03 | −7.5494E−03 | −8.2609E−03 | −1.5711E−03 | 4.0499E−03 |
| A10= | −5.6181E−04 | 2.5531E−03 | 2.8919E−03 | 5.8390E−04 | −2.1637E−03 |
| A12= | 1.2709E−04 | −4.2316E−04 | −5.0166E−04 | −1.3001E−04 | 5.4484E−04 |
| A14= | −1.1183E−05 | 2.6426E−05 | 3.5126E−05 | 1.4838E−05 | −4.9955E−05 |

| Surface # | 7 | 9 | 10 | 11 | 12 |
|---|---|---|---|---|---|
| k= | 1.0516E+01 | 3.3041E+01 | 0.0000E+00 | 0.0000E+00 | 0.0000E+00 |
| A4= | −1.0545E−02 | 9.5750E−03 | 7.9555E−03 | −8.6609E−03 | −1.2143E−02 |
| A6= | −6.8977E−03 | −1.0314E−02 | −4.3757E−03 | 1.5146E−03 | 1.7898E−03 |
| A8= | 5.4312E−03 | 2.7468E−03 | −3.6135E−03 | −4.9806E−03 | −2.1856E−03 |
| A10= | −1.6351E−03 | 1.2738E−03 | 3.5293E−03 | 2.5217E−03 | 1.1060E−03 |
| A12= | 3.7438E−05 | −1.1068E−03 | −1.2294E−03 | −5.3489E−04 | −3.9396E−04 |
| A14= | 8.7706E−05 | 2.7484E−04 | 1.9667E−04 | 6.5486E−05 | 1.1125E−04 |
| A16= | −1.2377E−05 | −2.2729E−05 | −1.1860E−05 | −5.2852E−06 | −1.8567E−05 |
| A18= | — | — | — | 2.1261E−07 | 1.5388E−06 |
| A20= | — | — | — | — | −4.9078E−08 |

| Surface # | 13 | 14 | 15 | 16 | 17 |
|---|---|---|---|---|---|
| k= | 0.0000E+00 | 0.0000E+00 | −3.4686E+00 | 0.0000E+00 | −1.0000E+00 |
| A4= | −4.6848E−03 | −2.2495E−03 | 1.4072E−02 | 7.3737E−03 | −2.2472E−02 |
| A6= | −9.4377E−03 | −1.0702E−02 | −1.2155E−02 | −8.1416E−03 | 8.7417E−04 |
| A8= | 5.7143E−03 | 5.2409E−03 | 3.6566E−03 | 2.3622E−03 | −6.8652E−04 |
| A10= | −2.0363E−03 | −1.4163E−03 | −7.5286E−04 | −4.8476E−04 | 1.6613E−04 |
| A12= | 3.9067E−04 | 2.0394E−04 | 1.0829E−04 | 7.1914E−05 | −1.8136E−05 |
| A14= | −4.0695E−05 | −1.4009E−05 | −1.1472E−05 | −7.7337E−06 | 1.1343E−06 |
| A16= | 2.1765E−06 | 2.4138E−07 | 8.6673E−07 | 5.8005E−07 | −4.3589E−08 |
| A18= | −4.6534E−08 | 1.8091E−08 | −4.2158E−08 | −2.8024E−08 | 1.0212E−09 |
| A20= | — | −6.9140E−10 | 1.1477E−09 | 7.6834E−10 | −1.3399E−11 |

| Surface # | 18 | 19 | 20 |
|---|---|---|---|
| k= | −1.0000E+00 | −3.3986E+01 | 0.0000E+00 |
| A4= | −1.1931E−02 | −3.1037E−02 | −2.0881E−02 |
| A6= | 3.5072E−04 | 9.0908E−03 | 3.4852E−03 |
| A8= | −4.2937E−04 | −1.4276E−03 | −3.9420E−04 |
| A10= | 1.4860E−04 | 1.3616E−04 | 2.6614E−05 |
| A12= | −2.4715E−05 | −8.4243E−06 | −8.0644E−07 |
| A14= | 2.3966E−06 | 3.5091E−07 | −1.7240E−08 |
| A16= | −1.4420E−07 | −9.9564E−09 | 2.6321E−09 |
| A18= | 5.4490E−09 | 1.8994E−10 | −1.1229E−10 |
| A20= | −1.2568E−10 | −2.3311E−12 | 2.6223E−12 |

In the 14th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 14th embodiment, so an explanation in this regard will not be provided again.

Moreover, these parameters can be calculated from Table 27 and Table 28 as the following values and satisfy the following conditions:

| 14th Embodiment | | | |
|---|---|---|---|
| f [mm] | 8.48 | f/EPD | 2.00 |
| fs [mm] | 22.83 | f/ImgH | 1.04 |
| Fno | 2.00 | EPD/ImgH | 0.52 |
| HFOV [deg.] | 43.4 | Y11/ImgH | 0.26 |
| V3 | 18.4 | EPD/ΣAT | 1.23 |
| Vdmin | 18.4 | ΣAT/BL | 3.29 |
| Vp | 56.1; 56.0; 56.0; 37.4; 56.0 56.0 | BL/ImgH | 0.13 |
| V4/V5 | 1.00 | SD/BL | 7.20 |
| (Vi/Ni)min | 10.91 | Ymax/Ymin | 3.76 |
| T23/ΣAT | 0.15 | f × tan(HFOV) [mm] | 8.02 |
| f/f1 | 1.16 | Fno × EPD [mm] | 8.48 |
| f/f3 | −0.12 | FOV [deg.] | 86.80 |
| TL/f | 1.12 | — | — |

15th Embodiment

Figure 29:
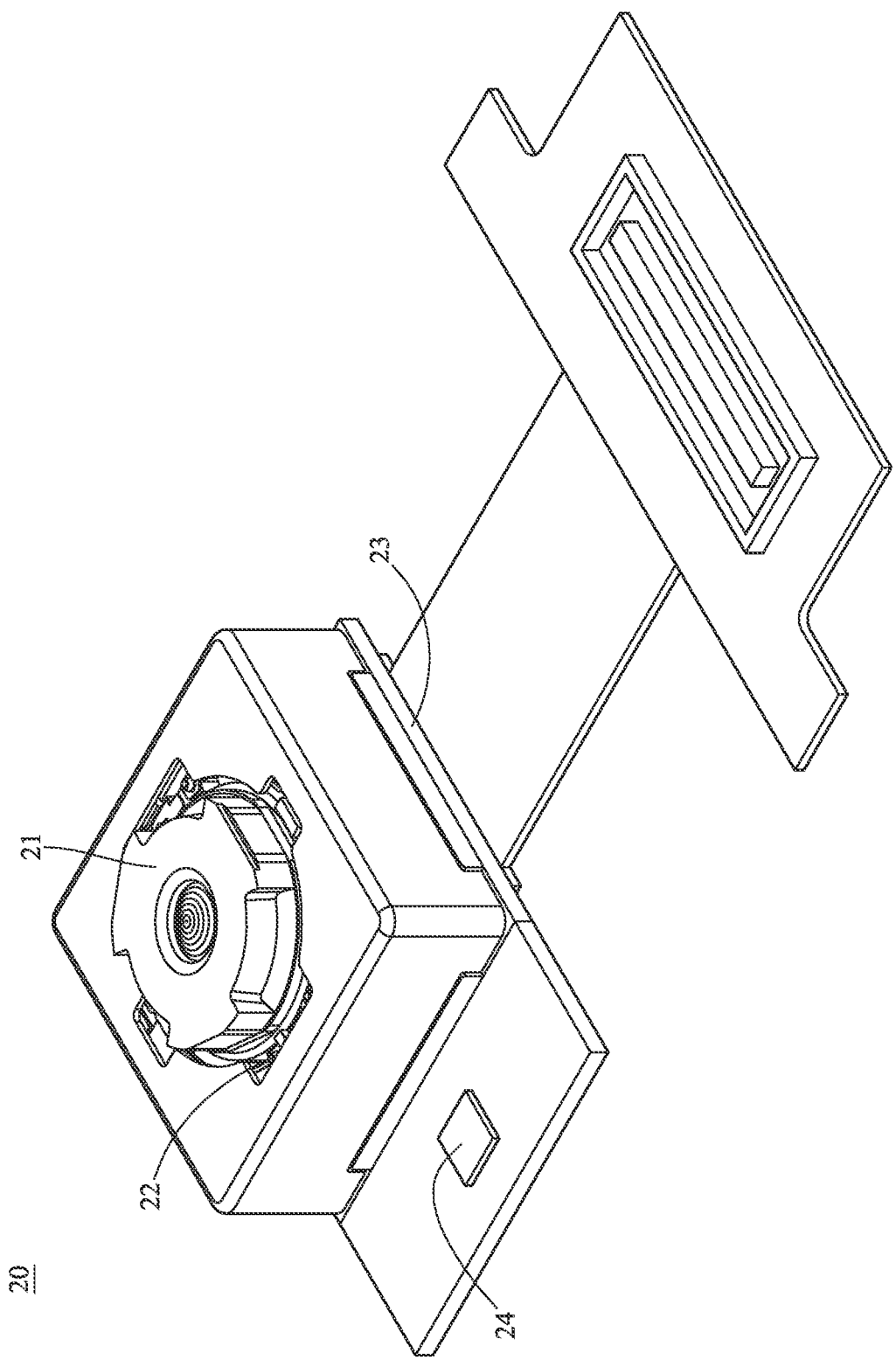
FIG. 29 is a perspective view of an image capturing unit according to the 15th embodiment of the present disclosure.

FIG. 29 is a perspective view of an image capturing unit according to the 15th embodiment of the present disclosure. In this embodiment, an image capturing unit 20 is a camera module including a lens unit 21, a driving device 22, an image sensor 23 and an image stabilizer 24. The lens unit 21 includes the optical image system disclosed in the 1st embodiment, a barrel and a holder member (their reference numerals are omitted) for holding the optical image system. However, the lens unit 21 may alternatively be provided with the optical image system disclosed in other abovementioned embodiments, and the present disclosure is not limited thereto. The imaging light converges in the lens unit 21 of the image capturing unit 20 to generate an image with the driving device 22 utilized for image focusing on the image sensor 23, and the generated image is then digitally transmitted to other electronic component for further processing.

The driving device 22 can have auto focusing functionality, and different driving configurations can be obtained through the usages of voice coil motors (VCM), micro electro-mechanical systems (MEMS), piezoelectric systems, or shape memory alloy materials. The driving device 22 is favorable for obtaining a better imaging position of the lens unit 21, so that a clear image of the imaged object can be captured by the lens unit 21 with different object distances. The image sensor 23 (for example, CCD or CMOS), which can feature high photosensitivity and low noise, is disposed on the image surface of the optical image system to provide higher image quality. Moreover, a specification of the image sensor 23 can be selected from the information in Table 29, but the present disclosure is not limited thereto.

TABLE 29

| Resolution | Pixel size | Diagonal length |
|---|---|---|
| 200M (16342 × 12257) | 0.7 micron | 14.3 mm |
| 108M (12032 × 9024) | 0.8 micron | 12.0 mm |
| 108M (12032 × 9024) | 0.7 micron | 10.5 mm |
| 108M (12032 × 9024) | 0.6 micron | 9.0 mm |
| 65M (9312 × 6992) | 1 micron | 11.6 mm |
| 52M (8320 × 6240) | 1 micron | 10.4 mm |
| 64M (9248 × 6944) | 0.8 micron | 9.3 mm |
| 64M (9248 × 6944) | 0.7 micron | 8.1 mm |
| 50M (8166 × 6124) | 1.4 micron | 14.3 mm |
| 50M (8166 × 6124) | 1.6 micron | 16.3 mm |
| 50M (8160 × 6144) | 1.2 micron | 12.3 mm |
| 51M (8653 × 5888) | 1 micron | 10.5 mm |
| 48M (8000 × 6000) | 1.12 micron | 11.2 mm |

TABLE 29-continued

| Resolution | Pixel size | Diagonal length |
|---|---|---|
| 48M (8000 × 6000) | 0.8 micron | 8.0 mm |
| 44M (7696 × 5772) | 1.3 micron | 12.5 mm |
| 32M (6560 × 4928) | 0.8 micron | 6.6 mm |
| 20M (5184 × 3880) | 0.8 micron | 5.18 mm |

The image stabilizer 24, such as an accelerometer, a gyro sensor and a Hall Effect sensor, is configured to work with the driving device 22 to provide optical image stabilization (OIS). The driving device 22 working with the image stabilizer 24 is favorable for compensating for pan and tilt of the lens unit 21 to reduce blurring associated with motion during exposure. In some cases, the compensation can be provided by electronic image stabilization (EIS) with image processing software, thereby improving image quality while in motion or low-light conditions.

16th Embodiment

Figure 30:
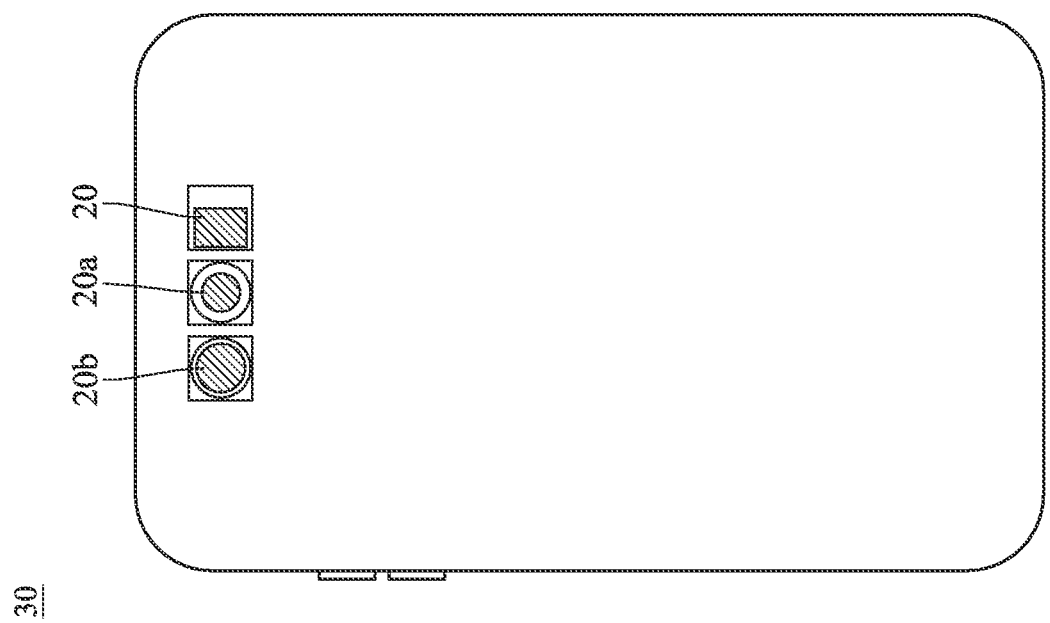
FIG. 30 is one perspective view of an electronic device according to the 16th embodiment of the present disclosure.
Figure 31:
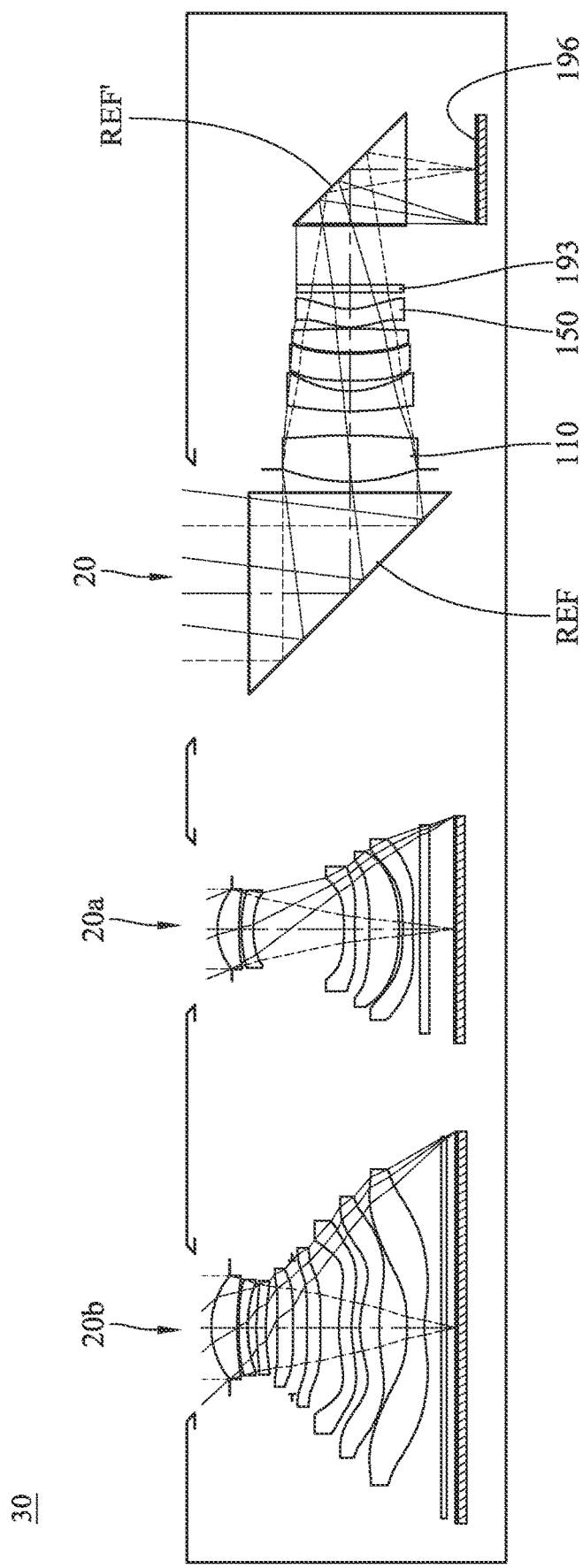
FIG. 31 shows a schematic view of a configuration of three of the image capturing units of the electronic device in FIG. 30.
Figure 32:
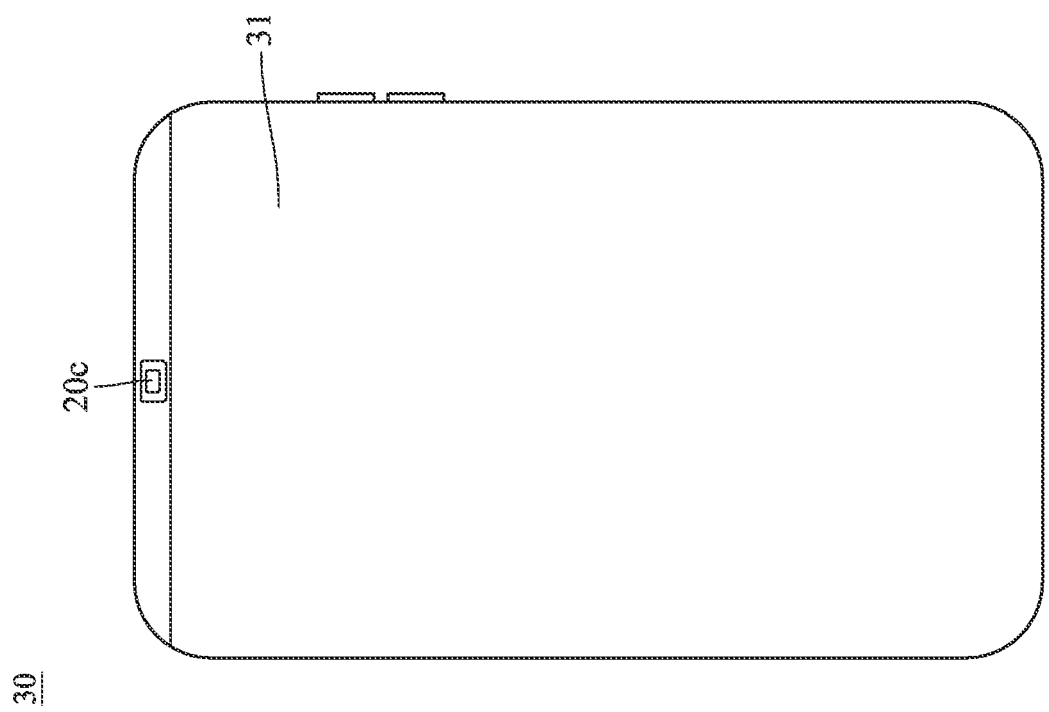
FIG. 32 is another perspective view of the electronic device in FIG. 30.

FIG. 30 is one perspective view of an electronic device according to the 16th embodiment of the present disclosure. FIG. 31 shows a schematic view of a configuration of three of the image capturing units of the electronic device in FIG. 30. FIG. 32 is another perspective view of the electronic device in FIG. 30.

In this embodiment, an electronic device 30 is a smartphone including the image capturing unit 20 disclosed in the 15th embodiment, an image capturing unit 20a disclosed in the optical image system of the 10th embodiment, an image capturing unit 20b disclosed in the optical image system of the 12th embodiment, an image capturing unit 20c and a display unit 31. As shown in FIG. 30 and FIG. 31, the image capturing unit 20, the image capturing unit 20a and the image capturing unit 20b are disposed on the same side of the electronic device 30 and face the same side, and each of the image capturing units 20, 20a and 20b has a single focal point. As shown in FIG. 32, the image capturing unit 20c and the display unit 31 are disposed on the opposite side of the electronic device 30, such that the image capturing unit 20c can be a front-facing camera of the electronic device 30 for taking selfies, but the present disclosure is not limited thereto. Furthermore, the image capturing unit 20c can include the optical image system of the present disclosure, and each of the image capturing units 20a, 20b and 20c can have a configuration similar to that of the image capturing unit 20. In detail, each of the image capturing units 20a, 20b and 20c can include a lens unit, a driving device, an image sensor and an image stabilizer, each of the lens unit of the image capturing units 20a, 20b can include a barrel and a holder member for holding the optical image system, and the lens unit of the image capturing units 20c can include an optical lens assembly such as the optical image system of the present disclosure, a barrel and a holder member for holding the optical lens assembly.

Figure 36:
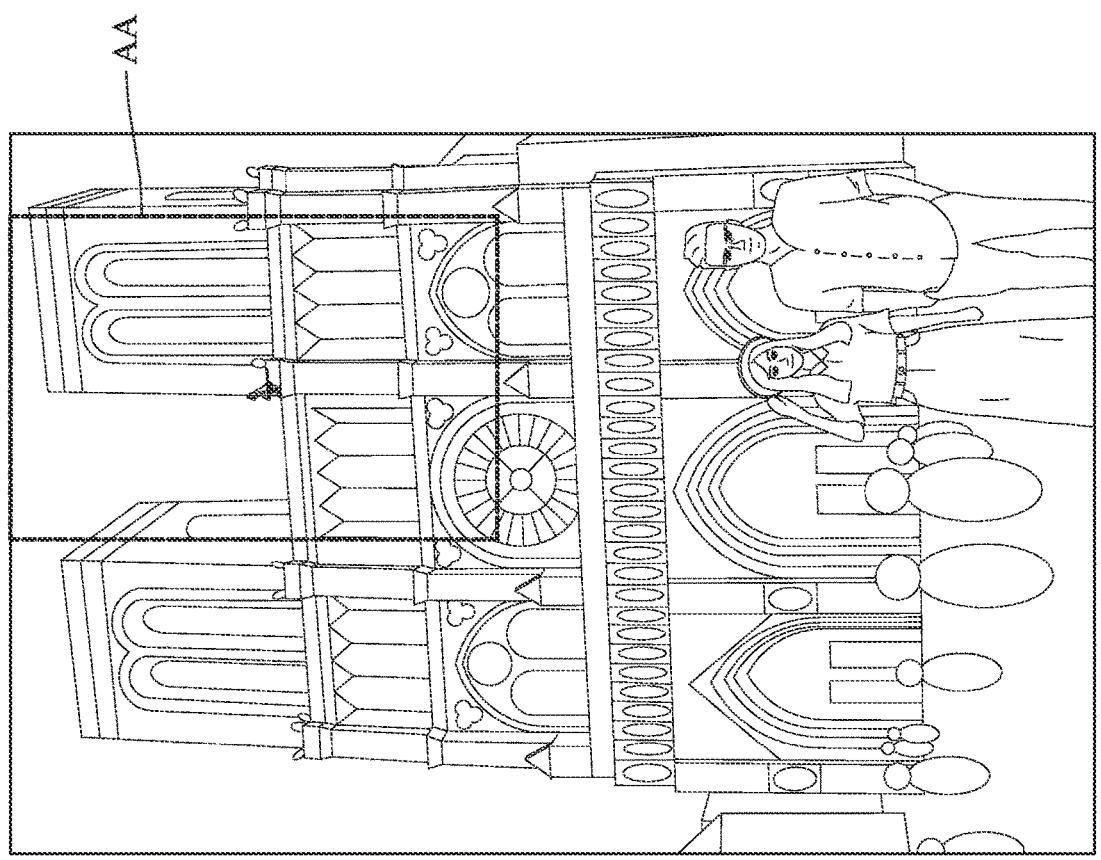
FIG. 36 shows an image captured by an electronic device with an equivalent focal length ranging between 15 mm and 30 mm.
Figure 37:
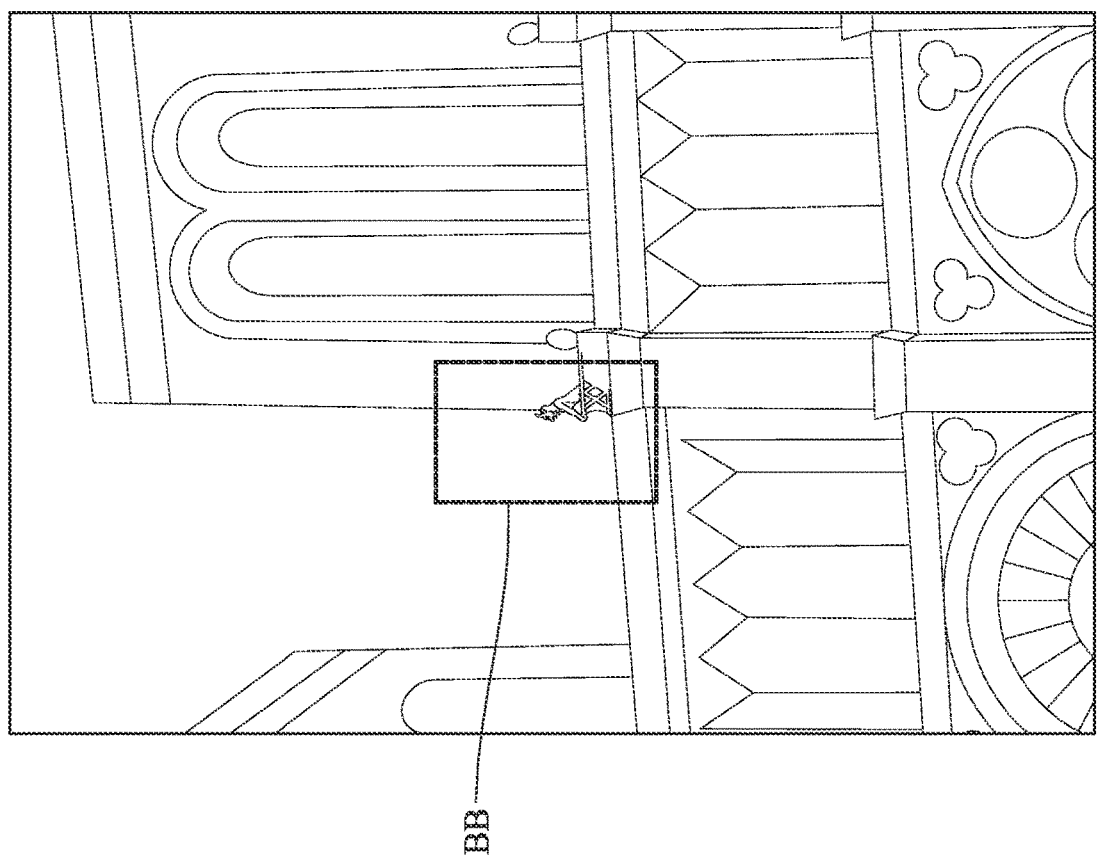
FIG. 37 shows an image captured by an electronic device with an equivalent focal length ranging between 80 mm and 150 mm.
Figure 38:
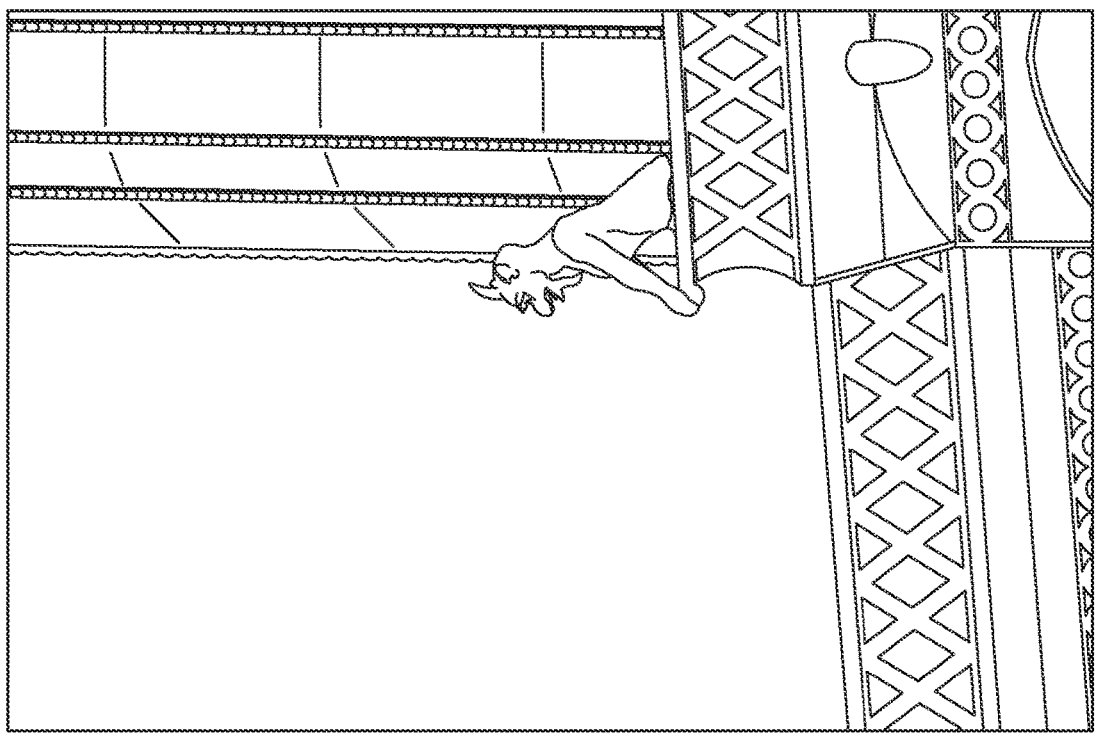
FIG. 38 shows an image captured by an electronic device with an equivalent focal length ranging between 200 mm and 500 mm.

The image capturing unit 20 is a telephoto image capturing unit (with a folded optical path configuration), the image capturing unit 20a is a telephoto image capturing unit, the image capturing unit 20b is a wide-angle image capturing unit, and the image capturing unit 20c is a wide-angle image capturing unit. In this embodiment, the image capturing units 20, 20a and 20b have different fields of view, such that the electronic device 30 can have various magnification ratios so as to meet the requirement of optical zoom functionality. In detail, a single prime lens can capture image information of different areas in a high-pixel and large-size image sensor (e.g., the abovementioned image sensor 23 built based on the specification selected from Table 29) so as to achieve a zoom photographing effect by post-processing technique, and the partially captured image would not be in poor quality due to the high pixel fineness of the image sensor. For example, the image capturing unit 20 can achieve an image with an equivalent focal length between 15 mm and 30 mm with the resolution of the image sensor 23, which is at least 40 megapixels. In this case, the image captured by the image capturing unit 20 can refer to FIG. 36, which shows an image captured by the electronic device 30 with an equivalent focal length ranging between 15 mm and 30 mm, and the captured image as shown in FIG. 36 includes the whole cathedral and people. The image capturing unit 20 can also achieve an image with an equivalent focal length between 80 mm and 150 mm with a portion of the resolution of the image sensor 23, which is at least 10 megapixels. In this case, the image captured by the image capturing unit 20 can refer to FIG. 37, which shows an image captured by the electronic device 30 with an equivalent focal length ranging between 80 mm and 150 mm, and the captured image as shown in FIG. 37 corresponds to an enlarged area AA of the dotted range in FIG. 36 and includes the upper part of the cathedral. The image capturing unit 20 can also achieve an image with an equivalent focal length between 200 mm and 500 mm with a portion of the resolution of the image sensor 23, which is at least eight megapixels. In this case, the image captured by the image capturing unit 20 can refer to FIG. 38, which shows an image captured by the electronic device 30 with an equivalent focal length ranging between 200 mm and 500 mm, and the captured image as shown in FIG. 38 corresponds to an enlarged area BB of the dotted range in FIG. 37 and includes Chimera (gargoyle) on the façade of the cathedral. In addition, the image capturing unit 20 can also achieve an image with an equivalent focal length between 200 mm and 500 mm with a portion of the resolution of another image sensor, which is at least 10 megapixels. Therefore, it is favorable for zooming distant views in the long distance shoot range by capturing a portion of the whole captured image without decreasing image quality so as to achieve the telephoto function. In addition, the image capturing unit 20a can achieve an image with an equivalent focal length between 30 mm and 100 mm with a portion of the resolution of the image sensor thereof, which is at least 10 megapixels. Therefore, it is favorable for providing a smooth user experience in switching lenses of different specifications by zooming views in the standard field of view shoot range so as to capture a portion of the whole captured image that is imaged on an ultra-high-pixel image sensor. The electronic device 30 can have a zoom function of 1× to 6× magnification by capturing the whole or a portion of image information on the image sensor of the image capturing unit 20, 20a, 20b or 20c, and resolutions of images captured by the electronic device 30 with 1× to 6× magnification are at least 10 megapixels. Therefore, it is favorable for providing a smooth user experience during zooming process of the electronic device 30 and fine image quality in different shooting scenarios. Moreover, the electronic device 30 can also have a zoom function of 1× to 10× magnification by capturing the whole or a portion of image information on the image sensor of the image capturing unit 20, 20a, 20b or 20c, and resolutions of images captured by the electronic device 30 with 1× to 10× magnification are at least 10 megapixels. Moreover, the electronic device 30 can also have a zoom function of 1× to 12× magnification by capturing the whole or a portion of image information on the image sensor of the image capturing unit 20, 20a, 20b or 20c, and resolutions of images captured by the electronic device 30 with 1× to 12× magnification are at least 10 megapixels. Moreover, the electronic device 30 can also have a zoom function of 1× to 15× magnification by capturing the whole or a portion of image information on the image sensor of the image capturing unit 20, 20a, 20b or 20c, and resolutions of images captured by the electronic device 30 with 1× to 15× magnification are at least 10 megapixels. In this embodiment, the electronic device 30 includes multiple image capturing units 20, 20a, 20b and 20c, but the present disclosure is not limited to the number and arrangement of image capturing units.

Moreover, the image capturing units 20 can be a telephoto image capturing unit having a reflective element configuration. In detail, as shown in FIG. 31, the image capturing unit 20 further includes reflective elements REF and REF', while the image capturing unit 20a and the image capturing unit 20b include no reflective element, such that the optical axis of the image capturing unit 20 is different from the optical axis of the image capturing unit 20a and the optical axis of the image capturing unit 20b. Specifically, the optical axis of the image capturing unit 20 can be perpendicular to the optical axis of the image capturing unit 20a and the optical axis of the image capturing unit 20b. The reflective elements REF and REF' are prisms respectively disposed on an object side of the first lens element 110 and an image side of the fifth lens element 150. Specifically, the reflective element REF is disposed in the electronic device 30 and located between an imaged object (not shown) and the first lens element 110 along an optical path, and the reflective element REF' is disposed in the electronic device 30 and located between the filter 193 and the image surface 196. However, the present disclosure is not limited to the type, number and position of the reflective elements. For example, the reflective elements REF and REF' may be mirrors. In this embodiment, the reflective element configuration of the image capturing unit 20 can be similar to, for example, one of the structures shown in FIG. 41 to FIG. 43 which can be referred to foregoing descriptions corresponding to FIG. 41 to FIG. 43 so the details in this regard will not be provided again.

According to the description above, the optical image systems originally included in the image capturing units 20, 20a and 20b and the optical image systems that are from abovementioned embodiments and can be alternatively included in the image capturing units 20, 20a and 20b are listed in Table 30, but the present disclosure is not limited thereto. Further, the parameters of the image capturing units 20, 20a and 20b listed in Table 30 and the parameters described in the 1st to 14th embodiments would be different based on being selected to the image capturing unit 20, 20a or 20b. For example, the parameter "f" in the 1st embodiment would change to parameter f_1 after the optical image system of the 1st embodiment is selected for the image capturing unit 20, the parameter "f" in the 10th embodiment would change to parameter f_2 after the optical image system of the 10th embodiment is selected for the image capturing unit 20a, and the parameter "f" in the 12th embodiment would change to parameter f_2 after the optical image system of the 12th embodiment is selected for the image capturing unit 20b. The other parameters would follow this rule, so the details in this regard will not be provided again.

TABLE 30

Embodiments (EM) from which the optical image systems in the image capturing units 20, 20a and 20b are respectively selected

|  | EM: 1, 10, 12 | EM: 2, 10, 12 | EM: 9, 10, 12 | EM: 4, 10, 13 |
|---|---|---|---|---|
| f_1 [mm] | 26.12 | 30.76 | 26.15 | 30.96 |
| f_2 [mm] | 10.86 | 10.86 | 10.86 | 10.86 |
| f_3 [mm] | 7.60 | 7.60 | 7.60 | 7.68 |
| fs_1 [mm] | 106.17 | 101.62 | 139.53 | 101.62 |
| fs_2 [mm] | 53.56 | 53.56 | 53.56 | 53.56 |
| fs_3 [mm] | 23.49 | 23.49 | 23.49 | 23.52 |
| BL_1 [mm] | 15.81 | 16.52 | 15.40 | 19.98 |
| BL_2 [mm] | 1.65 | 1.65 | 1.65 | 1.65 |
| BL_3 [mm] | 1.13 | 1.13 | 1.13 | 1.13 |
| FOV_1 [deg.] | 23.00 | 24.00 | 17.60 | 24.00 |
| FOV_3 [deg.] | 85.20 | 85.20 | 85.20 | 85.20 |
| FOV_3-FOV_1 [deg.] | 62.20 | 61.20 | 67.60 | 61.20 |
| f_1 + f_2 + f_3 [mm] | 44.58 | 49.22 | 44.61 | 49.50 |
| BL_1/(BL_2 + BL_3) | 5.69 | 5.95 | 5.55 | 7.20 |
| fs_1/fs_2 | 1.98 | 1.90 | 2.61 | 1.90 |
| fs_2/fs_3 | 2.28 | 2.28 | 2.28 | 2.28 |
| fs_1/fs_3 | 4.52 | 4.33 | 5.94 | 4.32 |

17th Embodiment

Figure 33:
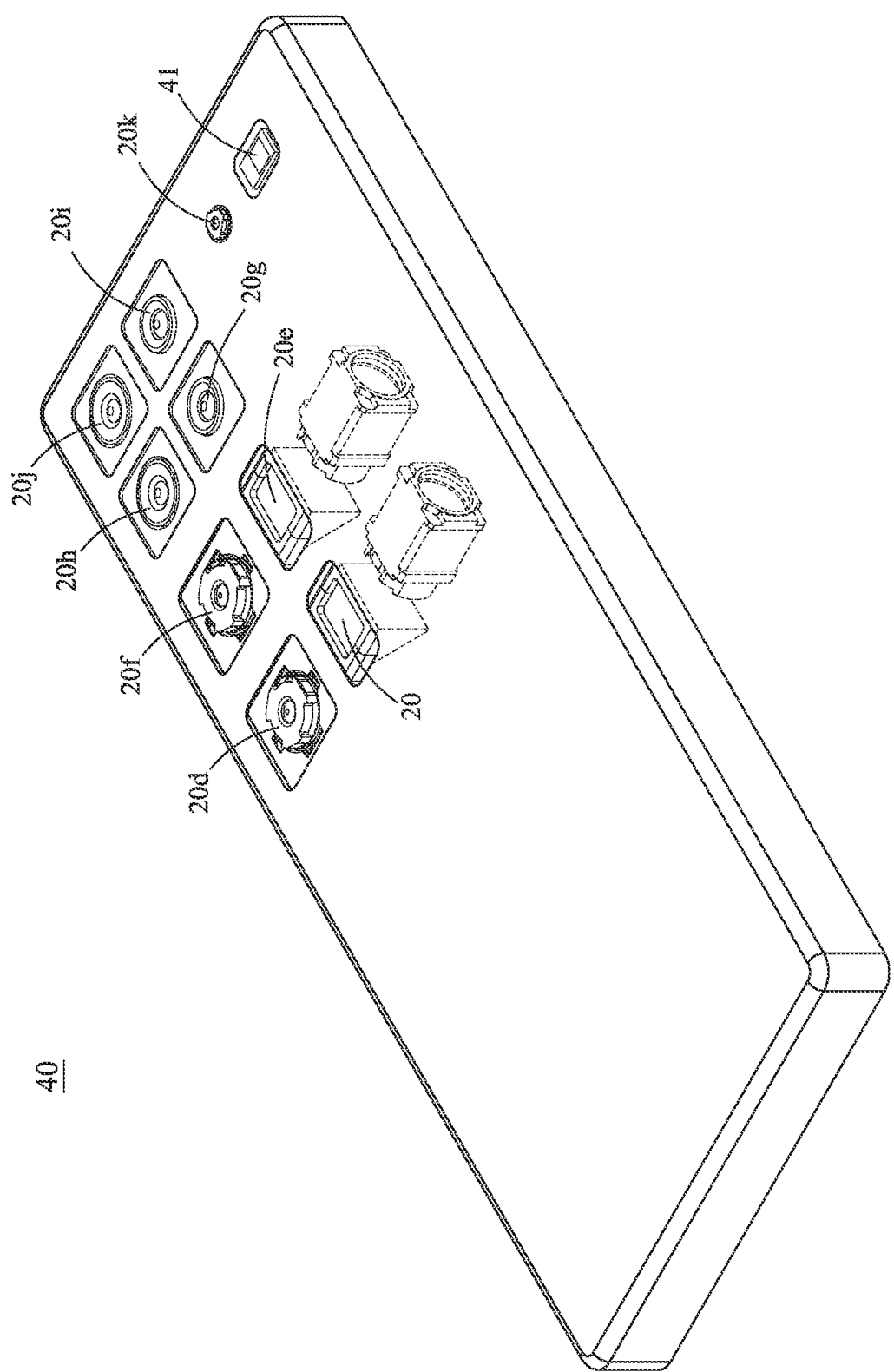
FIG. 33 is one perspective view of an electronic device according to the 17th embodiment of the present disclosure.
Figure 34:
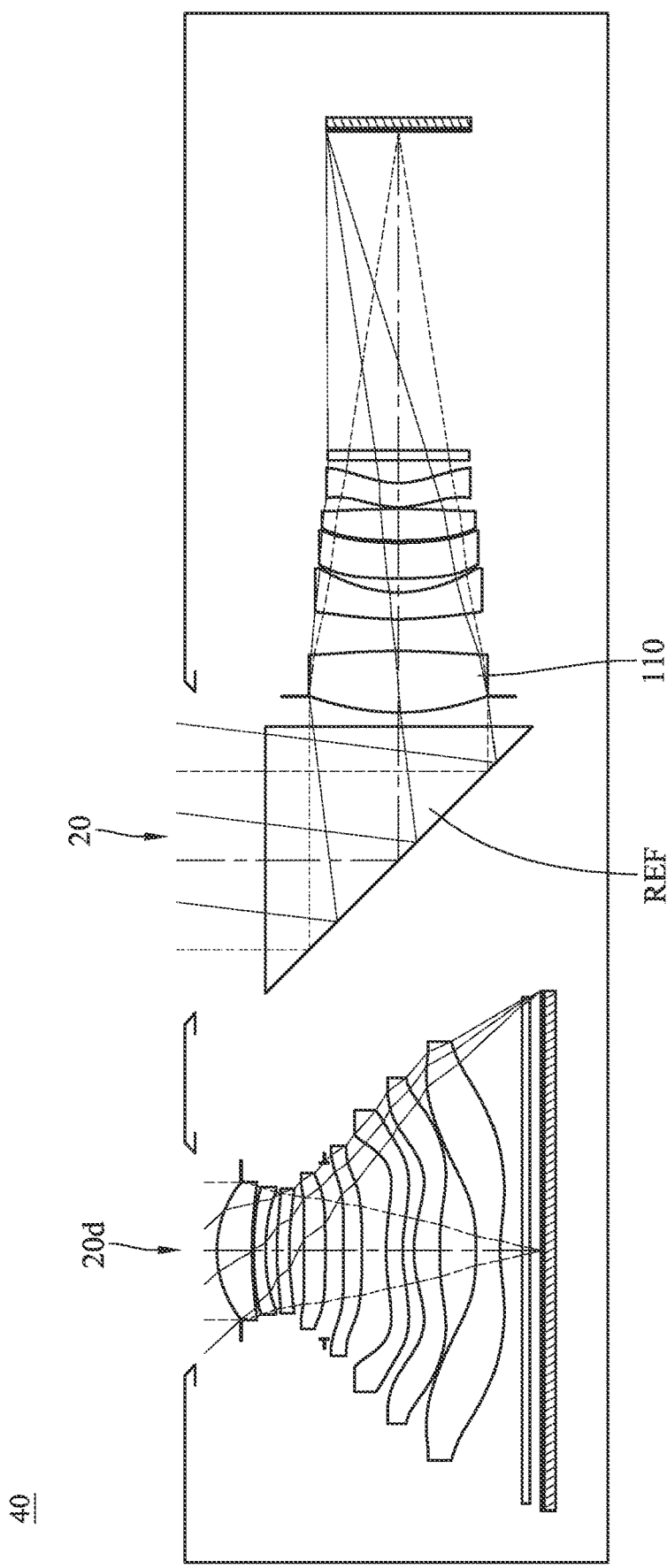
FIG. 34 shows a schematic view of a configuration of two of the image capturing units of the electronic device in FIG. 33.
Figure 35:
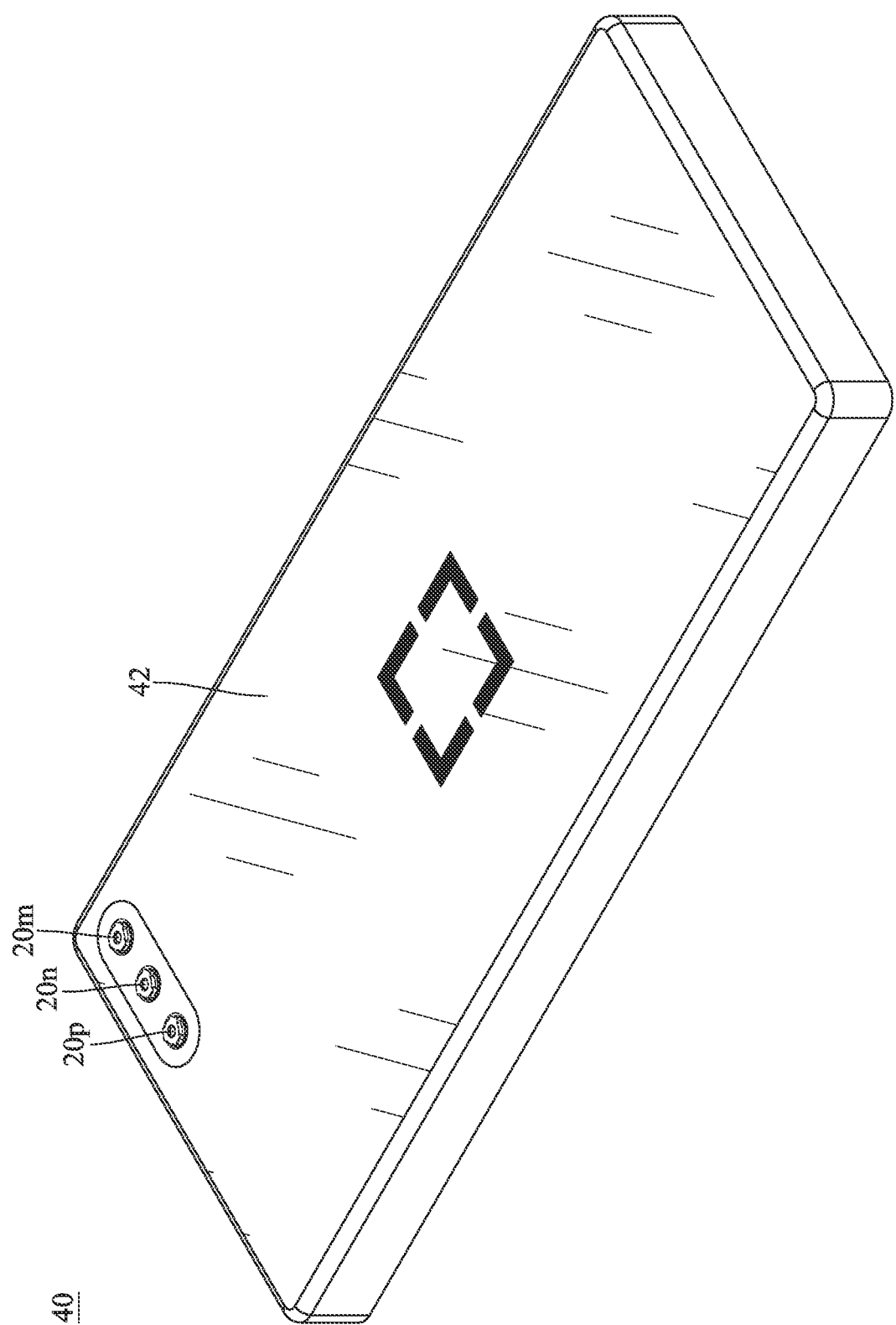
FIG. 35 is another perspective view of the electronic device in FIG. 33.

FIG. 33 is one perspective view of an electronic device according to the 17th embodiment of the present disclosure. FIG. 34 shows a schematic view of a configuration of two of the image capturing units of the electronic device in FIG. 33. FIG. 35 is another perspective view of the electronic device in FIG. 33.

In this embodiment, an electronic device 40 is a smartphone including the image capturing unit 20 disclosed in the 15th embodiment, an image capturing unit 20d disclosed in the optical image system of the 12th embodiment, an image capturing unit 20e, an image capturing unit 20f, an image capturing unit 20g, an image capturing unit 20h, an image capturing unit 20i, an image capturing unit 20j, an image capturing unit 20k, an image capturing unit 20m, an image capturing unit 20n, an image capturing unit 20p, a flash module 41 and a display unit 42. As shown in FIG. 33 and FIG. 34, the image capturing unit 20, 20d, 20e, 20f, 20g, 20h, 20i, 20j and 20k are disposed on the same side of the electronic device 40 and face the same side, and each of the image capturing units 20, 20a and 20b has a single focal point. As shown in FIG. 35, the image capturing units 20m, 20n and 20p and the display unit 42 are disposed on the opposite side of the electronic device 40, such that the image capturing units 20m, 20n and 20p can be front-facing cameras of the electronic device 40 for taking selfies, but the present disclosure is not limited thereto. Furthermore, each of the image capturing units 20d, 20e, 20f, 20g, 20h, 20i, 20j, 20k, 20m, 20n and 20p can include the optical image system of the present disclosure and can have a configuration similar to that of the image capturing units 20a, 20b and 20c, so the details in this regard will not be provided again.

The image capturing unit 20 is a telephoto image capturing unit, the image capturing unit 20d is a wide-angle image capturing unit, the image capturing unit 20e is a telephoto image capturing unit, the image capturing unit 20f is a wide-angle image capturing unit, the image capturing unit 20g is a telephoto image capturing unit, the image capturing unit 20h is an ultra-wide-angle image capturing unit, the image capturing unit 20i is a telephoto image capturing unit, the image capturing unit 20j is an ultra-wide-angle image capturing unit, the image capturing unit 20k is a ToF (time of flight) image capturing unit, the image capturing unit 20m is a wide-angle image capturing unit, the image capturing unit 20n is an ultra-wide-angle image capturing unit, and the image capturing unit 20p is a ToF image capturing unit. In this embodiment, the image capturing units 20, 20d, 20e, 20f, 20g, 20h, 20i, 20j, 20m and 20n have different fields of view, such that the electronic device 40 can have various magnification ratios so as to meet the requirement of optical zoom functionality. In detail, a single prime lens can capture image information of different areas in a high-pixel and large-size image sensor (e.g., the abovementioned image sensor 23 built based on the specification selected from Table 29) so as to achieve a zoom photographing effect by post-processing technique, and the partially captured image would not be in poor quality due to the high pixel fineness of the image sensor. In this embodiment, the description about the electronic device 40 having a zoom function of 1× to 6× magnification by capturing the whole or a portion of image information on the image sensor of the image capturing unit 20, 20d, 20e, 20f, 20g, 20h, 20i, 20j, 20k, 20m, 20n or 20p can be referred to foregoing descriptions corresponding to FIG. 36 to FIG. 38 so the details in this regard will not be provided again.

Figure 40:
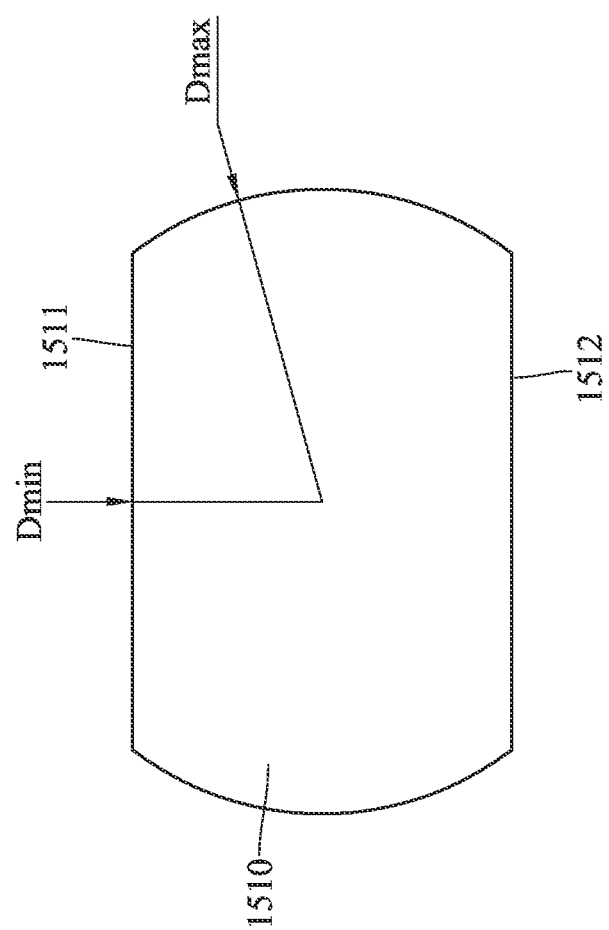
FIG. 40 shows a schematic view of a single lens element of an image capturing unit according to one embodiment of the present disclosure

In this embodiment, the first lens element 110 of the optical image system of the image capturing unit 20 can alternatively have an appearance similar to that of the first lens element 1510 in FIG. 40, but the present disclosure is not limited thereto. Each of all lens elements of the optical image system of the image capturing unit 20 can alternatively have an appearance similar to that of the first lens element 1510. As shown in FIG. 40, the first lens element 1510 has two straight edges 1511 and 1512 at outer edges, such that the first lens element 1510 has non-circular maximum effective radius ranges on an object-side surface and an image-side surface thereof and is a non-circular lens element, and distances between the center to outer edges of the first lens element 1510 would be different. Specifically, when a minimum distance from the center to the outer edge of the first lens element 1510 is Dmin, and a maximum distance from the center to the outer edge of the first lens element 1510 is Dmax, the following condition is satisfied: Dmin/Dmax<0.80. Therefore, it is favorable for reducing the size of the image capturing unit 20 in the direction parallel to Dmin so as to reduce the thickness of the electronic device 40.

Moreover, the image capturing units 20 can be a telephoto image capturing unit having a reflective element configuration. In detail, as shown in FIG. 34, the image capturing unit 20 further includes a reflective element REF, while the image capturing unit 20*d* includes no reflective element, such that the optical axis of the image capturing unit 20 is different from the optical axis of the image capturing unit 20*d*. Specifically, the optical axis of the image capturing unit 20 can be perpendicular to the optical axis of the image capturing unit 20*d*. The reflective element REF is a prism disposed on an object side of the first lens element 110. Specifically, the reflective element REF is disposed in the electronic device 40 and located between an imaged object (not shown) and the first lens element 110 along an optical path, but the present disclosure is not limited to the type, number and position of the reflective element. For example, the reflective element REF may be a mirror. In this embodiment, the reflective element configuration of the image capturing unit 20 can be similar to, for example, one of the structures shown in FIG. 41 to FIG. 43 which can be referred to foregoing descriptions corresponding to FIG. 41 to FIG. 43 so the details in this regard will not be provided again. In addition, the image capturing units 20*k* and 20*p* can determine depth information of the imaged object. In this embodiment, the electronic device 40 includes multiple image capturing units 20, 20*d*, 20*e*, 20*f*, 20*g*, 20*h*, 20*i*, 20*j*, 20*k*, 20*m*, 20*n* and 20*p*, but the present disclosure is not limited to the number and arrangement of image capturing units. When a user captures images of an object, light rays converge in the image capturing unit 20, 20*d*, 20*e*, 20*f*, 20*g*, 20*h*, 20*i*, 20*j*, 20*k*, 20*m*, 20*n* or 20*p* to generate images, the flash module 41 is activated for light supplement, and the subsequent processing would be performed by an image processor, etc.

According to the description above, the optical image systems originally included in the image capturing units 20 and 20*d* and the optical image systems that are from above-mentioned embodiments and can be alternatively included in the image capturing units 20 and 20*d* are listed in Table 31, but the present disclosure is not limited thereto. Further, the parameters of the image capturing units 20 and 20*d* listed in Table 31 and the parameters described in the 1st to 14th embodiments would be different based on being selected to the image capturing unit 20, 20*a* or 20*b*, which can be referred to foregoing descriptions corresponding to Table 30 so the details in this regard will not be provided again.

TABLE 31

Embodiments (EM) from which the optical image systems in the image capturing units 20 and 20d are respectively selected

|  | EM: 1,12 | EM: 6, 12 | EM: 7, 12 | EM: 8,12 |
|---|---|---|---|---|
| f_1 [mm] | 26.12 | 16.03 | 19.79 | 8.81 |
| f_2 [mm] | 7.60 | 7.60 | 7.60 | 7.60 |
| fs_1 [mm] | 106.17 | 78.96 | 83.52 | 74.06 |
| fs_2 [mm] | 23.49 | 23.49 | 23.49 | 23.49 |
| f_1 + f_2 [m] | 33.72 | 23.63 | 27.39 | 16.41 |
| FOV_1 [deg.] | 23.0 | 30.6 | 29.0 | 32.5 |
| FOV_2 [deg.] | 85.2 | 85.2 | 85.2 | 85.2 |
| FOV_2-FOV_1 [deg.] | 62.2 | 54.6 | 56.2 | 52.7 |
| fs_1/fs_2 | 4.52 | 3.36 | 3.56 | 3.15 |

|  | EM: 9, 12 | EM: 11, 14 | EM: 10, 12 |
|---|---|---|---|
| f 1 [mm] | 26.15 | 18.97 | 10.86 |
| f_2 [mm] | 7.60 | 8.48 | 7.60 |
| fs_1 [mm] | 139.53 | 80.05 | 53.56 |
| fs_2 [mm] | 23.49 | 22.83 | 23.49 |
| f_1 + f_2 [mm] | 33.75 | 27.45 | 18.46 |
| FOV_1 [deg.] | 17.6 | 30.2 | 43.9 |
| FOV_2 [deg.] | 85.2 | 86.8 | 85.2 |
| FOV_2-FOV_1 [deg.] | 67.6 | 56.6 | 41.3 |
| fs_1/fs_2 | 5.94 | 3.51 | 2.28 |

The smartphone in this embodiment is only exemplary for showing the image capturing units 20, 20a, 20b and 20d of the present disclosure installed in an electronic device, and the present disclosure is not limited thereto. Each of the image capturing units 20, 20a, 20b and 20d can be optionally applied to optical systems with a movable focus. Furthermore, the optical image system of each of the image capturing units 20, 20a, 20b and 20d features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-31 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device, comprising at least two image capturing units facing a same side, wherein the at least two image capturing units comprise:
    a first image capturing unit, comprising an optical image system and a first image sensor, wherein the optical image system comprises, in order from an object side to an image side along an optical path, a first lens element, a second lens element, a third lens element, a fourth lens element, a last lens element and an image surface, a total number of lens elements of the optical image system of the first image capturing unit is five, and the optical image system further comprises an aperture stop; the first image sensor is disposed on the image surface of the optical image system of the first image capturing unit, and the first image sensor has a first resolution of at least 60 megapixels; and
    a second image capturing unit, comprising an optical image system and a second image sensor, wherein the optical image system comprises, in order from an object side to an image side along an optical path, a first lens element and an image surface; the second image sensor is disposed on the image surface of the optical image system of the second image capturing unit, and the second image sensor has a second resolution of at least 40 megapixels;
    wherein in the first image capturing unit, the first lens element has positive refractive power, the second lens element has negative refractive power and an image-side surface being concave in a paraxial region thereof, and the last lens element has an image-side surface being concave in a paraxial region thereof;
    wherein an equivalent focal length of the optical image system of the first image capturing unit is fs_1, an equivalent focal length of the optical image system of the second image capturing unit is fs_2, a focal length of the optical image system of the first image capturing unit is f_1, a focal length of the optical image system of the second image capturing unit is f_2, a maximum field of view of the optical image system of the first image capturing unit is FOV_1, a maximum field of view of the optical image system of the second image capturing unit is FOV_2, and the electronic device satisfies the following conditions:

$30.0\ [\text{mm}] \leq fs\_1 \leq 150.0\ [\text{mm}]$;

$10.0\ [\text{mm}] \leq fs\_2 \leq 30.0\ [\text{mm}]$;

$15.0\ [\text{mm}] < f\_1 + f\_2 < 45.0\ [\text{mm}]$; and $20.0\ [\text{deg.}] < FOV\_2 - FOV\_1 < 80.0\ [\text{deg.}]$;

wherein a focal length of the optical image system is f, half of a maximum field of view of the optical image system is HFOV, a distance along an optical axis between the aperture stop and the image-side surface of the last lens element of the optical image system is SD, a distance along the optical axis between the image-side surface of the last lens element and the image surface of the optical image system is BL, and the optical image system of the first image capturing unit satisfies the following conditions:

$3.2\ [\text{mm}] < f \times \tan(HFOV) < 8.0\ [\text{mm}]$; and $0.20 < SD/BL < 1.40$;

wherein an Abbe number of the first lens element of the optical image system is V1, an Abbe number of the second lens element of the optical image system is V2, an Abbe number of the third lens element of the optical image system is V3, an Abbe number of the fourth lens element of the optical image system is V4, an Abbe number of the last lens element of the optical image system is V5, an Abbe number of the i-th lens element of the optical image system is Vi, and at least two lens elements of the optical image system of the first image capturing unit satisfy the following condition:

$Vi < 23.0$, wherein $i = 1, 2, 3, 4$ or $5$.

2. The electronic device of claim 1, wherein a distance along an optical axis between an object-side surface of the first lens element and the image surface of the optical image system is TL, the focal length of the optical image system is f, and the optical image system of the first image capturing unit satisfies the following condition:

$0.20 < TL/f < 1.05$.

3. The electronic device of claim 1,
    wherein a minimum value among Abbe numbers of all lens elements of the optical image system is Vdmin, and the optical image system of the first image capturing unit satisfies the following condition:

$9.0 < Vd\text{min} < 20.0$.

4. The electronic device of claim 1, wherein a total number of lens elements of the optical image system of the second image capturing unit is at least eight; in the second image capturing unit, the optical image system further comprises a last lens element disposed between the first lens element and the image surface along the optical path, the last lens element has an image-side surface being concave in a paraxial region thereof and having at least one convex critical point in an off-axis region thereof, and the second image sensor has a diagonal length larger than 9.0 millimeters;
  wherein a minimum value among Abbe numbers of all lens elements of the optical image system is Vdmin, and the optical image system of the second image capturing unit satisfies the following condition:

9.0<Vdmin<20.0.

5. The electronic device of claim 1, wherein the first image capturing unit further comprises a reflective element, at least two lens elements of the optical image system of the first image capturing unit are made of plastic material, and the second resolution of the second image sensor is at least 60 megapixels;
  wherein the focal length of the optical image system is f, an entrance pupil diameter of the optical image system is EPD, and the optical image system of the first image capturing unit satisfies the following condition:

3.0≤f/EPD<4.5.

6. The electronic device of claim 1, wherein the focal length of the optical image system is f, half of the maximum field of view of the optical image system is HFOV, the optical image system of the first image capturing unit satisfies the following condition: 4.20 [mm]<f×tan(HFOV) <8.0 [mm]; and the optical image system of the second image capturing unit satisfies the following condition: 5.0 [mm]<f×tan(HFOV)<9.0 [mm].

7. The electronic device of claim 1, wherein the second resolution of the second image sensor is at least 50 megapixels;
  wherein an f-number of the optical image system is Fno, an entrance pupil diameter of the optical image system is EPD, a maximum image height of the optical image system is ImgH, and the optical image system of the first image capturing unit satisfies the following conditions:

18.0 [mm]<Fno×EPD<40.0 [mm]; and 0.75<EPD/ImgH<2.20.

8. The electronic device of claim 1, wherein at least one lens surface of lens elements of the optical image system of the first image capturing unit is aspheric, and the second resolution of the second image sensor is at least 60 megapixels;
  wherein an Abbe number of a lens element having positive refractive power of the optical image system is Vp, and at least one lens element with positive refractive power of the optical image system of the first image capturing unit satisfies the following condition:

Vp<21.0.

9. The electronic device of claim 1, wherein the first image capturing unit achieves an image of an equivalent focal length between 200 mm and 500 mm with a portion of the first resolution of the first image sensor, which is at least 10 megapixels; and the second image capturing unit achieves an image of an equivalent focal length between 30 mm and 100 mm with a portion of the second resolution of the second image sensor, which is at least 10 megapixels;
  wherein the maximum field of view of the optical image system is FOV, the optical image system of the first image capturing unit satisfies the following condition: 15 [deg.]<FOV<50 [deg.], and the optical image system of the second image capturing unit satisfies the following condition: 70 [deg.]<FOV<130 [deg.].

10. The electronic device of claim 1, wherein the first image capturing unit further comprises an optical image stabilizer, the optical image system of the first image capturing unit comprises, in order from the object side to the image side along the optical path, the first lens element, the second lens element, the third lens element, the fourth lens element, a fifth lens element, and the image surface, and the fifth lens element of the first image capturing unit is the last lens element of the first image capturing unit;
  wherein in the first image capturing unit, at least two lens elements of the optical image system are made of plastic material, the fifth lens element has at least one inflection point on at least one of an object-side surface and an image-side surface thereof, and the image-side surface of the fifth lens element is concave in a paraxial region thereof;
  wherein the equivalent focal length of the optical image system of the first image capturing unit is fs_1, the equivalent focal length of the optical image system of the second image capturing unit is fs_2, and the electronic device satisfies the following condition:

2<fs_1/fs_2<10.

11. The electronic device of claim 1, wherein in the first image capturing unit, a thickness along an optical axis of the first lens element is a maximum value among thicknesses along the optical axis of all lens elements of the optical image system;
  wherein the equivalent focal length of the optical image system of the first image capturing unit is fs_1, the equivalent focal length of the optical image system of the second image capturing unit is fs_2, and the electronic device satisfies the following condition:

2<fs_1/fs_2<10;

wherein the focal length of the optical image system is f, a maximum image height of the optical image system is ImgH, and the optical image system of the first image capturing unit satisfies the following condition:

2.6<f/ImgH<15.0;

wherein an Abbe number of a lens element having positive refractive power of the optical image system is Vp, and at least one lens element with positive refractive power of the optical image system of the first image capturing unit satisfies the following condition:

Vp<30.0.

12. The electronic device of claim 1, wherein the optical image system of the first image capturing unit comprises, in order from the object side to the image side along the optical path, the first lens element, the second lens element, the third lens element, the fourth lens element, a fifth lens element, and the image surface, and the fifth lens element of the first image capturing unit is the last lens element of the first image capturing unit;
  wherein the focal length of the optical image system of the first image capturing unit is f_1, the focal length of the optical image system of the second image capturing unit is f_2, and the electronic device satisfies the following condition:

25.0 [mm]<f_1+f_2<45.0 [mm];

wherein an Abbe number of the fourth lens element of the optical image system is V4, an Abbe number of the fifth lens element of the optical image system is V5, and the optical image system of the first image capturing unit satisfies the following condition:

$0.10 < V4/V5 < 0.95$.

13. The electronic device of claim 1, wherein the electronic device has at least 1× to 6× magnification, and an image resolution with 1× to 6× magnification by the electronic device is at least 10 megapixels.

14. The electronic device of claim 1, further comprising:
a third image capturing unit, comprising an optical image system and a third image sensor, a total number of lens elements of the optical image system of the third image capturing unit is at least five; wherein the optical image system of the third image capturing unit comprises, in order from an object side to an image side along an optical path, a first lens element, a second lens element, and an image surface; the third image sensor is disposed on the image surface of the optical image system of the third image capturing unit, and the third image sensor has a third resolution of at least 20 megapixels;
wherein the first image capturing unit and the third image capturing unit face a same side;
in the third image capturing unit, the first lens element has positive refractive power, and the second lens element has negative refractive power;
wherein a minimum value among Abbe numbers of all lens elements of the optical image system is Vdmin, and the optical image system of the third image capturing unit satisfies the following condition:

$9.0 < Vd\text{min} < 20.0$.

15. The electronic device of claim 14, wherein the optical image system of the third image capturing unit further comprises a third lens element disposed between the second lens element and the image surface along the optical path; a distance along an optical axis between the second lens element and the third lens element of the optical image system is T23, a sum of distances along the optical axis between each of all adjacent lens elements of the optical image system is ΣAT, an Abbe number of the third lens element of the optical image system is V3, and the optical image system of the third image capturing unit satisfies the following conditions:

$0.30 < T23/\Sigma AT < 0.90$; and $10.0 < V3 < 40.0$.

* * * * *